(12) United States Patent
Nonaka et al.

(10) Patent No.: US 7,843,578 B2
(45) Date of Patent: Nov. 30, 2010

(54) IMAGE FORMING APPARATUS AND METHOD OF CONTROLLING THE SAME

(75) Inventors: Takashi Nonaka, Kunitachi (JP); Tetsuya Yamada, Kawasaki (JP); Naoki Ito, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1197 days.

(21) Appl. No.: 11/314,893

(22) Filed: Dec. 20, 2005

(65) Prior Publication Data

US 2006/0132821 A1 Jun. 22, 2006

(30) Foreign Application Priority Data

Dec. 21, 2004 (JP) ............... 2004-369765
Dec. 21, 2004 (JP) ............... 2004-369766
Dec. 21, 2004 (JP) ............... 2004-369767

(51) Int. Cl.
*G06F 3/12* (2006.01)
*G03G 15/00* (2006.01)

(52) U.S. Cl. ............ 358/1.13; 358/1.15; 358/1.9; 399/11; 399/16; 399/82; 399/362; 399/381

(58) Field of Classification Search ............ 358/1.15, 358/1.9, 1.13; 399/11, 16, 82, 362, 381
See application file for complete search history.

(56) References Cited

U.S. PATENT DOCUMENTS

| 5,734,799 | A | 3/1998 | Kusumoto | |
| 6,529,703 | B2 | 3/2003 | Kawasumi | |
| 6,782,402 | B1* | 8/2004 | Hidaka et al. | 1/1 |
| 6,872,015 | B2* | 3/2005 | Roosen et al. | 400/61 |
| 7,110,152 | B2* | 9/2006 | Johnston et al. | 358/538 |
| 7,495,809 | B2* | 2/2009 | Sheng et al. | 358/474 |
| 2001/0019416 | A1* | 9/2001 | Monty et al. | 358/1.9 |
| 2002/0027668 | A1* | 3/2002 | Omori | 358/1.2 |
| 2002/0051203 | A1* | 5/2002 | Kizaki | 358/1.16 |
| 2005/0099660 | A1* | 5/2005 | Yada et al. | 358/498 |
| 2005/0157134 | A1* | 7/2005 | Noguchi et al. | 347/101 |

FOREIGN PATENT DOCUMENTS

| JP | 5-336287 | A | 12/1993 |
| JP | 11-234449 | A | 8/1999 |
| JP | 2001-296784 | A | 10/2001 |
| JP | 2001-320561 | A | 11/2001 |
| JP | 2002-104695 | A | 4/2002 |

\* cited by examiner

*Primary Examiner*—Chan S Park
(74) *Attorney, Agent, or Firm*—Canon U.S.A., Inc. I.P. Division

(57) ABSTRACT

There is provided an image output method including the steps of reading image data in a predetermined format, outputting an image based on the read image data according to a first output method, outputting an image based on the read image data according to a second output method, and inputting a parameter for a process of the read image data in parallel to the reading of the image data, wherein the predetermined format is adaptable to the first output method and the second output method.

5 Claims, 55 Drawing Sheets

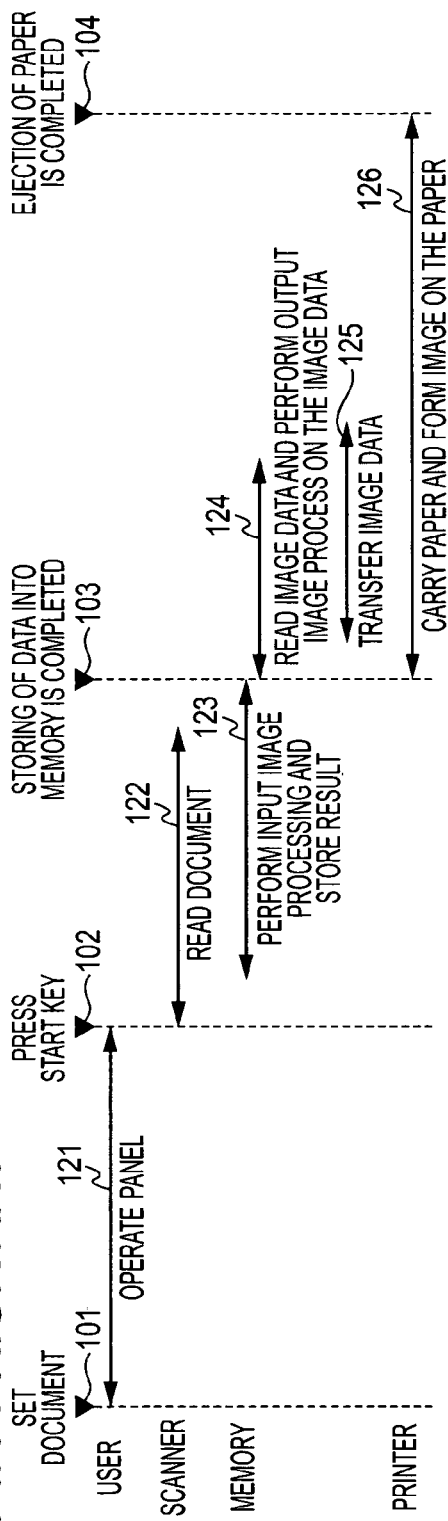
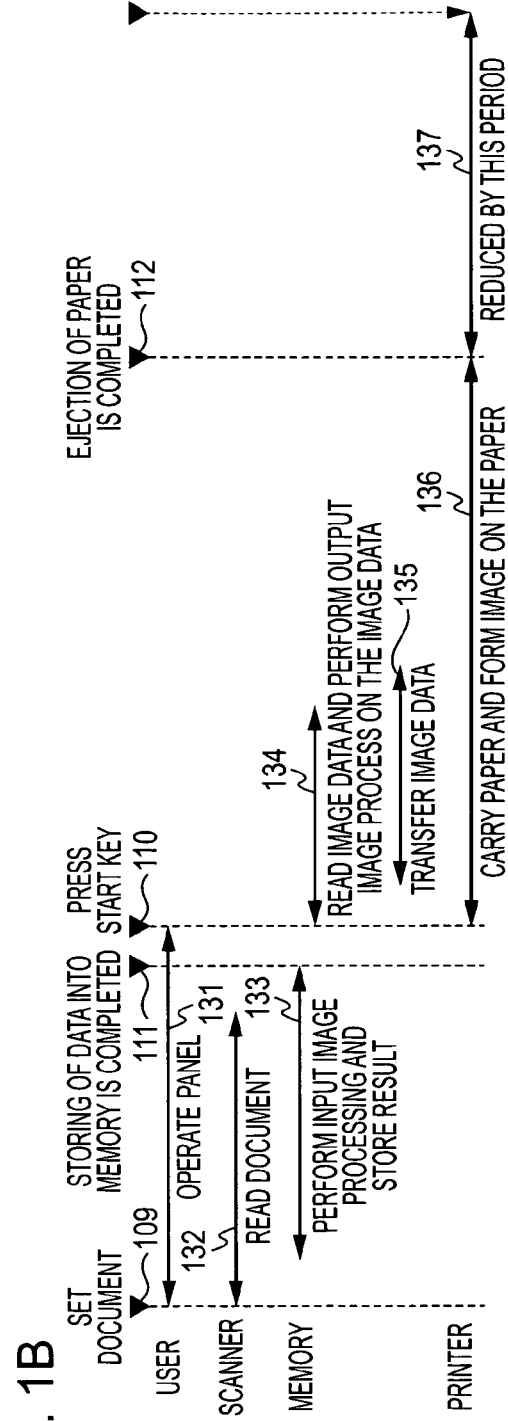

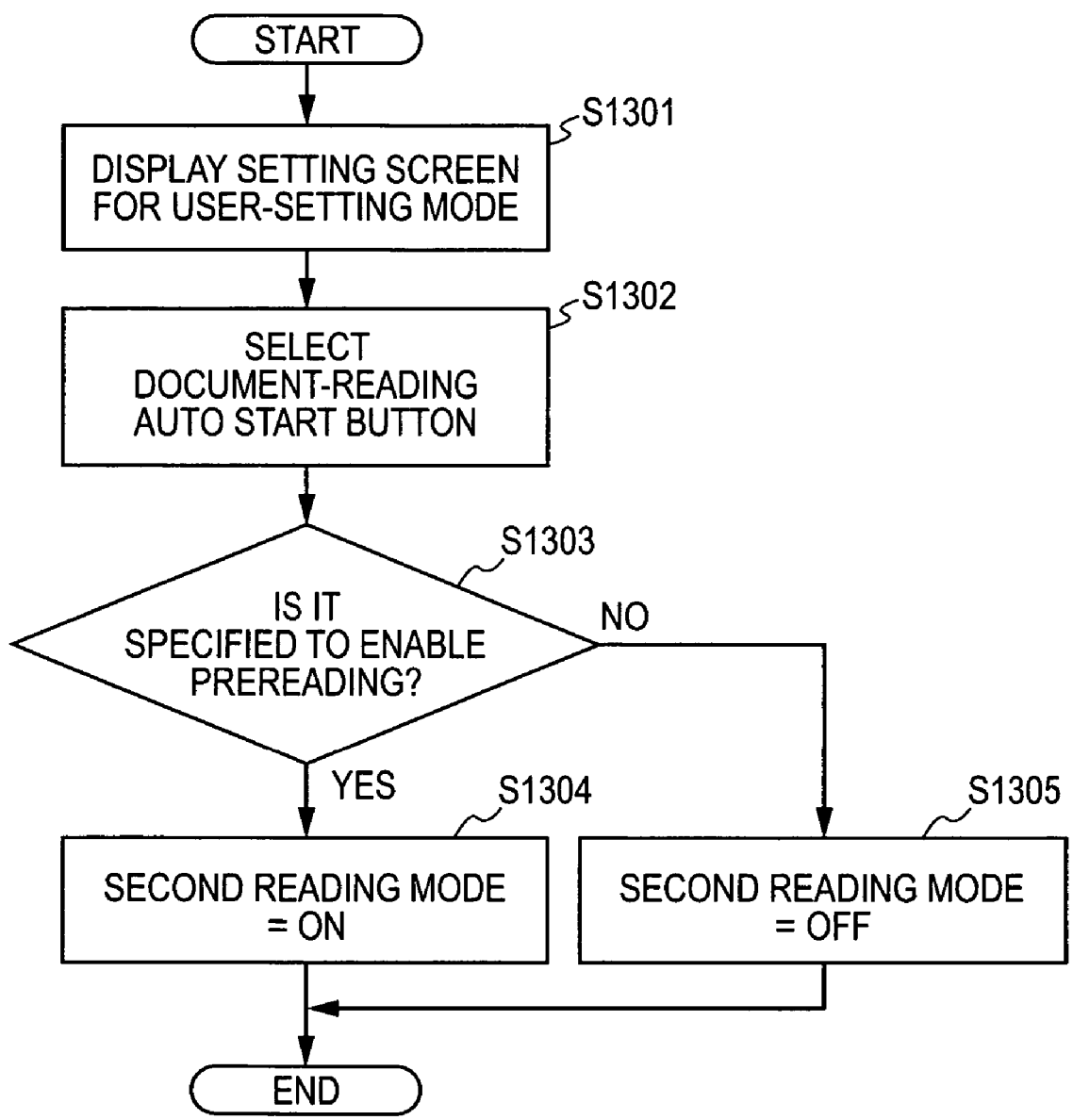

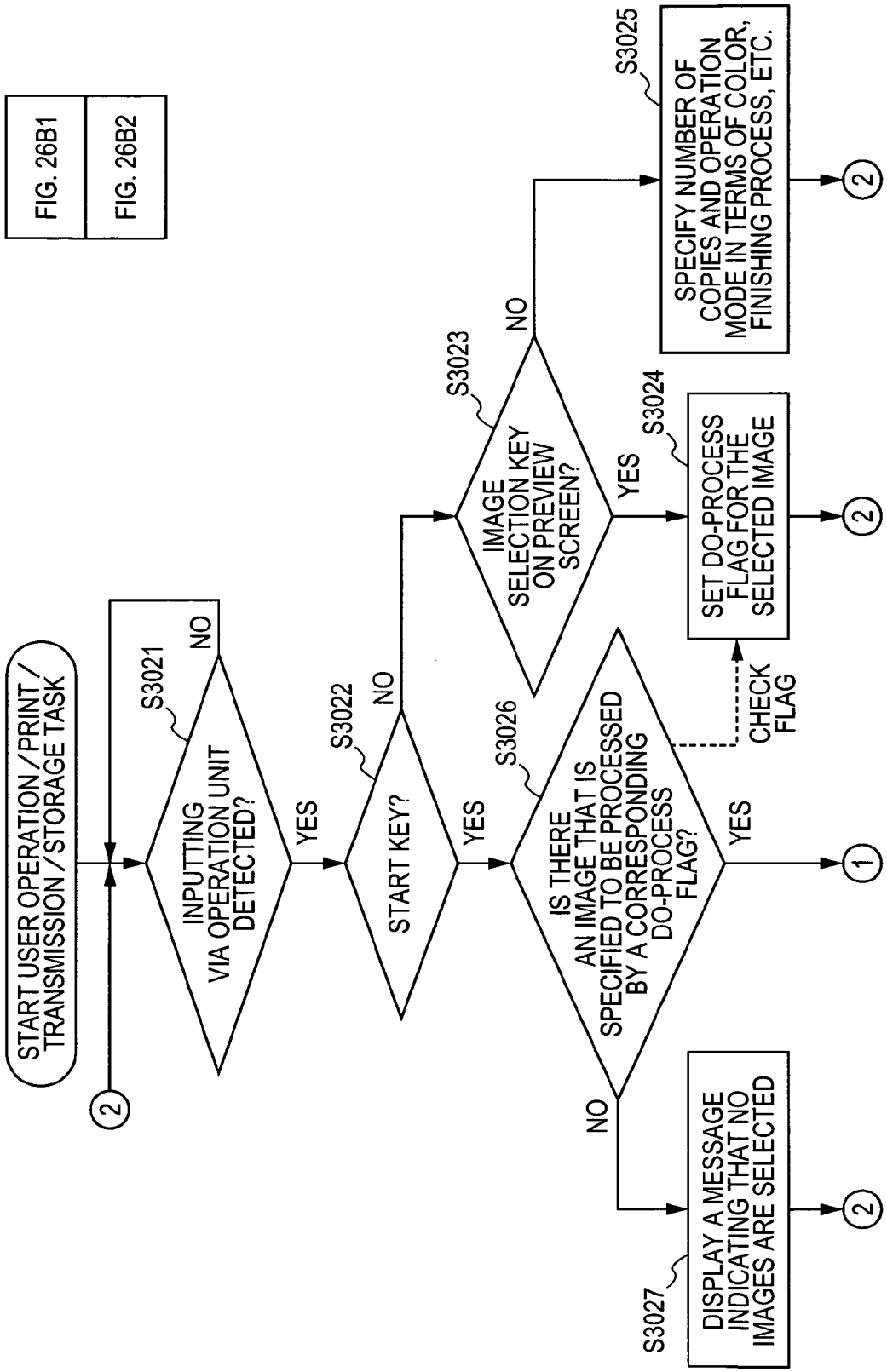

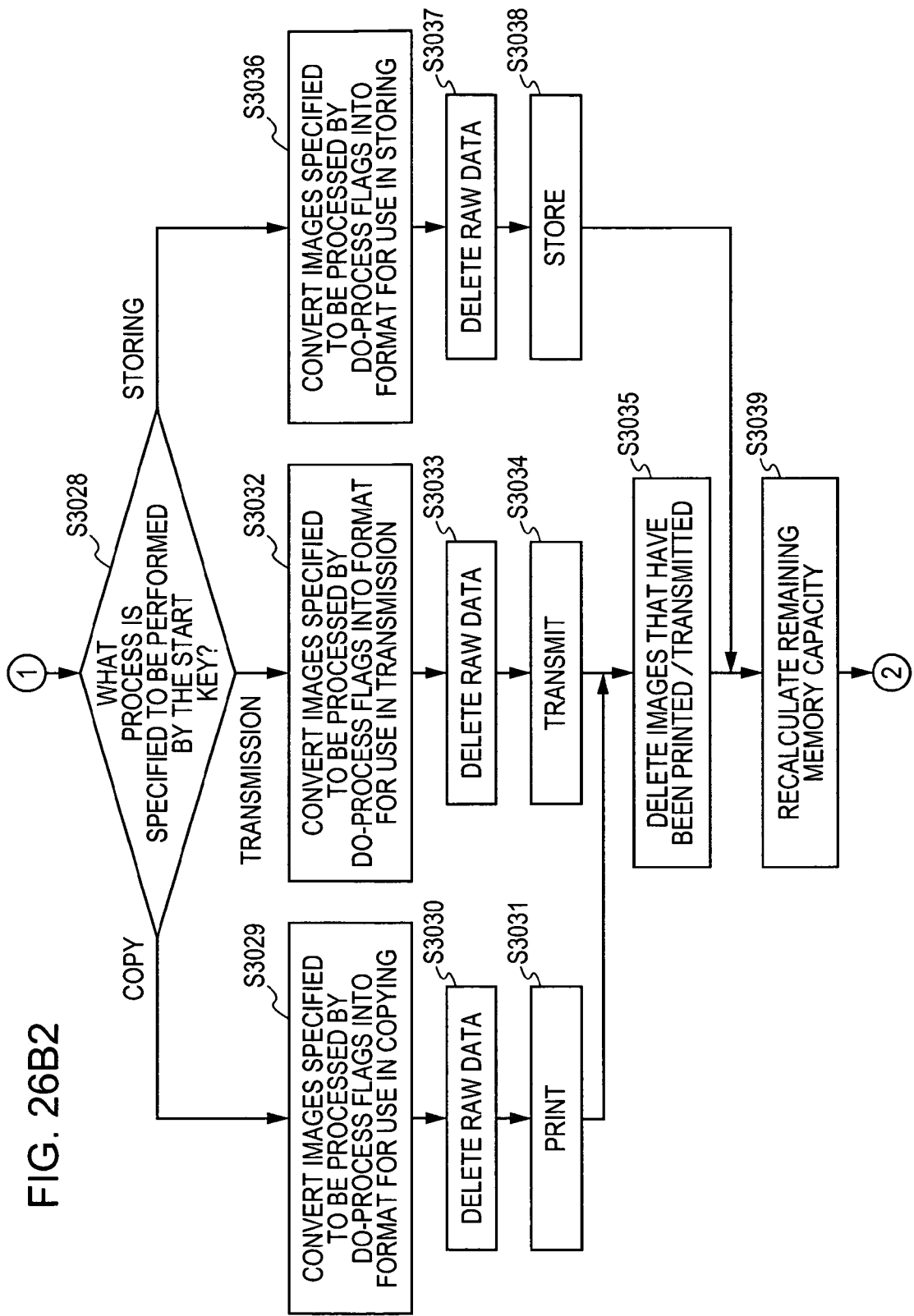
FIG. 26B2

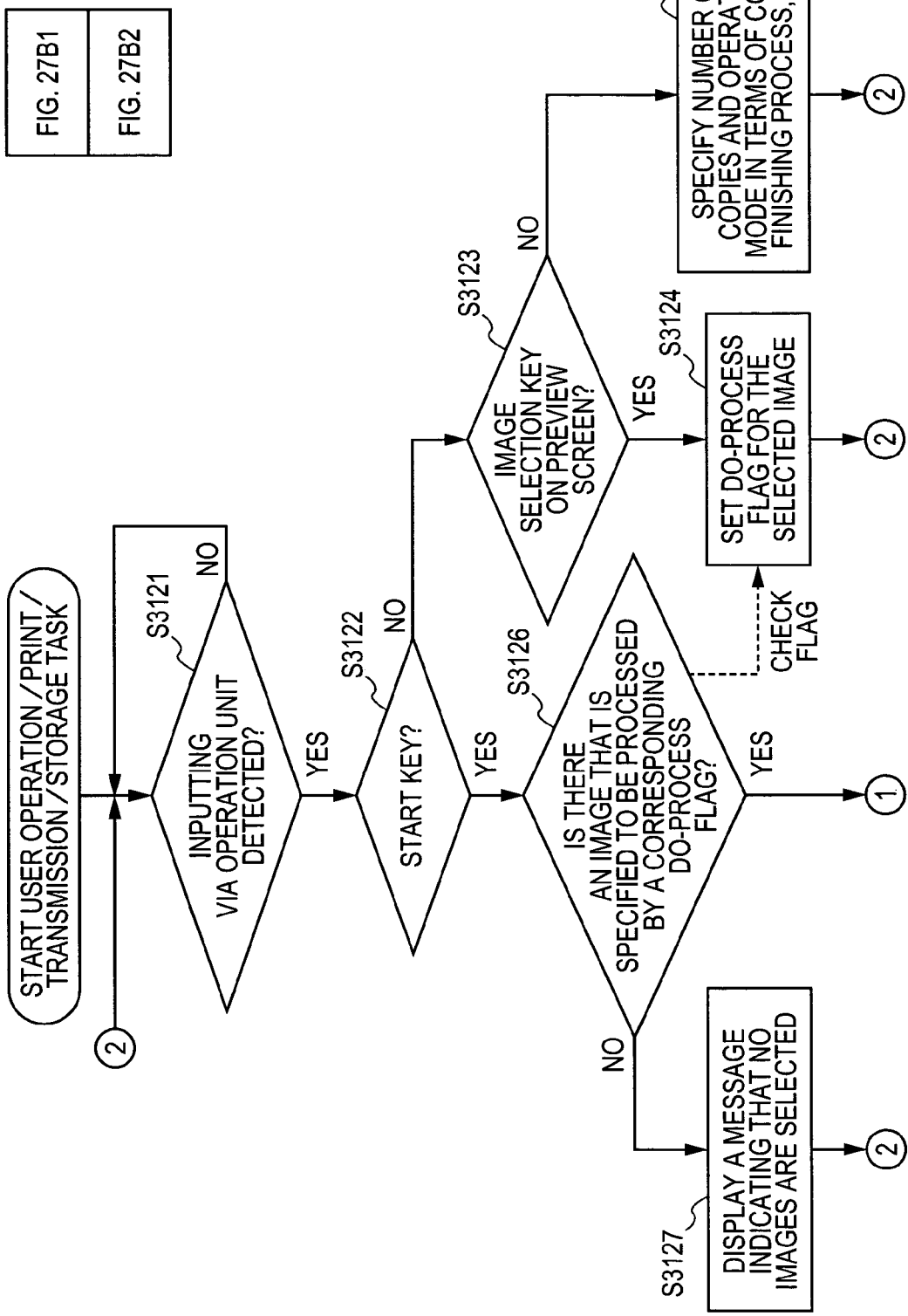

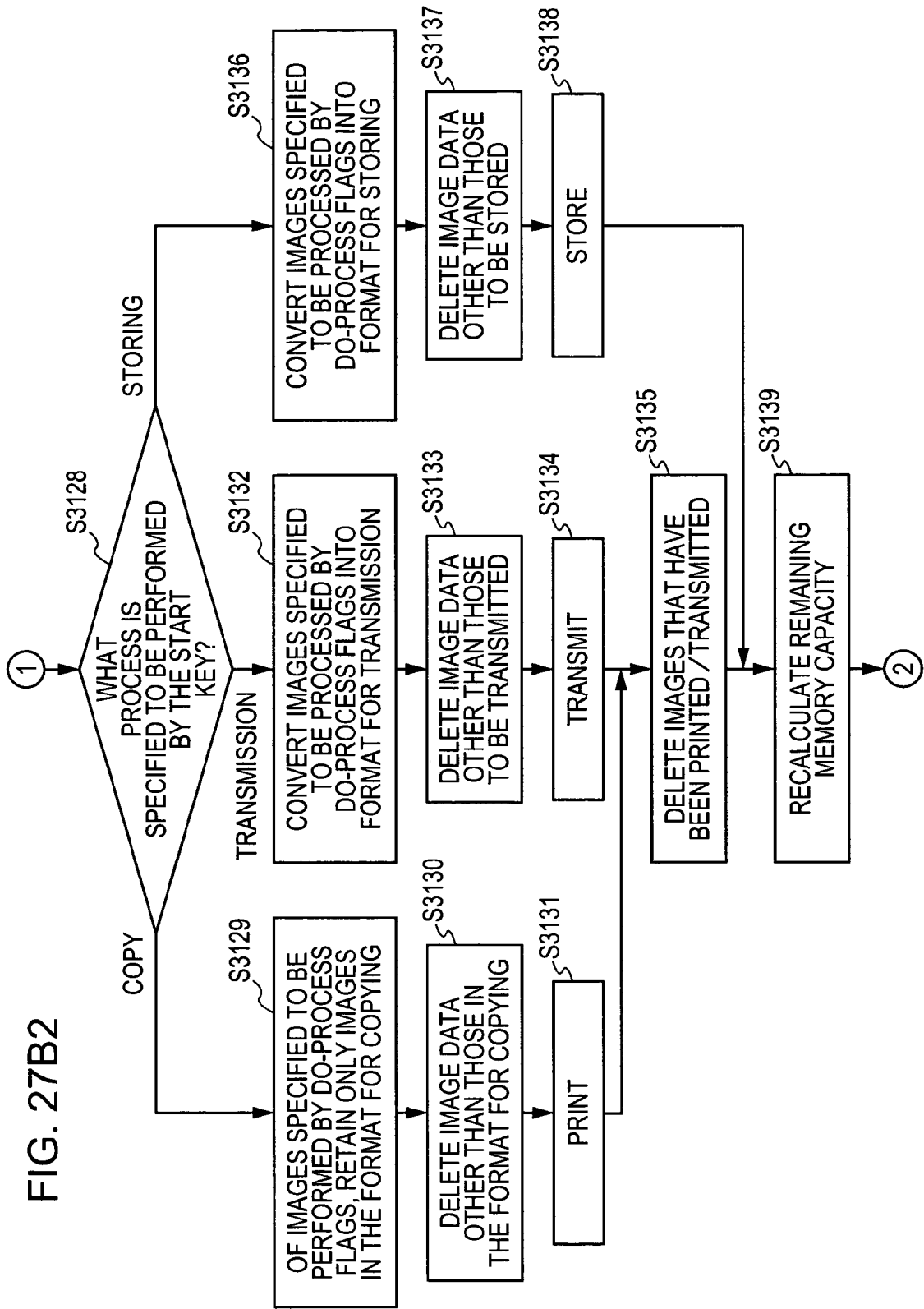
FIG. 27B2

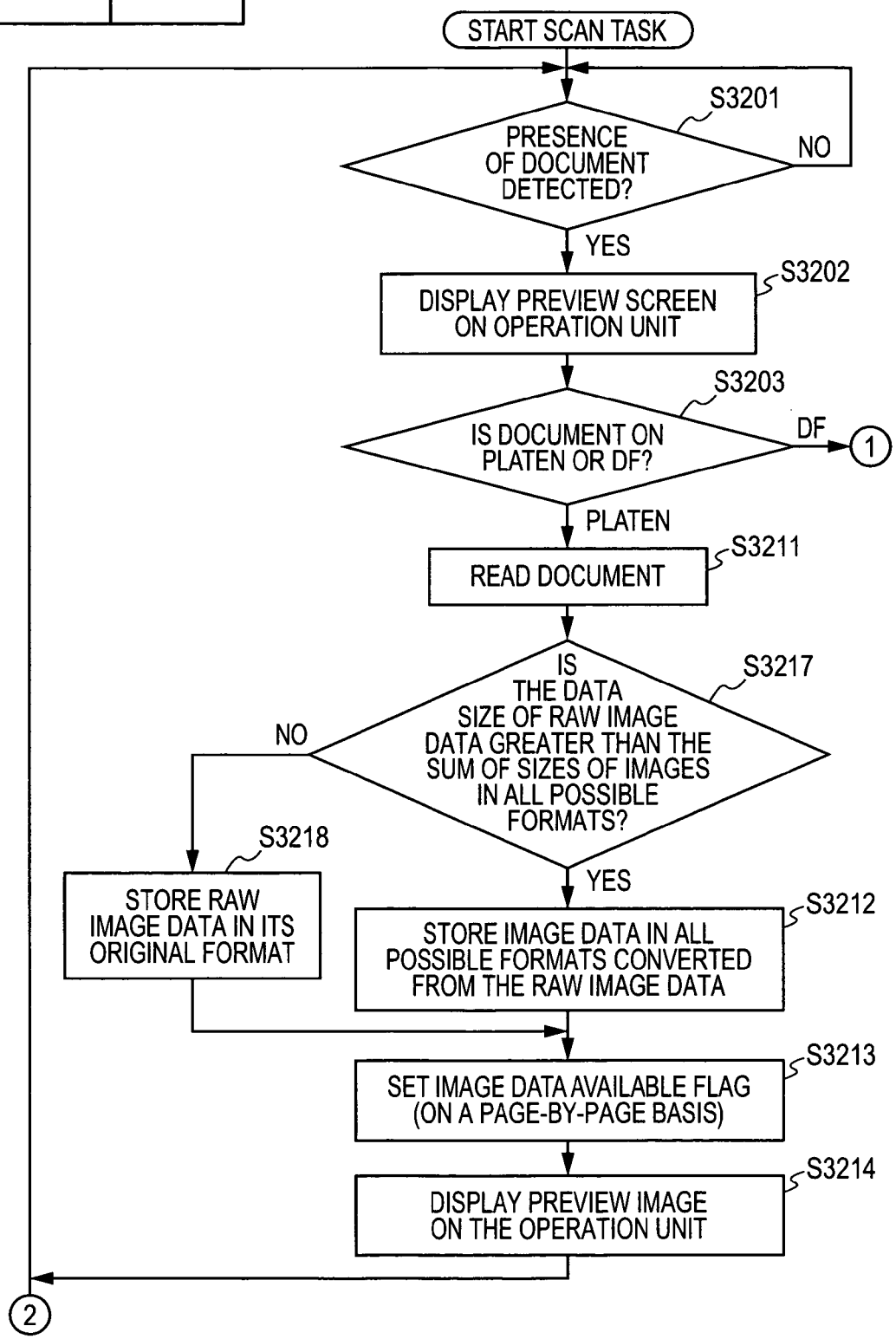

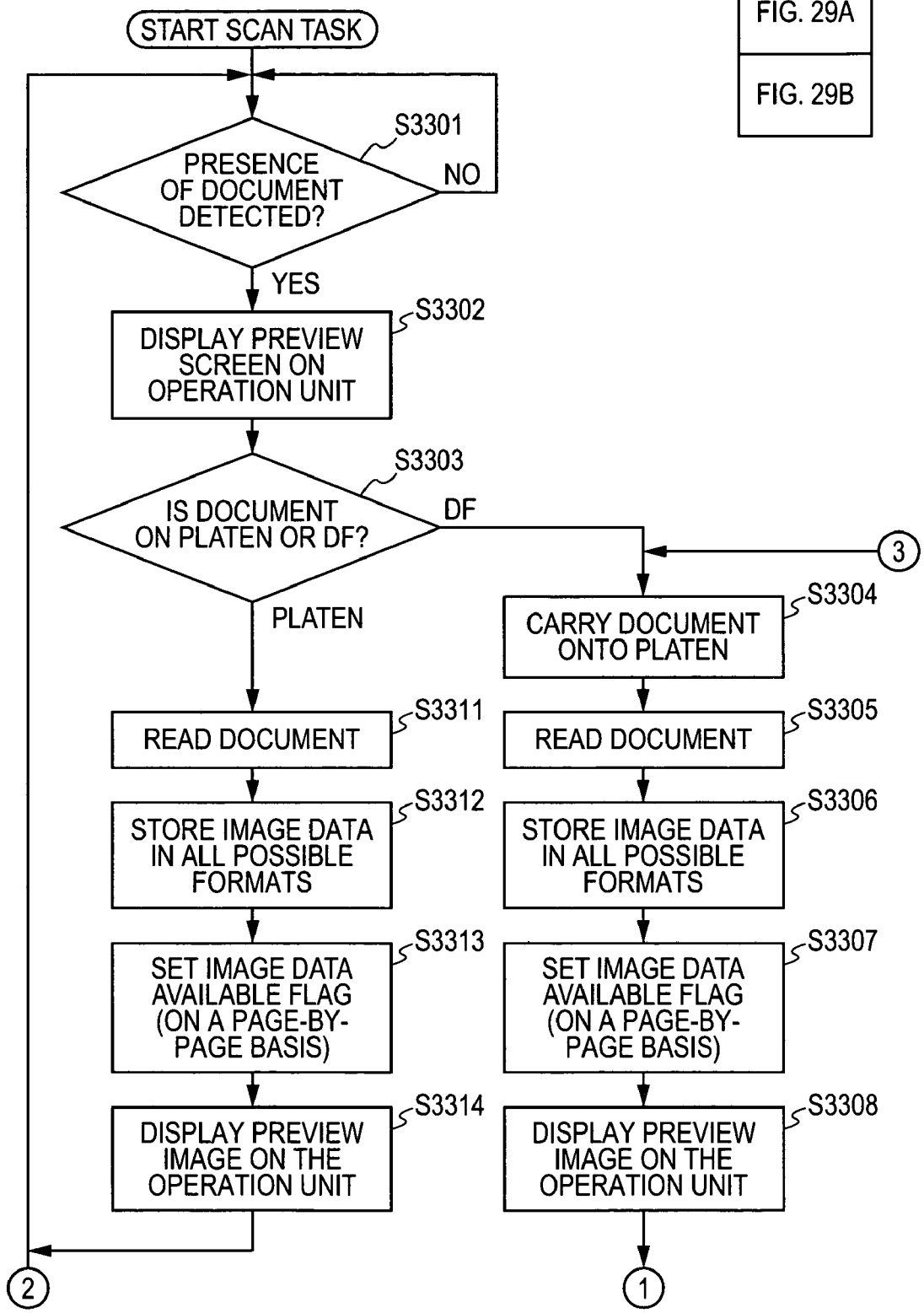

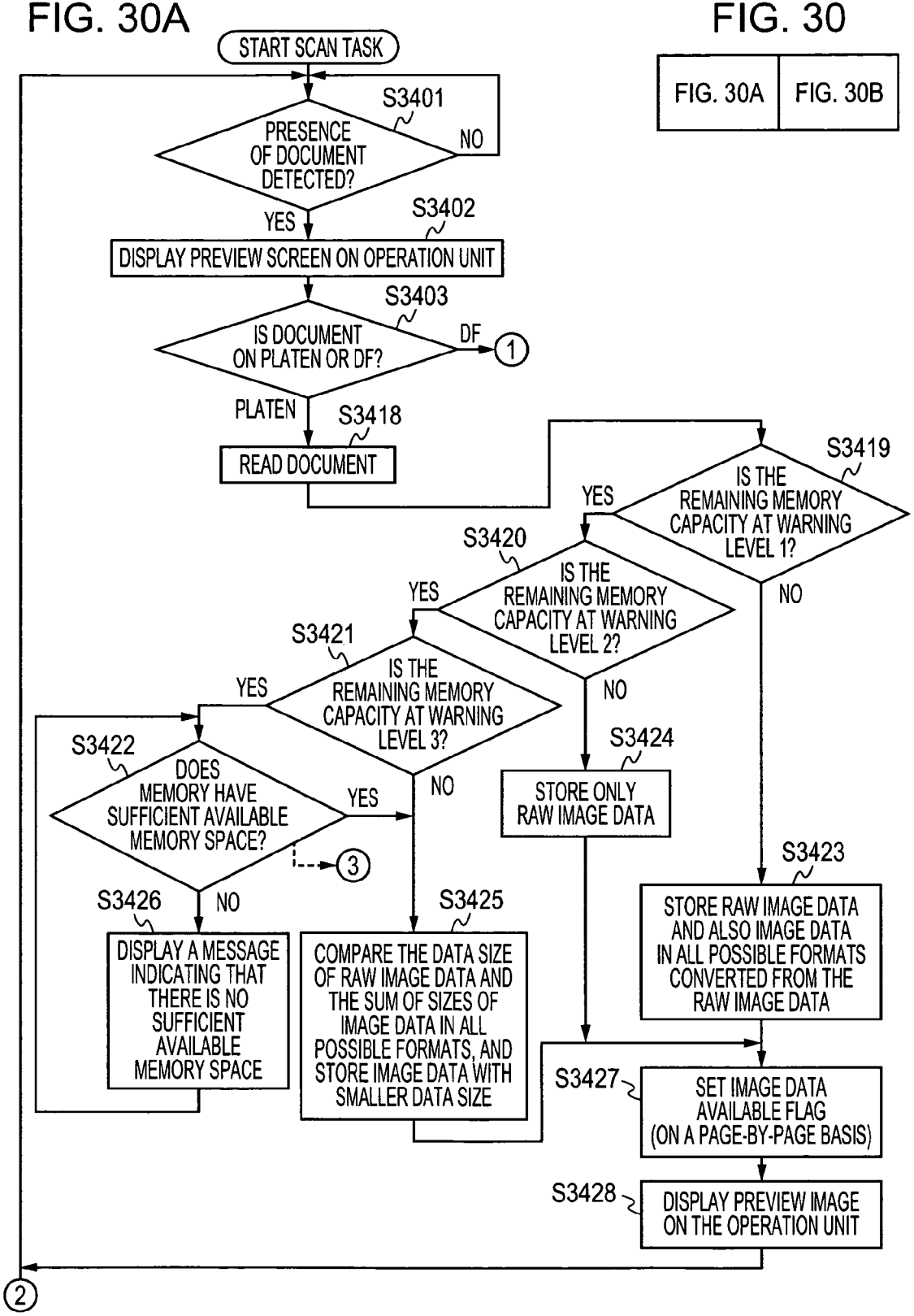

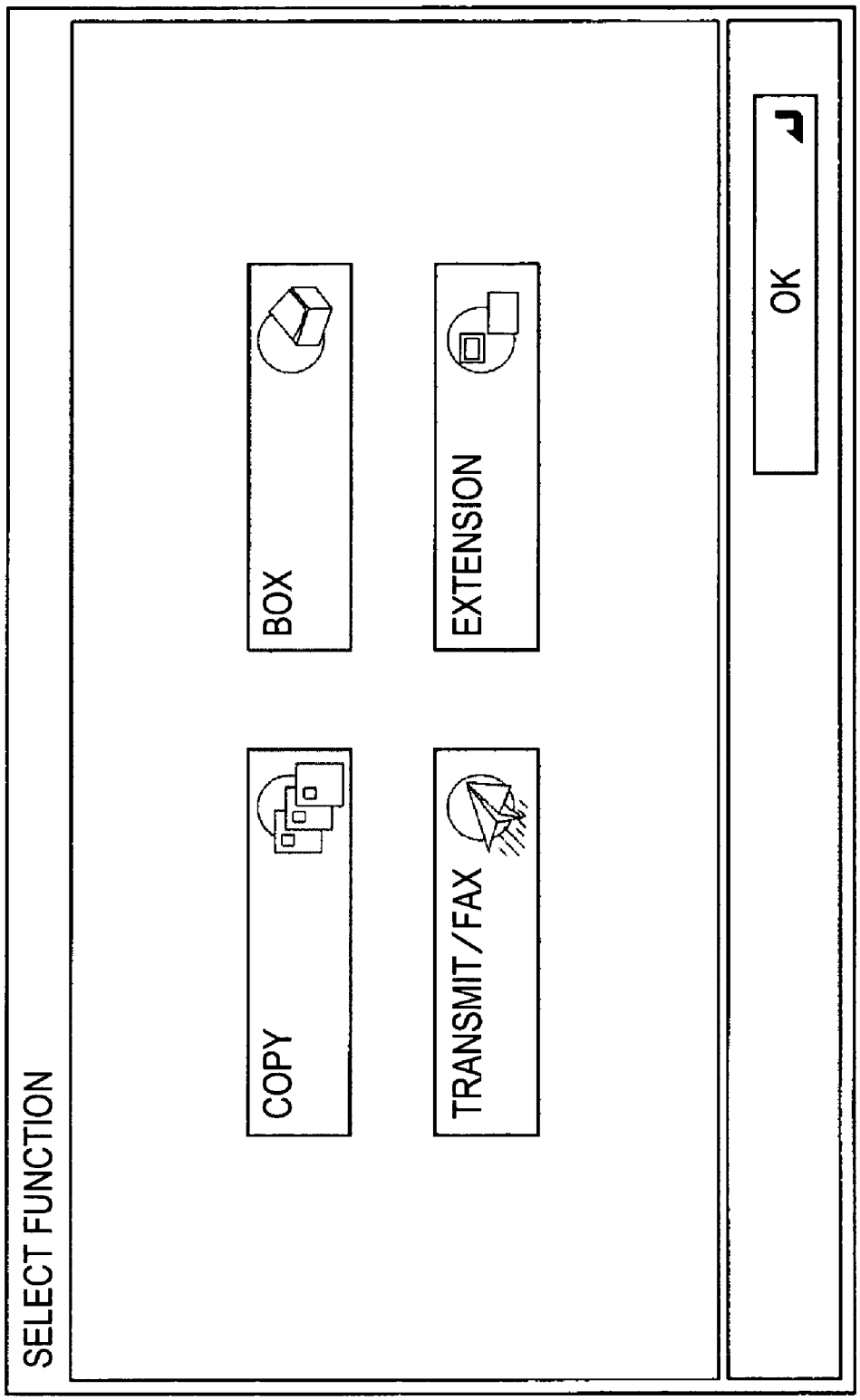

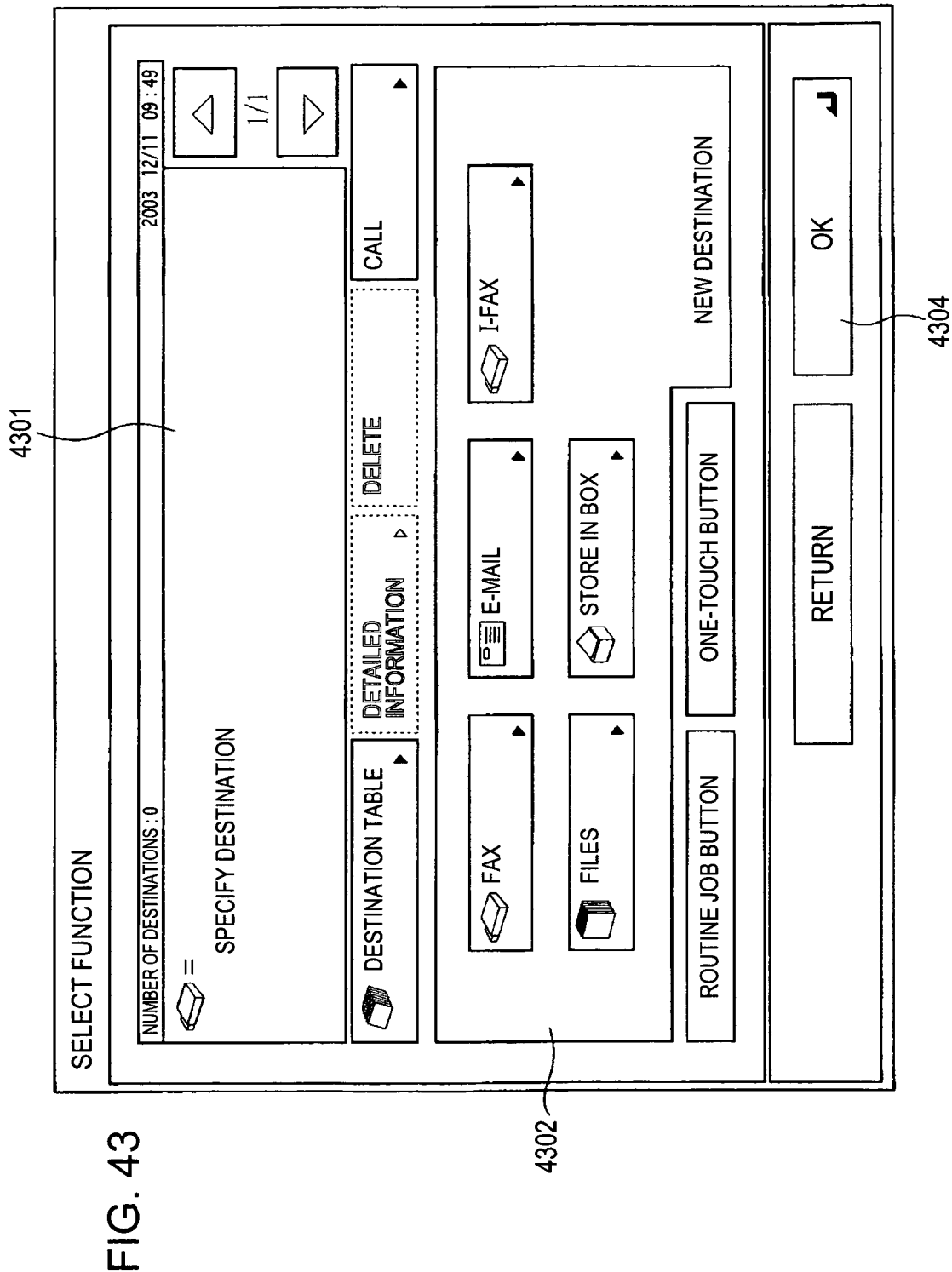

IMAGE FORMING APPARATUS AND METHOD OF CONTROLLING THE SAME

BACKGROUND OF THE INVENTION

1. Field of the Invention

The present invention relates to an image forming apparatus adapted to record image on recording paper in accordance with image data read by a scanner, and also to a method and a program for controlling such an image forming apparatus. More specifically, the present invention relates to an image forming apparatus having at least one of a copying function, an image scanning function, an image transmission function, an image receiving function, and a printing function, and a storing-in-box function, and a method and a program for controlling such an image forming apparatus. The present invention also relates to an image forming apparatus having only a copying function and a method and a program for controlling such an image forming apparatus.

2. Description of the Related Art

In image forming apparatus, there is a need for a technique to reduce the time (FCOT (First Copy Time)) needed for a user to obtain a first output image. Herein, the "output image" refers to an image printed on printing paper in the case of the copying function. In the case of the image transmission function, the "output image" refers to an image transmitted to a destination. The FCOT refers to a time needed to obtain a first copied sheet after a document is set and a copy start button is pressed on an image forming apparatus. The smaller the FCOT, the higher the performance. The FCOT does not necessarily have relation to a copy time, which indicates the performance of how many sheets (with an A4 size, for example) can be copied in an unit time (PPM (pages per minutes)), but the FCOT indicates the initial time needed to start parts needed in the printing operation and thus the FCOT depends on the performance of a controller and other circuits of the image forming apparatus. By analogy to the performance of cars, the FCOT corresponds to the acceleration performance and the copy time corresponds to the maximum possible speed.

To reduce the FCOT, various techniques have been proposed. An example of such techniques is to control a process performed, by an image forming apparatus, on image data acquired via reading of a document. In general, the image forming apparatus reads image data using a reading unit and stores resultant image data in a RAM (Random Access Memory), which is capable of storing data at a high speed but which is expensive. The image data is then transferred to a hard disk which is low in storage cost per bit. When printing is performed, the image data is read from the hard disk and stored in the RAM. The image data stored in the RAM is then transferred to a printer. When a particular condition is met, image data is not stored on the hard disk but is directly transferred to the printer from the RAM to reduce the access time needed to store the image data on the hard disk and improve the FCOT (refer to, for example, Japanese Patent Laid-Open No. 2001-320561).

Another example of a technique (disclosed, for example, in Japanese Patent Laid-Open No. 2002-104695 (corresponding U.S. Pat. No. 6,529,703)) is to control the speed at which to carry printing paper in an image forming apparatus. The image forming apparatus has a photosensitive drum in a printer unit and also has a transfer unit for transferring, to printing paper, a latent image formed on the photosensitive drum by illuminating the photosensitive drum with a laser beam or a light ray emitted by an LED (Light Emitting Diode) or the like. Close to the transfer unit, a registration roller is disposed at an upstream location in a path via which printing paper is carried. The speed at which the printing paper is carried is controlled by the registration roller such that the printing paper is carried to the transfer unit at a higher speed than the speed at which the printing paper is moved when the image is transferred to the printing paper. After the printing paper reaches the transfer unit, the printing paper is moved at a speed at which an image is formed on the printing paper. By controlling the speed of the printing paper in the above-described manner, the total time needed to form the image is reduced.

In another example of a technique (Japanese Patent Laid-Open No. 11-234449), an image forming apparatus performs a reading operation and a printing operation in an asynchronous manner, that is, pre-reading of a document is performed before the printing operation is performed. This makes a multi-job practical. In this technique, when reading of documents is performed, a determination as to whether an automatic operation (of copying, transmission, storing, etc.) is possible is made in a short time even in a case in which a long time is needed to print a large number of copies.

Japanese Patent Laid-Open No. 5-336287 (corresponding U.S. Pat. No. 5,734,799) discloses a technique of displaying a preview image of image data acquired via a reading operation performed by an image forming apparatus. In this technique, the preview image has image quality similar to that of a finally printed image. Japanese Patent Laid-Open No. 2001-296784 discloses a technique in which recording paper is fed by a predetermined amount before a user presses a print start key. More specifically, in this technique, if a user makes setting or performs an operation associated with printing via a user interface before the user presses the start key, feeding of the recording paper is started and the paper is fed by the predetermined amount. That is, part of the printing operation is performed in parallel with the setting operation associated with printing.

In the above-described techniques of reducing the FCOT disclosed in Japanese Patents Laid-Open Nos. 2001-320561, 2002-104695, etc., the time of scanning, storing, reading out, and/or printing image data is reduced.

For example, in the technique disclosed in Japanese Patent Laid-Open No. 2001-320561, the time of storing and reading out image data is reduced. In the technique disclosed in Japanese Patent Laid-Open No. 2002-104695, the speed of moving printing paper to a position in the printer unit at which an image is formed on the printing paper is increased to reduce the time of printing image data. In the technique disclosed in Japanese Patent Laid-Open No. 2001-296784, printing of an image on paper is not started until particular image processing is performed and print data is produced. Therefore, in this technique, the printing operation depends on when the image processing is completed. Although this technique can reduce the FCOT compared with the technique of starting feeding paper after image processing for printing is completed, the FCOT is reduced only by an amount equal to a reduction in the time of feeding paper to the predetermined position, and thus a great reduction in the FCOT is difficult.

A processing sequence of, after settings associated with printing conditions are made, scanning a document to acquire image data of the document and printing an image in accordance with the image data is essential in an analog copying machine in which a latent image of the document is formed on a photosensitive drum using an optical unit.

A typical work flow of a process performed by a user in using a copying function is as follows. To use a multifunction machine (in particular, to use a copying function of the multifunction machine), a user first makes settings via an operation panel, including designation of whether reading should be performed in a single-sided mode or a double-sided mode, designation of whether a finishing process such as stapling or binding should be performed for an output material, designation of a scaling factor (reduction or enlargement), and designation of a layout such as a 2UP or 4UP layout (two or four pages are printed on a single sheet). After completion of the settings, reading of documents is started. Thus, it takes a rather long time before reading is started.

That is, in known image forming apparatus, reading of a document is not started until settings have been completely made and a start key is pressed by a user.

SUMMARY OF THE INVENTION

In view of the above, the present invention provides an image forming apparatus, a method of controlling an image forming apparatus, and a control program, which allow an improvement in productivity. The present invention also provides a method and apparatus for forming an image, which allow a great improvement in productivity such that image processing on image data acquired via scanning is started before a print start key is pressed thereby greatly reducing a period from at a time at which an output command is issued to a time at which an output is actually obtained. The present invention also provides a method and apparatus for forming an image, which allow a great improvement in productivity without producing a problem or without causing inconvenience. More specifically, the present invention provides a technique of starting reading a document before a user determines image processing conditions without causing a possibility that image data obtained via the pre-reading cannot be used in an actual output operation because of a difference in data format from a correct data format that should be used in the output operation and thus reading of the same document must be performed again. If reading of a document is started before a user determines image processing conditions, the following problems can occur. That is, in an image forming apparatus, if reading of a document is started before output conditions are determined, there is a possibility that the data format of image data acquired via the reading of the document is different from a data format that matches an output operation determined by a user after the reading is started. In such a case, it is needed to again read the same document to obtain image data in a correct data format. To prevent the possibility that reading of a document must be performed again, and to make it possible to correctly perform a specified output operation using image data obtained via pre-reading, it is necessary to store raw image data or image data converted in all formats having a possibility of being employed in the output operation. However, depending on the physical resources such as a storage capacity of a storage device for storing image data, there is a possibility that it is impossible to store image data in the form of raw image data or image data converted in all formats having a possibility of being used in an output operation. Thus, pre-reading of a document by the image forming apparatus is limited by the physical resources. If pre-reading of a document is performed in a mode because of such a limitation, there is a possibility that image data acquired via the pre-reading does not meet requirements needed in a specified process. In such a case, it is needed to again read the same document. Also in a case in which image data is not stored in all formats having a possibility of being employed, there is a possibility that it is needed to again read the same document. Thus, the present invention also provides a technique to avoid an occurrence of the necessity for re-reading.

In accordance with an aspect of the present invention, an image output method includes the steps of: reading image data in a predetermined format; outputting an image based on the read image data according to a first output method; outputting an image based on the read image data according to a second output method; and inputting a parameter for a process of the read image data in parallel to the reading of the image data, wherein the predetermined format is adaptable to the first output method and the second output method.

In accordance with another aspect of the present invention, an image forming apparatus includes a scanner unit adapted to read a document, an operation unit adapted to accept setting of a processing condition for image data of the document read by the scanner unit and display the accepted setting, an image conversion unit adapted to convert the image data in accordance with the processing condition specified via the operation unit, and an image output unit adapted to output the image data converted by the image conversion unit, the image forming apparatus further including: first reading means for performing the reading process by the scanner unit before the setting via the operation unit is completed; storage means for converting the image data read by the first reading means into at least one or more image formats selectable in outputting of the image and store the converted image data in the one or more image formats; control means for controlling storing of the image data such that after the setting via the operation unit is completed, the converted image data in an image format that meets the processing condition set via the operation unit is retained and the image data in the other image formats that do not meets the processing condition set via the operation unit are discarded; and output means for outputting the converted image data retained by the control means to the image output unit.

In accordance with another aspect of the present invention, an image forming apparatus includes a scanner unit adapted to read a document, an operation unit adapted to accept setting of a processing condition for image data of the document read by the scanner unit and display the accepted setting, an image conversion unit adapted to convert the image data in accordance with the processing condition specified via the operation unit, and an image output unit adapted to output the image data converted by the image conversion unit, the image forming apparatus further including: first reading means for performing the reading of the document by the scanner unit before the setting via the operation unit is completed; storage means for storing the image data read by the first reading means into a storage area; control means for controlling storing of the image data such that after the setting via the operation unit is completed, the image data stored in the storage area by the storage means is converted into image data in image formats selectable in outputting of the image of the image data, the converted image data in the image formats are retained, and the original image data stored in the storage area by the storage means is deleted; and output means for outputting the converted image data retained by the control means to the image output unit.

In accordance with another aspect of the present invention, an image forming apparatus is adapted to read a document image, perform image processing corresponding to an image output mode on the image data acquired by reading the document image, and output the image data, subjected to the image processing, in the image output mode, the image forming apparatus including: setting means for making settings including an input setting associated with reading of the document and corresponding to the image output mode; start command receiving means for receiving an image output start command issued by a user; and control means for controlling the reading of the document such that the reading of the document is started after the input setting by the setting means is completed and before the start command receiving means receives the image output start command.

Further features of the present invention will become apparent from the following description of exemplary embodiments with reference to the attached drawings.

BRIEF DESCRIPTION OF THE DRAWINGS

FIG. 1A is a timing chart of a known image processing sequence; while FIG. 1B is a timing chart of an exemplary image processing sequence according to an embodiment of the present invention.

FIG. 13 is a flow chart of an exemplary process of, in a user-setting operation, selecting a second reading mode or a first reading mode, according to an embodiment of the invention.

FIGS. 26A, 26B1 and 26B2 are flow charts showing an exemplary process of storing image data in a general-purpose format (raw image data) according to an embodiment of the present invention.

FIGS. 27A, 27B1 and 27B2 are flow chart showing an exemplary process of storing image data in selectable image formats according to an embodiment of the present invention.

FIGS. 28A and 28B are flow charts showing an exemplary process in which image data is directly stored in a general-purpose format or image data is stored after it is converted into all formats having a possibility of being used in an output operation, wherein the manner of storing image data is automatically selected.

FIGS. 29A and 29B are flow charts showing an exemplary process including steps of, when there is no sufficient available memory space, displaying a message indicating that there is no sufficient available memory space, and stopping the process, according to an embodiment of the present invention.

FIGS. 30A and 30B are flow charts showing an exemplary process of storing image data such that the format of the image data is changed depending on the level of a remaining available memory space, according to an embodiment of the present invention.

FIG. 41 shows an example of a screen for selecting a mode of outputting an image of a document read in the process shown in FIG. 39.

FIG. 43 shows an example of a screen for setting outputting conditions, displayed when "TRANSMIT" is selected as the output mode.

DESCRIPTION OF THE EMBODIMENTS

Figure 2:
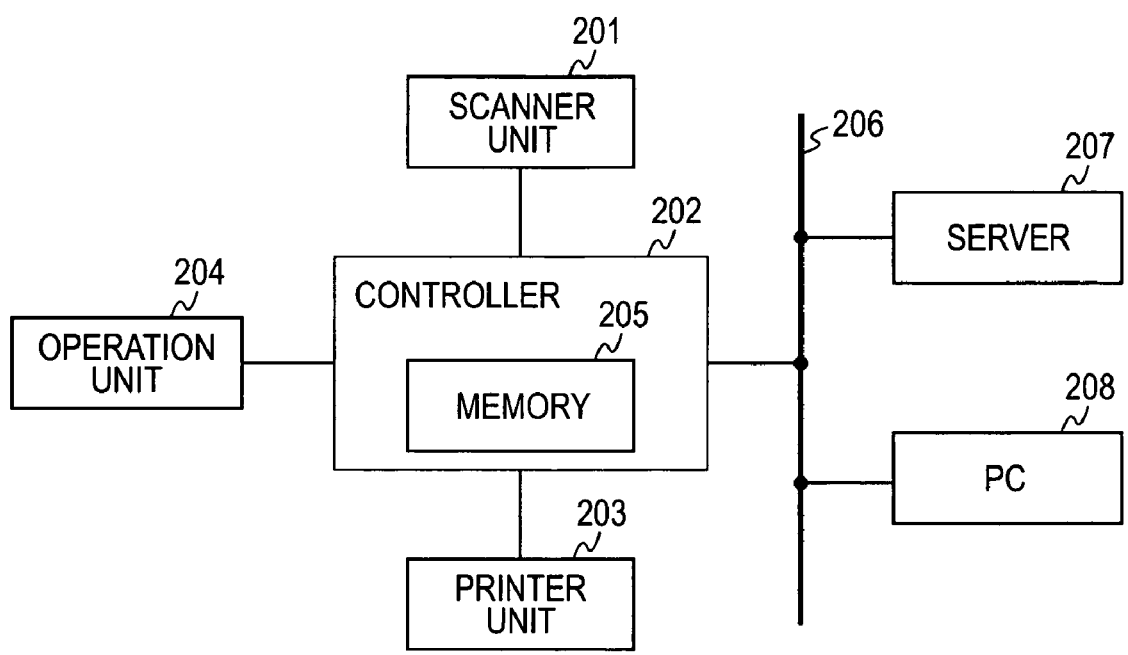
FIG. 2 is a schematic block diagram of an exemplary image forming apparatus according to an embodiment of the present invention.

The present invention is described in further detail below with reference to embodiments in conjunction with the accompanying drawings. In the drawings, similar parts are denoted by similar reference numerals, and duplicated explanations thereof are not given.

First Exemplary Embodiment

A typical work flow of a process performed by a user in using a copying function is as follows. First, the user specifies various conditions via an operation panel. For example, the user sets a document read mode to specify whether only one side or both sides of each document should be read. The user also sets conditions associated with outputting of an image. More specifically, the user makes designation of whether a finishing process such as stapling or binding should be performed for an output material, designation of a scaling factor (reduction or enlargement), and/or designation of a layout such as a 2UP or 4UP layout (two or four pages are printed on a single sheet). After completion of the settings, reading of documents is started. Thus, it takes a rather long time before reading is started. That is, reading of a document is not started until settings have been completely made and a start key is pressed by the user.

FIG. 1A is a diagram showing a known image forming sequence. After the user inputs printing conditions via the operation panel, if the user presses a start key, the image scanner starts reading of a document. The image forming apparatus stores image data obtained by reading the document in a storage medium such as a memory. The image data stored in the storage medium is transmitted to a printer and printed. In the known technique of forming an image, as described above, the process of reading a document is started when the start key is pressed (hereinafter, this sequence will be referred to as the "first reading mode"). That is, the first reading mode is a mode which reads the document, after inputting the parameter with respect to the process of the read image data.

FIG. 1B is a diagram showing an exemplary image forming sequence according to a first embodiment of the present invention. In this sequence, reading of a document is performed before the start key is pressed (hereinafter, this sequence will be referred to as the "second reading mode"). That is, the second reading mode is a mode which performs input of the parameter with respect to the process of the read image data in parallel to the reading of the document. The sequence is described in further detail below.

In FIGS. 1A and 1B, a vertical axis represents processes or operations performed by various units or devices. Additionally, USER denotes an operation performed by the user. SCANNER denotes an operation performed by the image scanner to read a document. MEMORY denotes an input/output operation performed to temporarily store image data in the memory. PRINTER denotes an operation performed by the printer to form an image on printing paper in accordance with the image data. In FIGS. 1A and 1B, the horizontal axis indicates the timing of the operations described above.

In the first reading mode shown in FIG. 1A, first in USER, the user sets a document on a document glass plate or a document feeder (at a point of time 101). The user then specifies the number of copies, a color mode, a finishing process, etc., by operating a UI (User Interface) panel (in a period 121). After all conditions are specified, the user presses a key to issue a print command or a print data transmission command (at a point of time 102). In SCANNER, in response to pressing of the key (at the point of time 102), the image scanner reads the document (in a period 122). In the case of copying using the document feeder, document sheets are carried one by one from the document feeder to the document glass plate before reading is performed. In MEMORY, after a slight delay from the start of reading the document, input image processing is started and resultant image information is stored in the memory (in a period 123). If the reading of the document and the input image process are completed (at a point of time 103), then, in MEMORY, the image data is read and an output image process is performed to produce image data used to form an image on printing paper (in a period 124). The image data produced in the output image process is immediately output (transferred) to the printer (in a period 125). In PRINTER, in synchronization with the timing of transferring printing paper, the printer forms a permanent visual image on the printing paper in accordance with the received image data (in a period 126), and ejects the resultant printing paper to the outside of the printer (at a point of time 104). In the sequence in the first reading mode described above, the FCOT is equal to the period from the point of time 102 to the point of time 104.

The sequence in the second reading mode according to the first embodiment of the invention is described below with reference to the timing chart shown in FIG. 1B. In the sequence in the second reading mode, in USER, a user sets a document on a document glass plate or a document feeder (at a point of time 109). In SCANNER, the image scanner reads the document (in a period 132). In the case of copying using the document feeder, document sheets are carried one by one from the document feeder to the document glass plate before reading is performed. In MEMORY, after a slight delay from the start of reading the document, input image processing is started and resultant image data is stored in the memory (in a period 133) and the storing of resultant image data is completed at a point of time 111.

In USER, the user specifies the number of copies, a color mode, a finishing process, etc., by operating the operation panel in a period 131 after the point of time 109 at which the document is set. After all conditions are specified, the user presses the start key to issue a copy start command (at a point of time 110). If the start key is pressed (at the point of time 110), then, in MEMORY, the image data is read from the memory and an output image process is performed on the image data read from the memory to produce image data used to form an image on printing paper (in a period 134). The image data produced in the output image process is immediately transferred to the printer (in a period 135). In PRINTER, in synchronization with the timing of transferring printing paper, the printer forms a permanent visual image on the printing paper in accordance with the received image data (in a period 136), and ejects the resultant printing paper to the outside of the printer (by a point of time 112). In the sequence in the second reading mode described above, the FCOT is equal to the period from the point of time 110 to the point of time 112. The FCOT in the sequence in the second reading mode is shorter by a period denoted by 137 in FIG. 1B than the FCOT in the sequence in the first reading mode.

The image forming apparatus according to the first embodiment is described in further detail below with reference to FIG. 2 and other figures. FIG. 2 is a block diagram showing a general structure of the image forming apparatus. In this specific example, the image forming apparatus is a digital multifunction machine having a copying function, a printing function, a facsimile function, etc. In the image forming apparatus according to the first embodiment shown in FIG. 1B, a scanner unit 201 serves to read a document. A controller 202 controls the process of performing image processing on image data acquired via scanning performed by the scanner unit 201 and storing resultant image data in the memory 205. An operation unit 204 is used to set various printing conditions for an image read by the scanner unit 201. The image data read by the scanner unit 201 is stored in memory 205. A printer unit 203 forms a visual image on recording paper in accordance with the image data read from the memory 205 and in accordance with the printing conditions specified via the operation unit 204. The image forming apparatus is connected via a network 206 to a server 207 that manages image data, and also to a personal computer (PC) 208 that issues a print command to the image forming apparatus.

Figure 3:
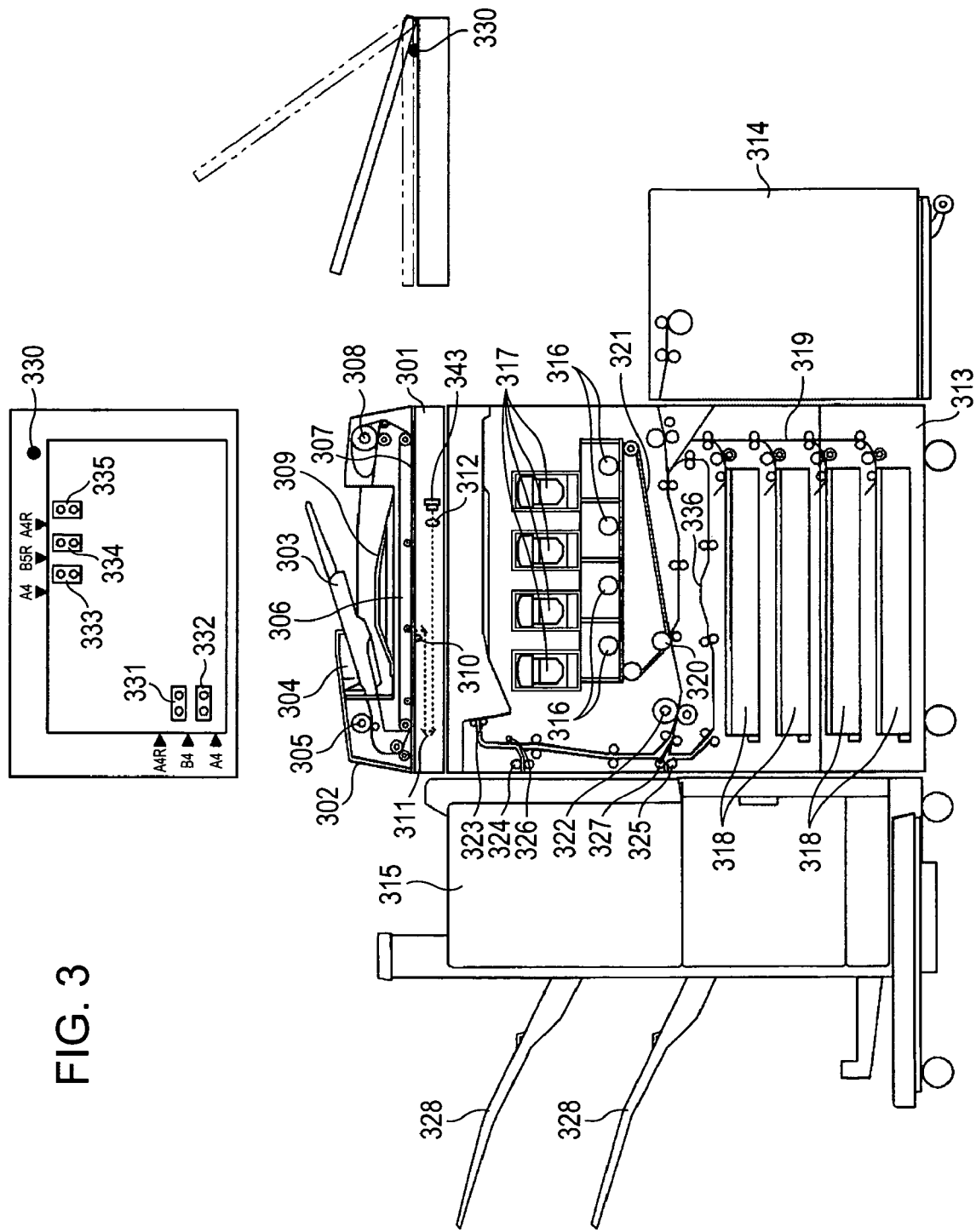
FIG. 3 is a cross-sectional view of the image forming apparatus according to an embodiment of the present invention.

FIG. 3 is a cross-sectional view of the image forming apparatus. Referring to FIG. 3, the structure of the image forming apparatus shown in FIG. 2 is described in more detail below. The image forming apparatus has the copying function, the printing function, and the facsimile function. As shown in FIG. 3, the image forming apparatus according to the first embodiment includes a printer 313 including a scanner 301, a document feeder (DF) 302, a four-color drum, a paper feed deck 314 and a finisher 315. The scanner 301 corresponds to the scanner unit 201 shown in FIG. 2, and the printer 313 corresponds to the printer unit 203 shown in FIG. 2.

The reading operation performed mainly by the scanner 301 is described below. In the mode in which reading is performed on a document directly placed on the document glass plate 307, a user sets the document on the document glass plate 307 and closed the DF 302. An open/close sensor 330 detects the closing of the document glass plate 307, and document size sensors 331 to 335 disposed in the housing of the scanner 301 detect the document size. A light source 310 illuminates the document over an area determined based on the detected document size, and a CCD (Charge Coupled Device) 343 senses light reflected from the document via a reflecting plate (mirror) 311 and a lens 312 thereby reading the image of the document. The controller 202 of the image forming apparatus converts the document image data read by the CCD 343 into a digital signal and performs image processing to convert the digital image signal into a laser recording signal. The resultant recording signal is stored in a memory 205 in the controller 202. The memory 205 will be described in further detail later with reference to FIG. 4.

In the mode in which a document is set on the DF 302, the user puts a document in a face-up manner on a tray of a document set part 303 of the DF 302. If a document sensor 304 detects that the document is put, a document feed roller 305 and a carrying belt 306 are rotated to feed the document onto the document glass plate 307. If the document is set at a correct position on the document glass plate 307, the document image is read in a similar manner to the mode in which the document is directly put on the document glass plate 307, and a resultant produced recording signal is stored in the memory 205 of the controller 202.

After the reading process is completed, the carrying belt 306 is rotated again to carry the document to the right, as seen in the cross-sectional view shown in FIG. 3, in the image forming apparatus, and the document is ejected onto a document output tray 309 via a carrying roller 308 located close to a paper exit. In a case in which a plurality of document sheets are placed on the DF 302, when a document sheet is carried from the document glass plate 307 to the right as seen in the cross-sectional view of the image forming apparatus shown in FIG. 3, a next document sheet fed via the paper feed roller 305 from the left side as seen in the cross-sectional view of the image forming apparatus shown in FIG. 3, so that documents sheets are read successively. The operation of the scanner 301 has been described above.

Now, a printing operation performed mainly by the printer 313 is described below. The recording signal (image data to be printed) temporarily stored in the memory 205 (described later with reference to FIG. 4) in the controller 202 is transferred to the printer 313. In the printer 313, the recording signal is converted by a laser recording unit into four recording laser beams of yellow, magenta, cyan, and black. Photosensitive drums 316 are respectively illuminated with the recording laser beams. As a result, electrostatic latent images are formed on the respective photosensitive drums 316. Furthermore, in the printer 313, the electrostatic latent images formed on the respective photosensitive drums 316 are developed with toner supplied from toner cartridges 317 and the electrostatic latent images are converted into visual toner images. The toner images are first-transferred to an intermediate transfer belt 321. The intermediate transfer belt 321 rotates in a clockwise direction as seen in FIG. 3 whereby the toner image on the intermediate transfer belt 321 is carried to a second transferring position 320. In synchronization with the rotation of the intermediate transfer belt 321, recording paper is carried to the second transferring position 320 from a paper cassette 318 or a paper feed deck 314 via a paper carrying path 319, and the toner image is transferred from the intermediate transfer belt 321 to the recording paper.

The toner image on the recording paper is fused by a pressure and heat applied by a fixing unit 322. Thereafter, the recording paper is carried via a paper ejection path to a face-down center tray 323, an output slot 324 of a finisher, or a face-up side tray 325. Note that the side tray 325 is available only when the finisher 315 is not attached. To carry the recording paper to a correct paper output slot, the carrying path is properly switched by flappers 326 and 327. In the case of double-sided printing, after recording paper has passed through a fixing unit 322, the flapper 327 switches the paper carrying path so that the recording paper is carried back downward to the second transfer position 320 via a double-sided paper path 336, and printing on the second side is performed.

An operation performed by the finisher 315 is described below. The finisher 315 performs a post process specified by a user on printed paper. More specifically, the finisher 315 has capabilities of performing stapling (at one or two positions), punching (two or three holes), saddle stitching, etc. The image forming apparatus shown in FIG. 3 includes two output trays 328. After the recording paper has passed through the output slot 324 of the finisher 315, the recording paper is carried to one of the output trays 328 depending on the function (the copying function, the printing function, or the facsimile function) specified by the user. As for the printer 313, an arbitrary type of printer, such as a 4-drum color printer, 1-drum color printer, or a monochrome printer, may be used. When the image forming apparatus shown in FIG. 3 is used to perform printing, various conditions, such as a color mode (a monochrome mode or a full color mode), a paper size, a layout (2UP, 4UP, N-UP, etc.), a double-sized mode, stapling condition, punching conditions, binding conditions, conditions associated with insertion paper or cover pages, etc., can be specified by properly setting a printer driver. There is no particular restriction on the printing method, and various printing methods such as an electro-photographic printing method, an ink-jet printing method, etc., can be used.

Figure 4:
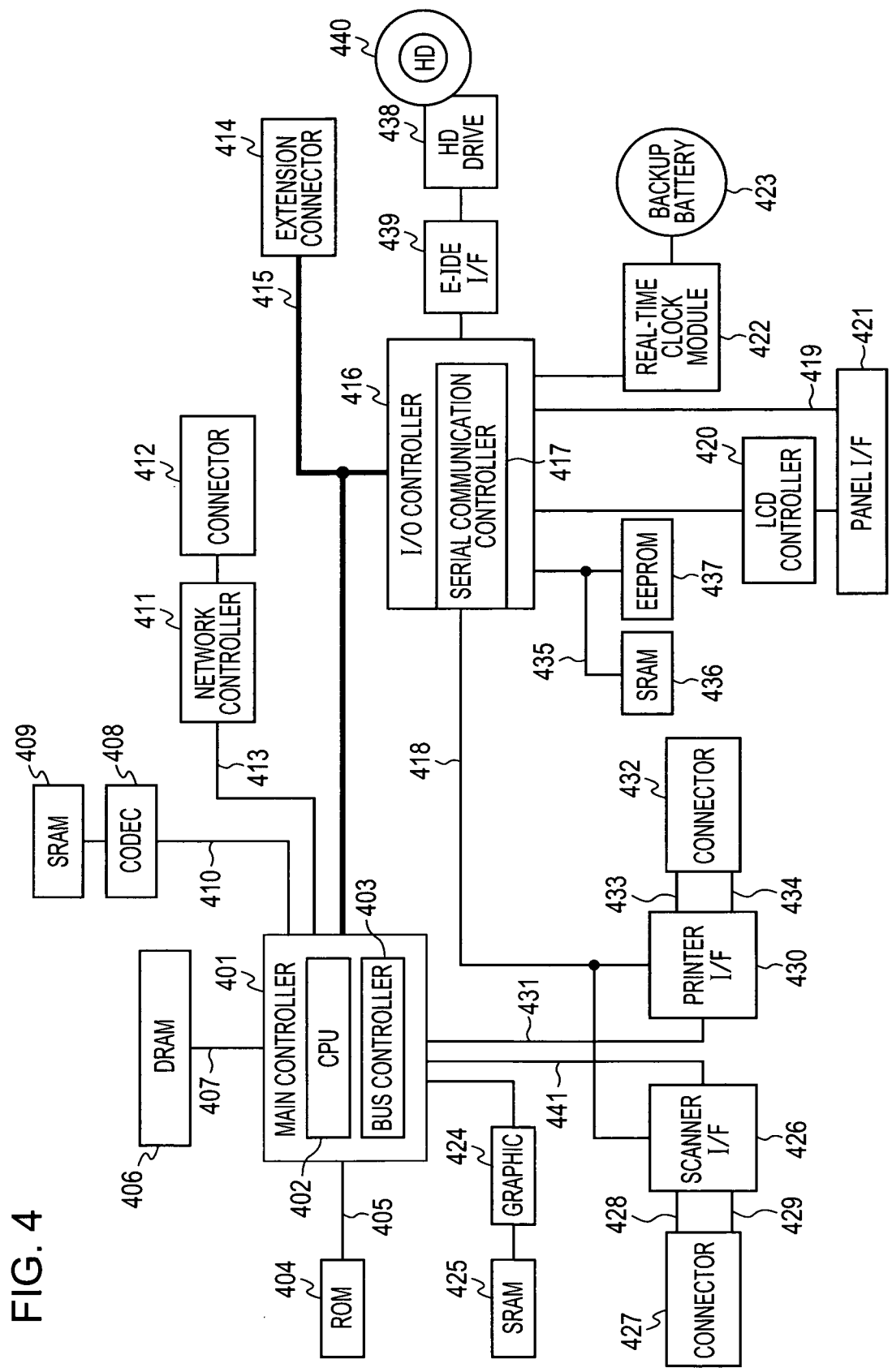
FIG. 4 is a block diagram showing an exemplary hardware structure of a controller according to an embodiment of the present invention.

FIG. 4 shows an exemplary hardware structure of the controller 202 of the image forming apparatus shown in FIGS. 2 and 3. The controller 202 controls the scanner unit, the printer unit, the network interface circuit, and other parts of the image forming apparatus according to the first embodiment. The details of the hardware structure of the controller 202 are described below with reference to FIG. 4.

A main controller 401 mainly includes a CPU (Central Processing Unit) 402, a bus controller 403, and various interface controllers. The CPU 402 and the bus controller 403 control the operation over the entire image forming apparatus. The CPU 402 operates in accordance with a program read from a ROM (Read Only Memory) 404 via a ROM interface circuit 405. The program includes an operation program to interpret PDL (Page Description Language) code data received from the PC (Personal Computer) and convert the PDL code data into raster image data. The CPU 402 performs the conversion of PDL code data in accordance with this operation program. The bus controller 403 controls of inputting or outputting of data via various interface circuits. When a competition occurs among data to be transmitted via the bus, the bus controller 403 arbitrates the competition. The bus controller 403 also controls DMA (Direct Memory Access) data transmission.

A DRAM (Dynamic RAM) 406 is connected to the main controller 401 via a DRAM interface circuit 407, and is used as a work area by the CPU 402 or an area for storing image data.

A codec 408 compresses the raster image data stored in the DRAM 406. Conversely, the codec 408 also decompresses compressed code data into raster image data. The compression may be performed based on various coding methods, such as an MH (Modified Huffman) method, an MR (Modified READ) method, an MMR (Modified Modified READ) method, a JBIG (Joint Bi-level Image Experts Group) method, and a JPEG (Joint Photographic Experts Group) method. An SRAM (Static RAM) 409 is a battery-backed memory capable of retaining stored content even after a main power supply for the image forming apparatus is turned off.

The SRAM 409 is used as a temporary work area by the codec 408. The codec 408 is connected to the main controller 401 via an interface circuit 410. Transferring of data between the codec 408 and the DRAM 406 is performed by the DMA transmission method under the control of the bus controller 403.

A graphic processor 424 performs rotation, magnification, color space conversion, binarization, etc., on raster image data stored in the DRAM 406. An SRAM 425 is a battery-backed memory capable of retaining stored content even after a main power supply for the image forming apparatus is turned off. The SRAM 425 is used as a temporary work area by the graphic processor 424. The graphic processor 424 is connected to the main controller 401 via an interface circuit. Transferring of data between the graphic processor 424 and the DRAM 406 is performed by the DMA transmission method under the control of the bus controller 403.

A network controller 411 is connected to the main controller 401 via an interface circuit 413 and is connected to an external network via a connector 412.

An extension connector 414 for a connection with an extension board and an input/output controller 416 are connected to a general-purpose high-speed bus 415. An example of a bus usable as the general-purpose high-speed bus 415 is a PCI (Peripheral Component Interconnect) bus. The input/output controller 416 includes a two-channel asynchronous serial communication controller 417 for transmitting or receiving a control command to or from CPUs of the scanner unit 201 and the printer unit 203. The input/output controller 416 is connected to a scanner interface circuit 426 and a printer interface circuit 430 via an input/output bus 418.

A panel interface circuit 421 includes an interface circuit that is connected to an LCD (Liquid Crystal Display) controller 420 and is used to display information on an LCD screen disposed on the operation unit 204, and also includes a key input interface for interfacing with hard keys and touch panel keys. The operation unit 204 includes an LCD, a touch panel input device disposed on the surface of the LCD, and a plurality of hard keys. A signal input via the touch panel or a hard key is transmitted to the CPU 402 via the panel interface circuit 421, and image data received via the panel interface circuit 421 is displayed on the LCD. In addition to the image data, functions available in the operation of the image forming apparatus according to the first embodiment are also displayed on the LCD. The details of the operation screen according to the first embodiment will be described later with reference to FIGS. 6 to 10.

A real-time clock module 422 has a function of updating/storing a date and time managed in the image forming apparatus and is backed up by a backup battery 423. An E-IDE (Enhance Integrated Drive Electronics) interface circuit 439 is used to connect an external storage device. In the present embodiment, a hard disk drive 438 is connected to the image forming apparatus via this interface circuit 439 so that image data can be stored on a hard disk 440 and image data can be read from the hard disk 440. A connector 427 and connector 432 are respectively connected to the scanner unit 201 and the printer unit 203, and the connector 427 and the connector 432 respectively include asynchronous serial interfaces (428 and 433) and video interfaces (429 and 434).

The scanner interface 426 is connected to the scanner unit 201 via the connector 427 and is also connected to the main controller 401 via a scanner bus 441. The scanner interface 426 has a capability of performing pre-processing on image data received from the scanner unit 201 before it is transferred to the main controller 401. The scanner interface 426 also has a capability of outputting to the scanner bus 441 a control signal generated based on a video control signal received from the scanner unit 201. Transmission of data to the DRAM 406 via the scanner bus 429 is controlled by the bus controller 403.

The printer interface 430 is connected to the printer unit 203 via the connector 432 and also is connected to the main controller 401 via a printer bus 431. The printer interface 430 has a capability of performing pre-processing on image data output from the main controller 401 before it is transferred to the printer unit 203. The printer interface 430 also has a capability of outputting to the printer bus 431 a control signal generated based on a video control signal received from the printer unit 203. The transmission of raster image data stored in the DRAM 406 to the printer unit 203 is controlled by the bus controller 403 such that the data is DMA-transferred to the printer unit 203 via the printer bus 431 and the video interface 434.

An SRAM 436 is a battery-backed memory capable of retaining stored content even after a main power supply for the image forming apparatus is turned off and is connected to the input/output controller 416 via a bus 435. The SRAM 436 is used a temporary work area by the input/output controller 416. An EEPROM (Electronically Erasable and Programmable Read Only Memory) 437 is connected to the input/output controller 416 via the bus 435. Fixed control data used by the input/output controller 416 is stored in the EEPROM 437. The data stored in the EEPROM 437 can be electrically erased and updated using a ROM writer or the like.

Figure 5:
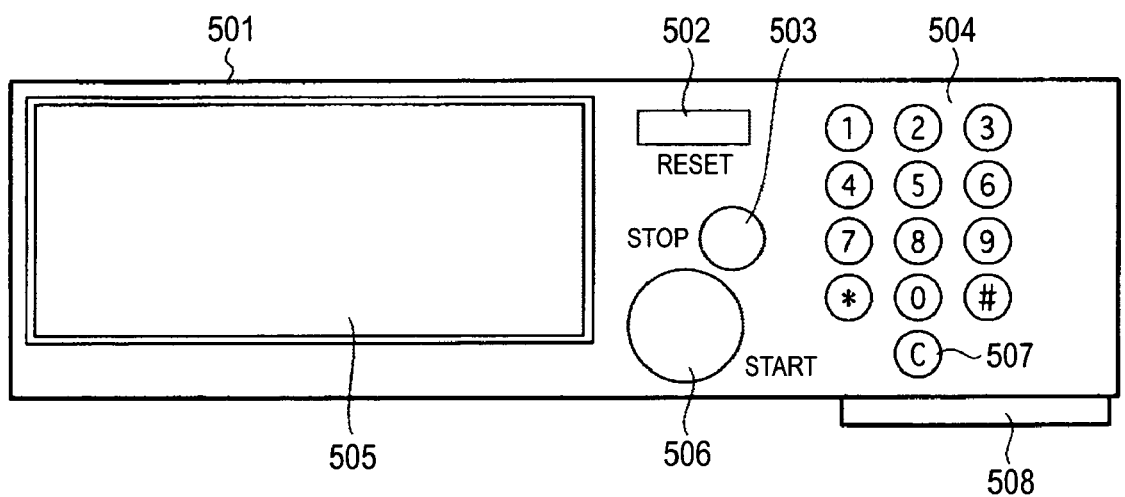
FIG. 5 is a diagram showing an exemplary hardware structure of an operation panel according to an embodiment of the present invention.

The operation unit 204 for setting various printing conditions in the image forming apparatus according to the first embodiment is now herein described below. FIG. 5 shows an exemplary hardware structure of the operation panel 501 of the operation unit 204 of the image forming apparatus. The operation unit 204 is connected to the panel interface 421 described above with reference to FIG. 4.

Figure 6:
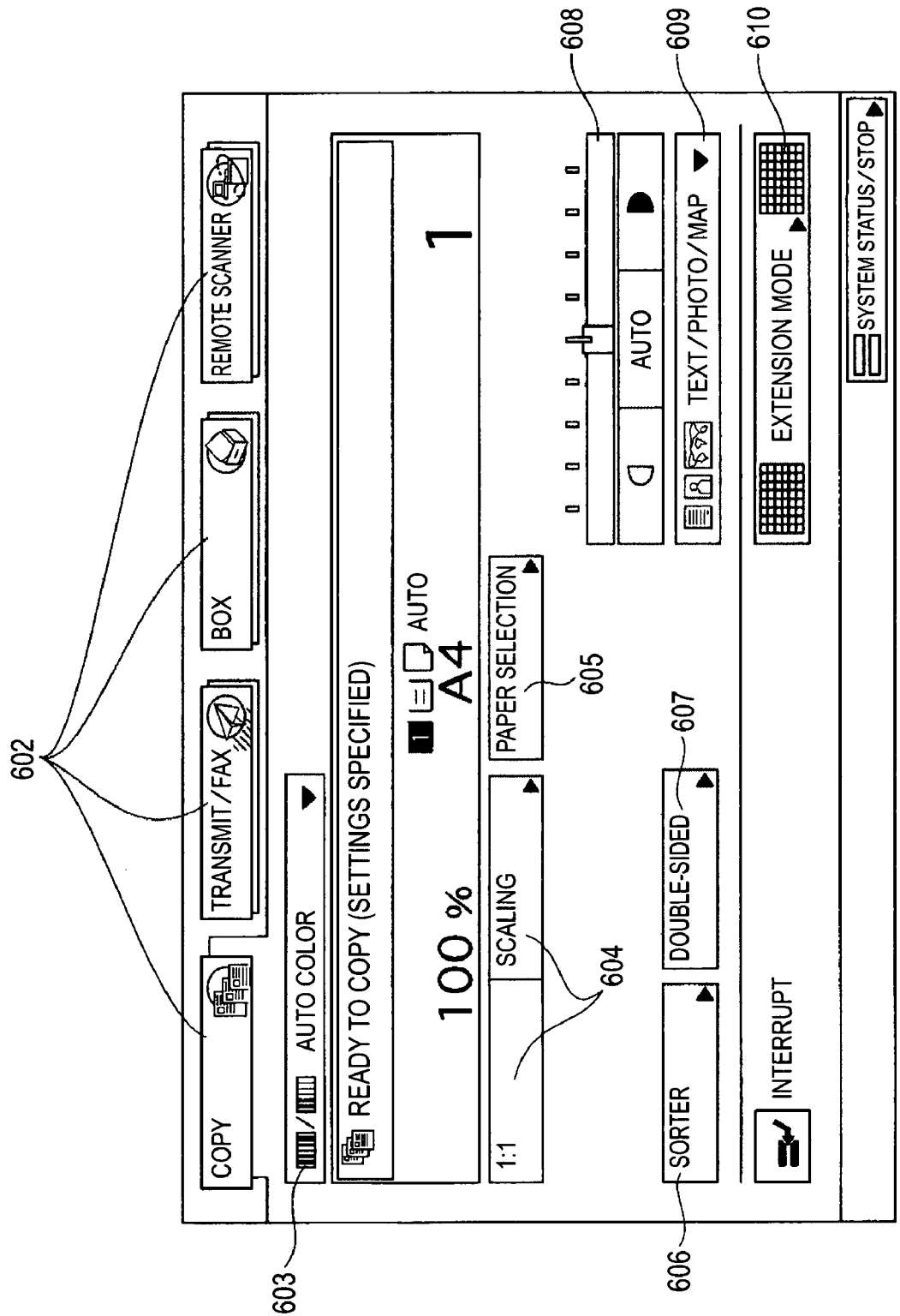
FIG. 6 shows an example of a screen (basic screen) displayed on an operation panel according to an embodiment of the present invention.

In FIG. 5, a reset key 502 is used to reset a value set by a user. A stop key 503 is used to stop a job being processed. A ten-key pad 504 is used to input numeric data. On an operation screen 505 of the touch panel type, a screen such as that shown in FIG. 6 is displayed. The operation screen 505 has a large number of touch-panel buttons used to perform various kinds of setting. A start key 506 is used to start a job such as reading of a document. A clear key 507 is used to clear setting. A User Setting 508 is used to set the operation mode to a mode (user setting mode) in which a user is allowed to make particular settings.

FIG. 6 shows an example of a screen (basis screen) displayed on the operation panel of the operation unit 204. Referring to FIG. 6, contents displayed on the touch panel of the operation screen 505 shown in FIG. 5 are described below. In FIG. 6, tags 602 displayed in an upper area of the screen are used to select various functions. More specifically, the tags 602 include a COPY tag, a TRANSMIT/FAX tag for selecting a facsimile transmission, e-mail transmission, or transmission to a file server, a BOX tag, and a REMOTE SCANNER tag, which are arranged in this order from left to right. A box function selected by the BOX tag is a function of storing image data acquired via the scanner unit into a storage area called a box on the built-in hard disc 440, performing image processing on the image data stored in a box, or printing stored image data. The remote scanner function is a function of acquiring a scanned image into the PC by remotely operating a scanner via a network. If one of these tags is selected, a screen for making detailed settings of a selected function appears.

Of various functions, the copying function is selected in the specific example of the screen shown in FIG. 6. The copying function screen includes a button 603 for selecting a color mode, Scaling button 604 for specifying a scaling factor, a Paper Selection button 605, a Sorter button 606 for specifying a finishing process such as shift sorting or staple sorting, a Double-sided button 607 for specifying a double-sided printing mode, a Density bar 608 for specifying the density, a button 609 for specifying the type of documents, an Extension Mode button 610 for specifying other various extension modes, etc. In the image forming apparatus according to the first embodiment, even when settings via these setting buttons are not completed yet, if the image forming apparatus detects that a document is set on the document glass plate 307 or the document sensor 304 of the DF detects that a document is on the DF, then the document is carried to a reading position and reading of the document is started. The user is allowed to further perform setting of the printing conditions while the reading is performed.

Figure 11A:
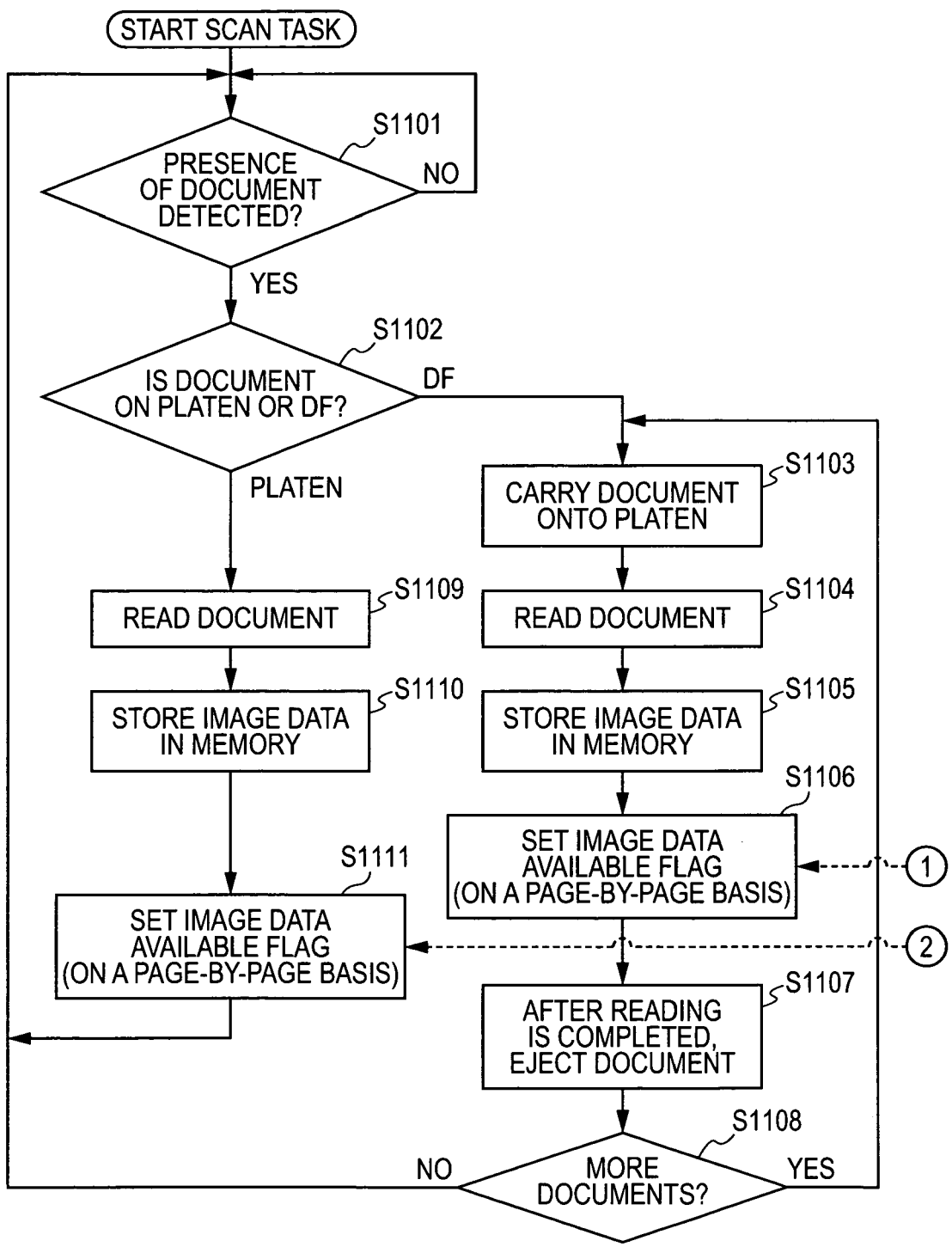
FIGS. 11A and 11B are flow charts of an exemplary process performed by an image forming apparatus in a second reading mode according to an embodiment of the present invention.
Figure 11B:
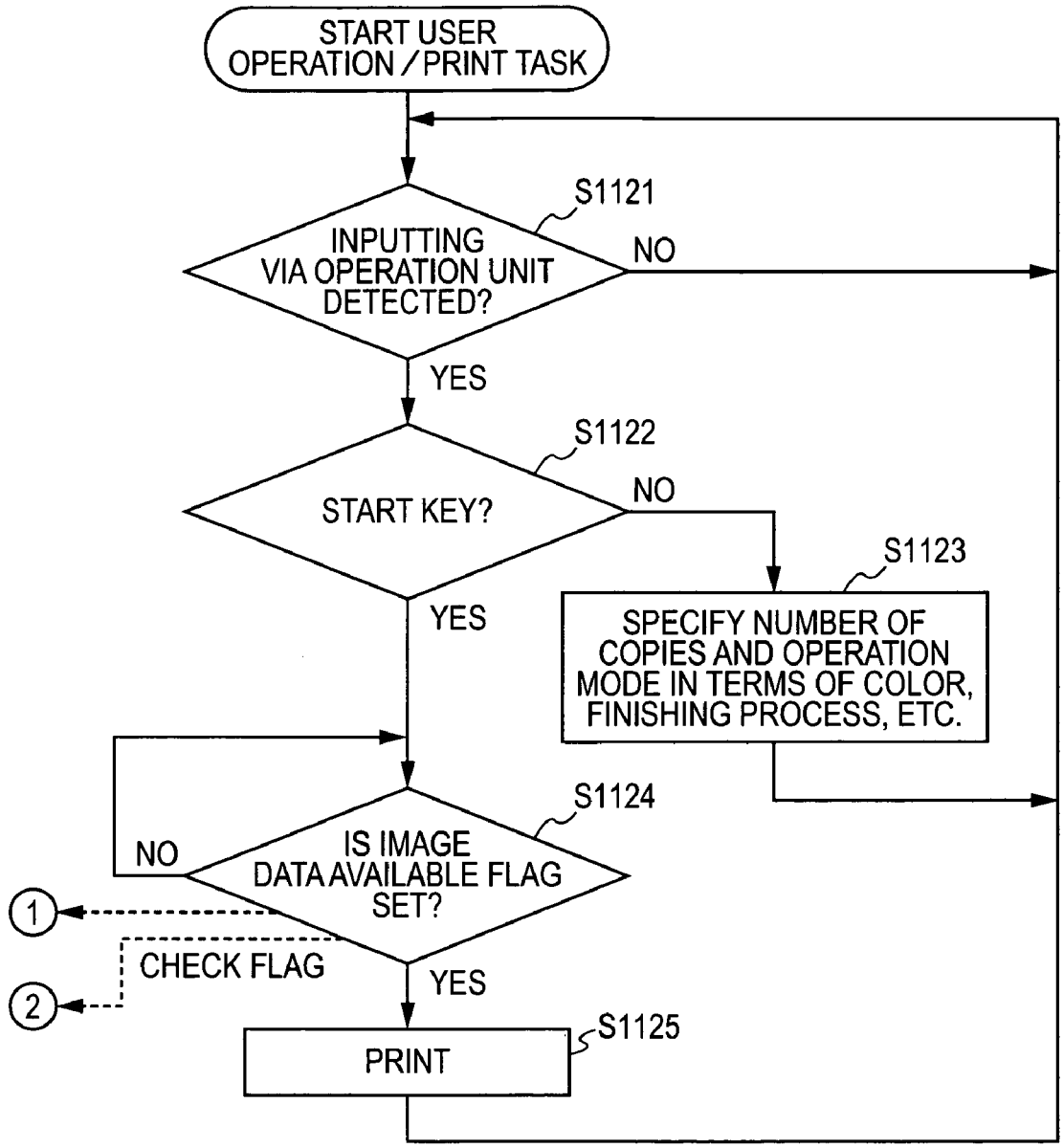

An exemplary method of controlling the image forming apparatus according to an embodiment of the invention is described below with reference to a flow chart shown in FIGS. 11A and 11B. FIGS. 11A and 11B are flow charts showing a process performed by the CPU 402 of the main controller 401 in the second reading mode according to the first embodiment. The process shown in FIG. 11 is performed by the CPU 402 by reading a control program stored in the ROM 404 and executing it. FIG. 11A shows a process associated with the scanning operation, and FIG. 11B shows a process performed by a user to input commands via the operation unit 204 and also shows a process associated with the printing operation. In the image forming apparatus, these different processes (tasks) are performed concurrently by using a multi-process (multitask) technique. In the following discussion on the control of the processes according to the first embodiment, it is assumed that the processes are executed as different tasks by a multitask system. First, the multitask system is briefly described below.

In the multitask system, when the multitask system is started, system tasks are started and each task is brought in a waiting state until an event that needs the task occurs. For example, in a scan task shown in the flow chart of FIG. 11A, the scan task is in a waiting state in step S1101 in which the CPU 402 checks the presence of a document and waits until an event (placing of a document) occurs. In a user operation/print task shown in FIG. 11B, the task is in a waiting state in step S1121 in which the CPU 402 checks whether inputting via the operation unit 204 using a key or the like is performed and waits until such an event is detected.

In the flow charts of these two tasks, there is no end step because any task in the multitask system starts in response to an event and returns to a waiting state after a sequence of processing steps is completed. In the case of the scan task shown in FIG. 11A, after step S1111 or step S1108 is completed, the task returns to step S1101 and waits therein for a next event. In the case of the user operation/print task shown in FIG. 11B, after step S1125 is completed, the task returns to step S1121 and waits therein for a next event.

The processing steps in the scan task are described below with reference to the flow chart shown in FIG. 11A. The CPU 402 checks whether there is a document based on a detection signal output by the document size sensors 331 to 335 or the document sensor 304 (step S1101). If no document is detected, the CPU 402 waits in step S1101 until a document is detected. If a document is detected, the CPU 402 determines whether the detected document is present on the platen (document glass plate) 307 or the DF 302, based on the detection signal output by the document size sensors 331 to 335 or the document sensor 304 (step S1102). In a case in which it is determined in step S1102 that the document is present on the DF 302, the CPU 402 rotates the rollers and moves belts to carry the document onto the document glass plate 307 (step S1103). The CPU 402 then controls the CCD 343 to read the document (step S1104). Image data acquired as a result of the reading is stored in the memory 205 (step S1105).

If one page of image data is completely stored in the memory 205, the CPU 402 sets an image data availability flag associated with this one page of image data to indicate that the image data is ready to be printed (step S1106). After the reading of the document is completed, the CPU 402 rotates the rollers and moves the belt to carry the document to the output tray 309 (step S1107). The CPU 402 then checks whether there is a next page of the original document (step S1108). If there is a next page, the process is repeated from step S1103 until the process is completed for all pages. If it is determined in step S1108 that there are no further pages, the CPU 402 ends the process of reading the original document.

On the other hand, in the case in which it is determined in step S1102 that the document is present on the platen 307, the CPU 402 operates the CCD 343 to read the document (step S1109). Image data acquired as a result of the reading is stored in the memory 205 (step S1110). If one page of image data is completely stored in the memory 205, the CPU 402 sets an image data availability flag associated with this one page of image data to indicate that the image data is ready to be printed (step S1111). Thereafter, the CPU 402 ends the reading process.

The process in the user operation/print task is described below with reference to the flow chart shown in FIG. 11B. The CPU 402 checks whether inputting is performed by a user via the operation unit 204 (step S1121). After the user sets a document on the document glass plate 307 or the DF 302, the user issues some command associated with forming of an image via the operation unit 204. For example, the user specifies the number of copies by pressing one or more keys (in the ten-key pad 504 shown in FIG. 5) on the operation unit 204 or specifies the scaling factor by pressing a soft key (for example, the Scaling button 604 shown in FIG. 6) on the operation control screen 505 of the operation unit 204. In step S1121, the CPU 402 monitors whether inputting of such a command via the operation unit 204 occurs.

If the CPU 402 detects, in step S1121, inputting of a command via the operation unit 204, the CPU 402 determines whether the command was issued by pressing the Start key (step S1122). In a case in which a key other than the Start key is pressed, the CPU 402 performs a process corresponding to the pressed key (for example, a process of specifying the number of copies, a process of specifying a full color mode or a monochrome mode, or a process of specifying finishing conditions such as stapling or binding) (step S1123).

In the case in which it is determined in step S1122 that the Start key is pressed, the CPU 402 performs the following process. That is, the CPU 402 checks whether the image data availability flag associated with the image data stored in the memory is set to indicate that the image data is ready to be printed (step S1124). Note that the image data availability flag is set in step S1111 or S1106 in the flow chart shown in FIG. 11B. Dotted arrows extending from step S1124 in FIG. 11B and pointing to steps S1106 or S1111 indicate that the process in step S1124 checks the flag that is set in step S1106 or S1111.

If it is determined in step S1124 that the image data availability flag associated with the image data is not set, the CPU 402 waits in step S1124 until the image data availability flag associated with the image data is set. If it is determined in step S1124 that the image data availability flag associated with the image data is set, the CPU 402 prints the image data (step S1125). Note that in this specific example, printing is performed in step S1125, the process performed in step S1125 is not limited to printing. When a function other than the copying function is selected via a tag 602, a process corresponding to the selected tag, such as transmission or saving of the image data, is performed in step S1125.

In the user's operation/print process, when the inputting operation via the operation unit 204 in steps S1122 and S1123 is completed in a short time, there is a possibility that the CPU 402 has to wait in step S1124. However, in the image forming apparatus according to the first embodiment, as described above, reading of a document is started immediately when placing of the document is detected. Therefore, in practice, image data is produced and the process reaches step S1106 or S1111, in which the image data availability flag is set, in a very short time. On the other hand, the inputting process via the operation unit 204 performed by the user generally needs a rather long time. Therefore, in practice, the probability is very low that the CPU 402 has to wait in step S1124 for the image data availability flag to be set in the user operation/print task.

A precondition for the process of performing printing/outputting (transferring) in step S1125 if it is determined in step S1224 that the image data availability flag is set is that the process of producing image data is performed by the scanner unit at a higher speed than the printing process, and thus producing of image data and setting of an image data availability flag for that image data are already completed when the image data is needed in the print task. Therefore, in practice, there is no possibility that the CPU 402 has to wait in step S1124 for the image data availability flag to be set in the user operation/print task. However, the process from S1103 to S1108 is not necessarily always completed in a short time, and thus the above precondition does not necessarily always hold. To handle such a possibility, in step S1124, the CPU 402 may check the status of the image data availability flag for each of image data and may wait until flags are set for all image data (all pages). In this case, when the CPU 402 detects that flags are set for all image data (all pages), the CPU 402 advances the process to step S1125 to print the image data.

In the first embodiment, as described above, the image forming apparatus is controlled so that reading of a document is performed when a user is making settings via the operation panel. This allows a great reduction in the FCOT, that is, the time needed to obtain an ejected output (or to output or transfer image data) after a user presses a start key to issue a copy start command, and thus, a great improvement in productivity is achieved.

As can be understood from the flow chart shown in FIGS. 11A and 11B, when a user makes settings via the operation unit 204 and presses the start key before a document is placed, the CPU 402 waits in step S1124 in the user operation/print task for image data to be produced. To handle such a possibility, an additional step may be provided before step S1124 so that when the start key is pressed in step S1122, if the CPU 402 detects that no image data exits in the memory because scanning is not performed, then the CPU 402 displays a message on the operation control screen 505 in the additional step before S1122 to prompt a user to place a document. If the user sets a document in response to the message, then the CPU 402 performs the process from step S1101 in the scan task shown in FIG. 11A for the placed document.

Second Exemplary Embodiment

In the first embodiment, the method of controlling the image forming apparatus so as to operate in the second reading mode has been described. However, in some cases, a user may want to use the image forming apparatus in such a manner that a document is set first, printing conditions are then specified via the operation unit 204, and finally the start key is pressed to start printing. In a second embodiment, to meet such a need, the image forming apparatus is controlled such that the image forming apparatus operates in the second reading mode or the first reading mode in which document reading is started in response to pressing of a start key after necessary settings via the operation unit 204 are completed, in accordance with a selection made by a user.

In this method of controlling the image forming apparatus according to the second embodiment, the functional block structure, the mechanical structure and the hardware structure of the image forming apparatus and the structure of the operation unit 204 are similar to those according to the first embodiment described above with reference to FIGS. 2 to 5, and thus a duplicated description thereof is not given herein but the following discussion will be focused on the features specific to processes associated with the method of controlling the image forming apparatus according to the second embodiment of the invention.

Figure 12A:
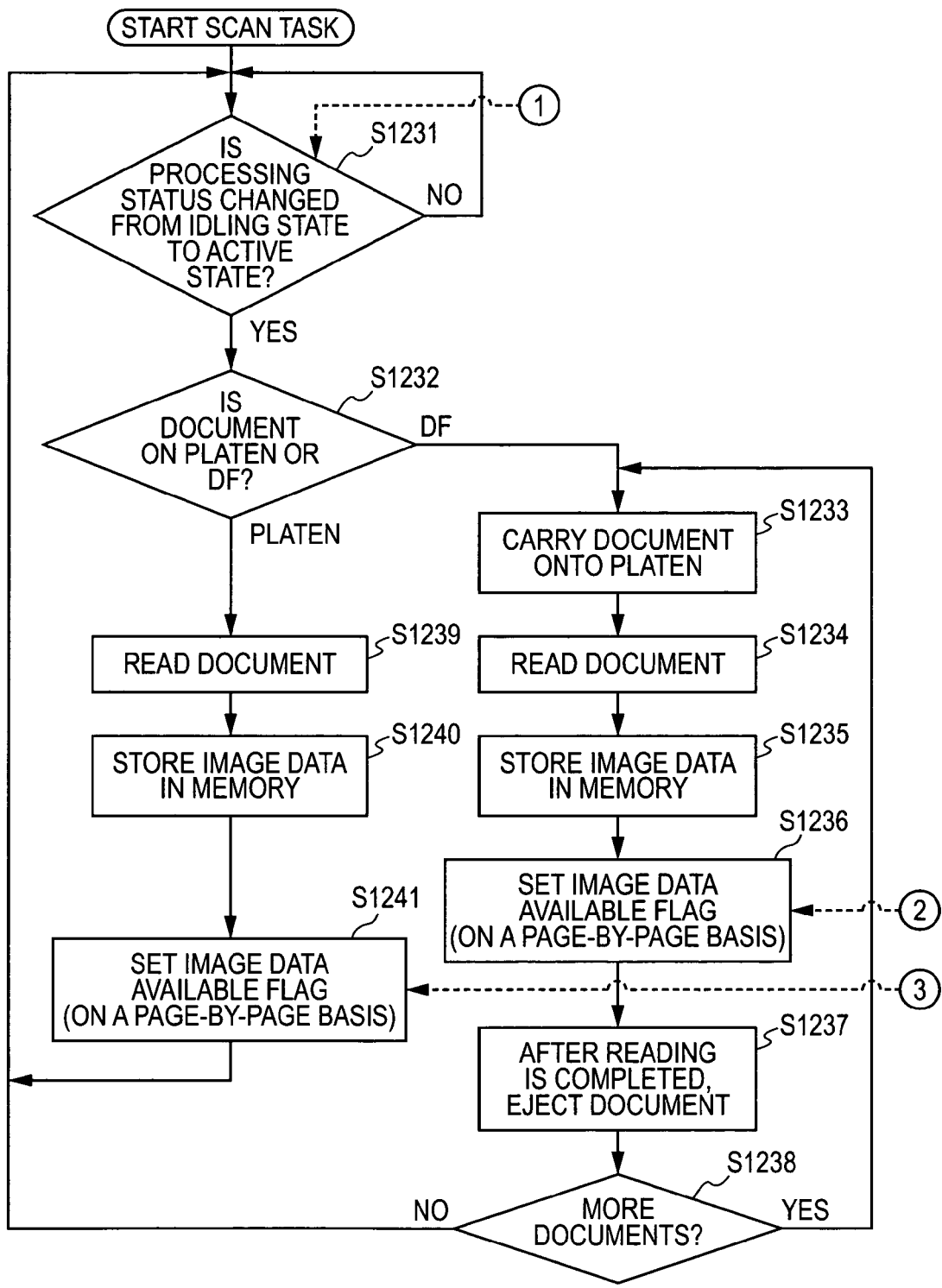
FIGS. 12A and 12B are flow charts of an exemplary process performed by an image forming apparatus in which it is allowed to select a second reading mode or a first reading mode, according to an embodiment of the present invention.
Figure 12B:
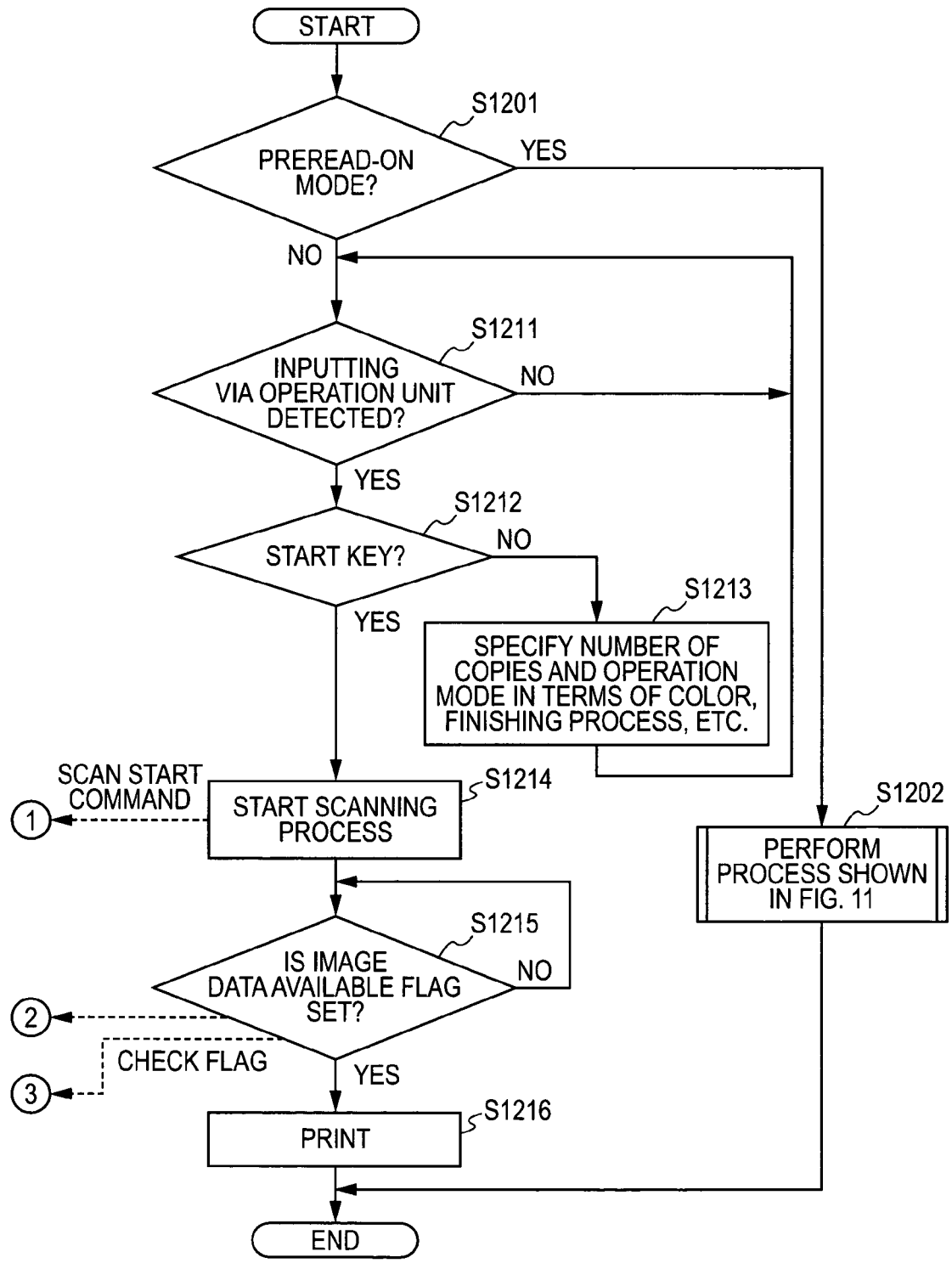

FIGS. 12A and 12B are flow charts of an exemplary process performed by the CPU 402 of the main controller 401 such that the second reading mode or the first reading mode is selected as specified by a user, according to the second embodiment of the present invention. The process shown in FIGS. 12A-B is performed by the CPU 402 by reading a control program stored in the ROM 404 and executing it. The method of controlling the image forming apparatus according to the second embodiment is described below with reference to the flow chart shown in FIGS. 12A and 12B. FIG. 12A shows a process associated with the scanning operation, and FIG. 12B shows a process performed by a user to input commands via the operation unit 204 and also shows a process associated with the printing operation. In the image forming apparatus, these different processes (tasks) are performed concurrently by using a multi-process (multitask) technique. In the second embodiment, as in the first embodiment, it is assumed that the processes are executed as different tasks by a multitask system.

In the flow chart shown in FIG. 12B, the CPU 402 checks whether the second reading mode is selected (step S1201). More specifically, if the CPU 402 detects the presence of a document based on a detection signal output by the document size sensors 331 to 335 or the document sensor 304, the CPU 402 displays a menu on the operation control screen 505 to prompt a user to select either the second reading mode or the first reading mode. The CPU determines which one of the second reading mode or the first reading mode is selected by the user via the menu. Alternatively, the operation unit 204 may include a toggle switch (not shown) for selecting either the second reading mode or the first reading mode, and the CPU 402 may determine which one of the second reading mode or the first reading mode is selected by the user via the toggle switch. A more detailed explanation on the process in step S1201 to determine whether the image forming apparatus is set to operate in the second reading mode or the first reading mode, and a process of changing the setting will be given in a third embodiment described later.

If the CPU 402 determines in step S1201 that the second reading mode is selected, the CPU 402 performs step S1202 in a similar manner as in the first embodiment described above with reference to FIGS. 11A and 11B.

On the other hand, if it is determined in step S1201 that the first reading mode is selected, the CPU 402 checks whether inputting is performed by a user via the operation unit 204 (step S1211). More specifically, the CPU 402 checks whether the user issues some command associated with forming an image by operating some key (for example, a key in the ten-key pad 504 shown in FIG. 5) of the operation unit 204 or by operating a soft key (for example, the Scaling button 604 shown in FIG. 6) on the operation control screen 505 of the operation unit 204.

If the CPU 402 detects, in step S1211, inputting of a command via the operation unit 204, the CPU 402 determines whether the command was issued by pressing the Start key (step S1212). In a case in which a key other than the Start key is pressed, the CPU 402 performs a process corresponding to the pressed key (step S1213). More specifically, for example, the CPU 402 performs a process of specifying the number of copies, a process of specifying a full color mode or a monochrome mode, or a process of specifying finishing conditions such as stapling or binding.

In the case in which it is determined in step S1212 that the start key is pressed, the CPU 402 starts the scanning process (step S1214). That is, when the scan task is waiting in step S1214 for a scan start command to be issued, if the start key is pressed, the scan start command is issued. A dotted line extending from step S1214 in FIG. 12B to step S1231 in FIG. 12A represents an occurrence of the scan start command. The details of the scan task will be described later.

The CPU 402 then checks whether the image data availability flag associated with image data acquired via the scan task is set to indicate that the image data is ready to be printed (step S1215). Note that the image data availability flag is set in step S1236 or S1241 in the scan task that will be described later with reference to a flow chart shown in FIG. 12A. Dotted arrows extending from step S1215 in FIG. 12B and pointing to steps S1236 or S1241 indicate that the process in step S1215 checks the flag that is set in step S1236 or S1241.

If it is determined in step S1215 that the image data availability flag associated with the image data is not set, the CPU 402 waits in step S1215 until the image data availability flag associated with the image data is set. If it is determined in step S1215 that the image data availability flag associated with the image data is set, the CPU 402 prints the image data (step S1216). If the printing is completed, the process of the image forming apparatus according to the second embodiment is ended.

When pre-reading of a document is not performed, it takes a certain time to, in response to a scan start command, produce image data by scanning a document and set a flag indicating that the image data is ready to be used, and thus, in many cases, the process has to wait in step S1215 for the flag to be set.

A precondition for the process of performing printing in step S1216 if it is determined in step S1215 that the image data availability flag is set is that the process of producing image data is performed by the scanner unit at a higher speed than the printing process, and thus producing of image data and setting of an image data availability flag for that image data are already completed when the image data is needed in the print task. Therefore, in practice, there is no possibility that the CPU 402 has to wait in step S1215 for the image data availability flag to be set in the user operation/print task. However, this precondition does not necessarily always hold.

To handle such a possibility, in step S1215, the CPU 402 may check the status of the image data availability flag for each of image data and may wait until flags are set for all image data (all pages). In this case, when the CPU 402 detects that flags are set for all image data (all pages), the CPU 402 advances the process to step S1216 to print the image data.

Now, the scan task is explained. The scan task is performed in step S1231 and following steps in the flow chart shown in FIG. 12A. The scan task is in a waiting state until a scan start command is issued (step S1231), that is, the CPU 402 waits in step S1231 for the scan start command to be issued. If the CPU 402 detects an event of the scan start command, the CPU 402 checks whether a document is on the platen 307 or the DF 302 (step S1232). In the case in which it is determined in step S1232 that the document is on the DF 302, the CPU 402 rotates the rollers and moves belts to carry the document onto the document glass plate 307 (step S1233). The CPU 402 then controls the CCD 343 to read the document (step S1234). Image data acquired as a result of the reading is stored in the memory 205 (step S1235).

If one page of image data is completely stored in the memory 205, the CPU 402 sets an image data availability flag associated with this one page of image data to indicate that the image data is ready to be printed (step S1236). After the reading of the document is completed, the CPU 402 rotates the rollers and moves the belt to carry the document to the output tray 309 (step S1237). The CPU 402 then checks whether there is a next page of the original document (step S1238). If there is a next page, the process is repeated from step S1233 until the process is completed for all pages. If it is determined in step S1238 that there are no further pages, the CPU 402 ends the document reading process and returns to step S1231 in which the CPU 402 waits for a next document to be detected.

On the other hand, in the case in which it is determined in step S1232 that the document is present on the platen 307, the CPU 402 operates the CCD 343 to read the document (step S1239). Image data acquired as a result of the reading is stored in the memory 205 (step S1240). If the image data is completely stored in the memory 205, the CPU 402 sets an image data availability flag associated with this one page of image data to indicate that the image data is ready to be printed (step S1241). Thereafter, the CPU 402 ends the reading process.

In the second embodiment, as described above, the image forming apparatus is controlled such that the process is performed selectively in either the second reading mode or the first reading mode. This makes it possible to handle various needs of users.

Third Exemplary Embodiment

In the second embodiment described above, the image forming apparatus is controlled so as to operate in the second reading mode or the first reading mode in accordance with a selection made by a user. In a third exemplary embodiment described herein, the image forming apparatus is controlled such that in a step corresponding to step S1201 in the second embodiment, the determination as to whether the operation should be performed in the second reading mode or the first reading mode is made not by a user but the image forming apparatus.

In this method of controlling the image forming apparatus according to the third embodiment, the functional block structure, the mechanical structure and the hardware structure of the image forming apparatus and the structure of the operation unit 204 are similar to those according to the previous embodiments described above with reference to FIGS. 2 to 5, and thus a duplicated description thereof is not given herein but the following discussion will be focused on the features specific to the method of controlling the image forming apparatus according to the third embodiment of the invention. Exemplary processes associated with the method according to the third embodiment are described below with reference to FIGS. 6, 7, and 8 and a flow chart shown in FIG. 13.

The setting as to whether the image forming apparatus should be operated in the second reading mode or the first reading mode may be performed in various manners. In the third embodiment, the setting is made in a process in a user setting mode such that a user sets or changes the operation modes, including the second reading mode/the first reading mode, of the image forming apparatus by operating a key. More specifically, in the user setting mode, the user is allowed to make settings other than those associated with usual operations of the image forming apparatus, such as the copying process, the facsimile transmission process, the printing process via a network, etc. For example, in the user setting mode, the user is allowed to make various settings. For example, the user is allowed to set the timer value at which to switch a power mode from a normal power mode to a low power mode. It is also allowed to specify whether beeping in response to an operation on the operation panel is enabled or disabled.

Figure 7:
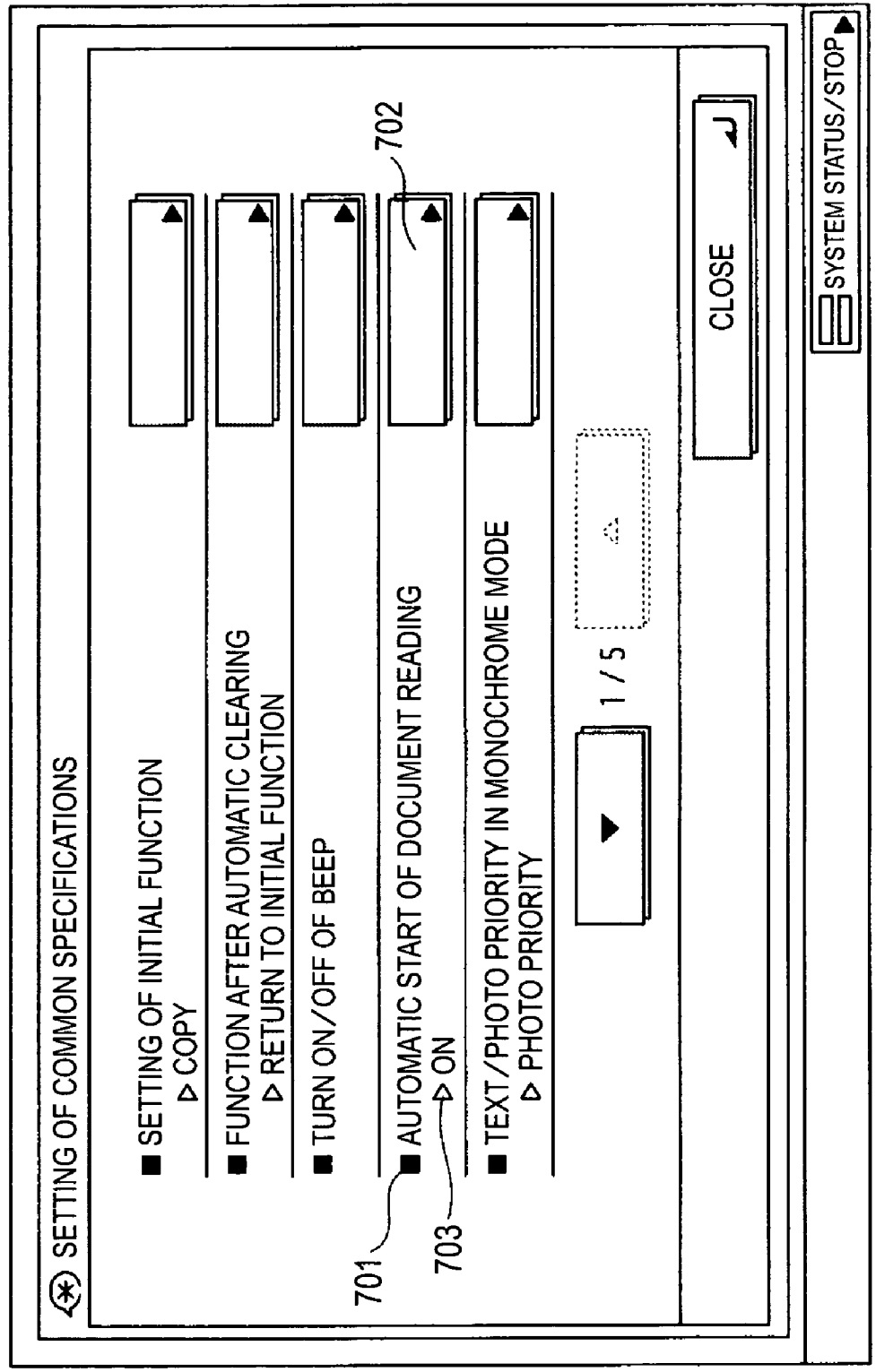
FIG. 7 shows an example of an exemplary screen for making user-setting according to an embodiment of the present invention.

FIG. 7 shows an example of a screen for making user-settings. If a user presses a User Setting key 508 (see FIG. 5) of the operation unit 204 of the image forming apparatus, the image forming apparatus is switched into the user setting mode, and the screen for making user-settings, such as that shown in FIG. 7, appears on the operation control screen 505. The User Setting key 508 is a toggle key that functions such that the image forming apparatus is switched into the user setting mode when this key is pressed, and the image forming apparatus exits the user setting mode and the operation control screen 505 returns to the basic screen shown in FIG. 6, when the key is again pressed. The settings made via the user-setting screen shown in FIG. 7 include a setting 701 associated with the automatic starting of document reading. In the specific example shown in FIG. 7, the user-setting screen is in a state in which the automatic starting of document reading is enabled and thus "ON" denoted by reference numeral 703 is displayed to indicate that the automatic starting of document reading is enabled.

Figure 8:
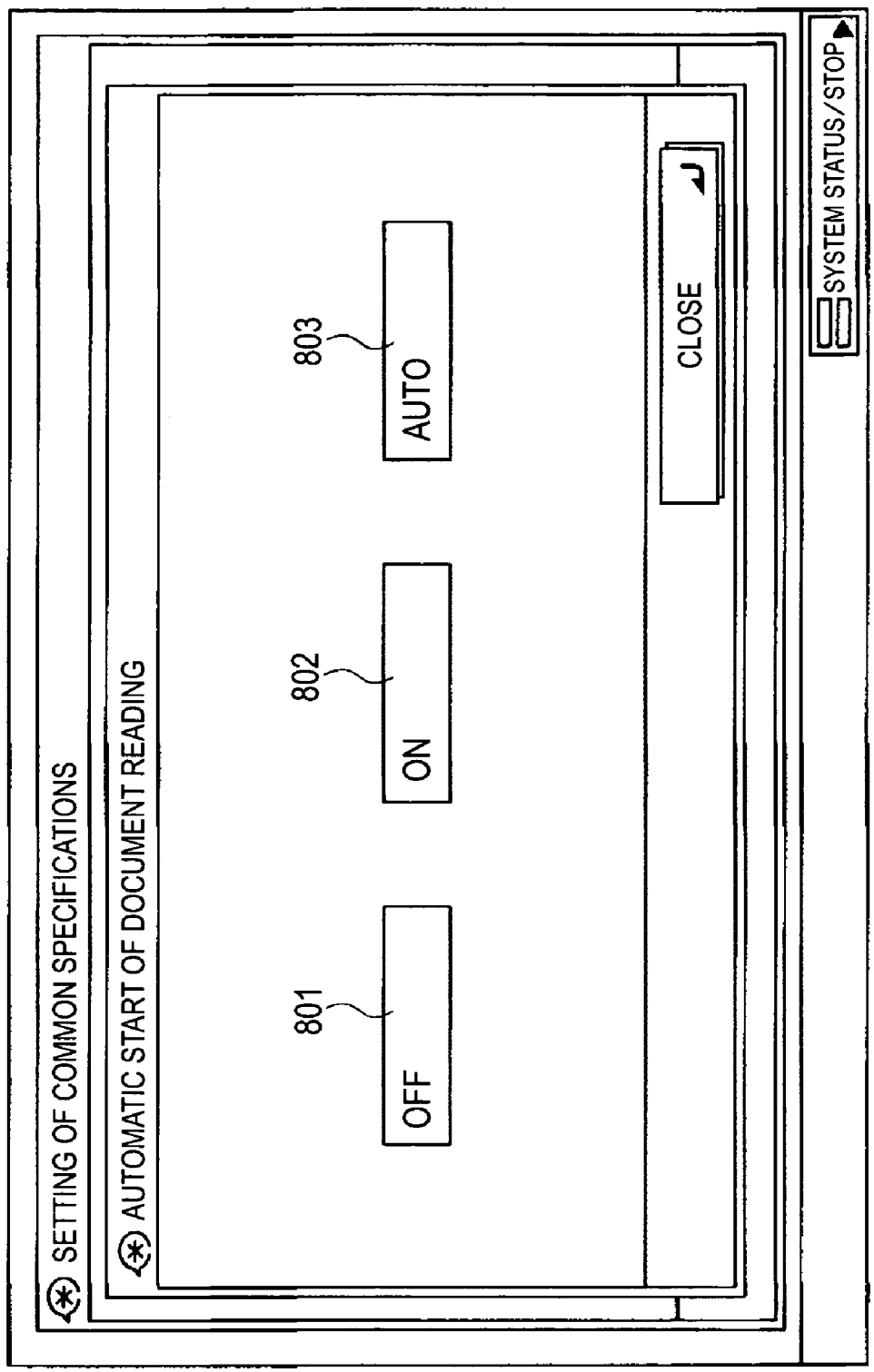
FIG. 8 shows an example of a screen for making user-setting associated with a document pre-reading mode according to an embodiment of the present invention.

FIG. 8 shows an exemplary screen for making a user-setting as to whether document reading should be automatically started for pre-reading. If a user presses an Automatic Start of Document Reading button 702 shown in FIG. 7 to specify the details of the automatic starting of document reading, the operation control screen 505 is switched into the screen shown in FIG. 8. In this screen shown in FIG. 8, a user is allowed to select one of an ON button 802 to enable document pre-reading regardless of the status of the operation, an OFF button 801 to disable document pre-reading regardless of the status of the operation, and an AUTO button 803 to automatically enable or disable document pre-reading depending on the operation status. The manner of the operation performed when the AUTO button 803 is selected will be described later in a fifth embodiment.

FIG. 13 is a flow chart showing an exemplary process performed by the CPU 402 of the main controller 401 to select the second reading mode (pre-reading=ON) or the first reading mode (pre-reading=OFF) as specified by a user, according to the third embodiment. The process shown in FIG. 13 is performed by the CPU 402 by reading a control program stored in the ROM 404 and executing it. The method of controlling the image forming apparatus according to the third embodiment is further described below with reference to the flow chart shown in FIG. 13.

If the CPU 402 detects that a user presses the User Setting key 508 on the operation unit 204 of the image forming apparatus, the CPU 402 displays the screen for making user-settings, such as that shown in FIG. 7, on the operation control screen 505 (step S1301). If the CPU 402 detects that the Automatic Start of Document Reading button 702 is selected, the CPU 402 displays a screen for making detailed settings associated with the pre-reading mode, such as that shown in FIG. 8, on the operation control screen 505 (step S1302). The CPU 402 monitors the operation performed by the user to detect pressing of the ON button 802 to select the second reading mode or the OFF button 801 to select the first reading mode (step S1303). If the ON button 802 is pressed, the CPU 402 stores information (a pre-reading mode designation flag) indicating that the second reading mode is selected (document pre-reading mode=ON) in a memory (step S1304). On the other hand, it is detected in step S1303 that the OFF button 801 is pressed, the CPU 402 stores information (the pre-reading mode designation flag) indicating that the first reading mode is selected (document pre-reading mode=OFF) in the memory (step S1305).

After the CPU 402 sets the image forming apparatus so as to operate in the second reading mode or the first reading mode in step S1304 or S1305, the CPU 402 ends the document pre-reading mode setting process. Thereafter, the CPU 402 operates in accordance with the flow chart shown in FIG. 12. That is, in step S1201 in FIG. 12, the CPU 402 determines whether the second reading mode is selected or not by checking the status of the pre-reading mode designation flag stored in the memory.

According to the third embodiment, as described above, the image forming apparatus is capable of operating either in the second reading mode or in the first reading mode in accordance with a selection made by a user.

Fourth Exemplary Embodiment

In the second and third embodiments described above, the image forming apparatus is controlled such that document pre-reading is selectively enabled or disabled. In a fourth exemplary embodiment described herein, in a decision step S1201 in FIG. 12, only a particular authorized user is allowed to select the second reading mode. That is, when a user tries in step S1201 to select the second reading mode, the user is requested to input authentication data. The user is allowed to select the second reading mode only when the authentication is successfully passed.

In this method of controlling the image forming apparatus according to the fourth embodiment, the functional block structure, the mechanical structure and the hardware structure of the image forming apparatus and the structure of the operation unit 204 are similar to those according to the previous embodiments described above with reference to FIGS. 2 to 5, and thus a duplicated description thereof is not given herein but the following discussion will be focused on the features specific to the method of controlling the image forming apparatus according to the fourth embodiment of the invention. Processes associated with the method according to the fourth embodiment are described below with reference to FIGS. 7 to 9 and a flow chart shown in FIG. 14.

Various methods are possible to request a user to input authentication data when the user wants to set the image forming apparatus to operate in the second reading mode. In the present embodiment, a user who wants to set the image forming apparatus to operate in the second reading mode is requested to input a password.

If a user presses a User Setting key 508 of the operation unit 204 of the image forming apparatus, the image forming apparatus is switched into the user setting mode, and the screen for making user-settings, such as that shown in FIG. 7, appears on the operation control screen 505. The settings made via the screen for making user-settings shown in FIG. 7 include a setting 701 associated with the automatic starting of document reading. In the specific example shown in FIG. 7, the screen for making user-settings is in a state in which the automatic starting of document reading is enabled and thus "ON" denoted by reference numeral 703 is displayed to indicate that the automatic starting of document reading is enabled.

FIG. 8 shows a screen for making a user-setting as to whether document reading should be automatically started for pre-reading. If a user presses an Automatic Start of Document Reading button 702 shown in FIG. 7 to specify the details of the automatic starting of document reading, the operation control screen 505 is switched into the screen shown in FIG. 8. In this screen shown in FIG. 8, a user is allowed to select one of an ON button 802 to enable document pre-reading regardless of the status of the operation, an OFF button 801 to disable document pre-reading regardless of the status of the operation, and an AUTO button 803 to automatically enable or disable document pre-reading depending on the operation status.

Figure 9:
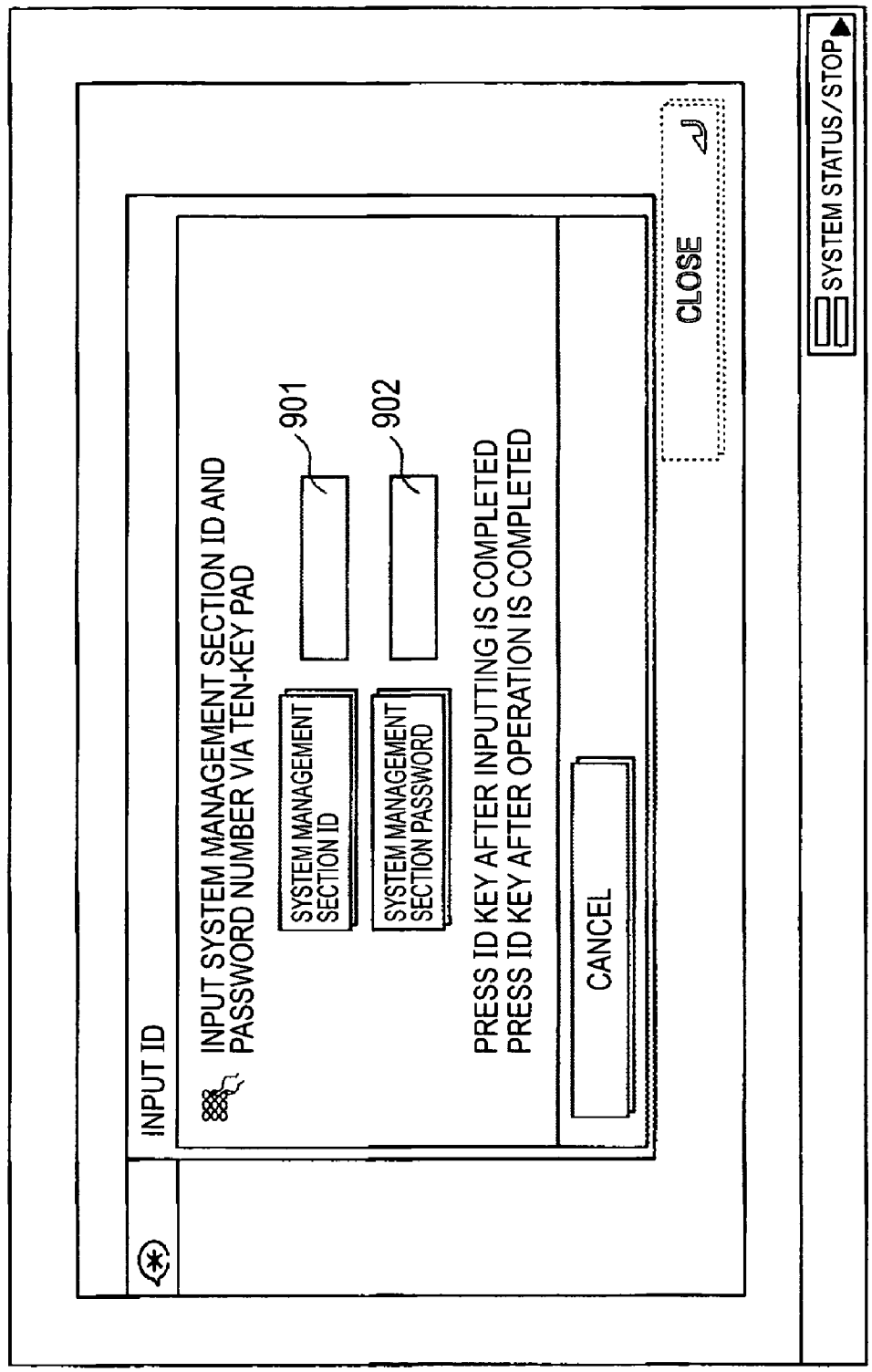
FIG. 9 shows an example of a screen for inputting an ID and a password according to an embodiment of the present invention.

If the user selects the ON button 802 or the AUTO button 803 in the screen shown in FIG. 8, a password input screen such as that shown in FIG. 9 appears on the operation control screen 505. The user inputs a section ID in an ID input field 901 in the password input screen shown in FIG. 9 and also inputs a password in a password input field 902. The image forming apparatus enables document pre-reading only when the input section ID and password are valid.

Figure 14:
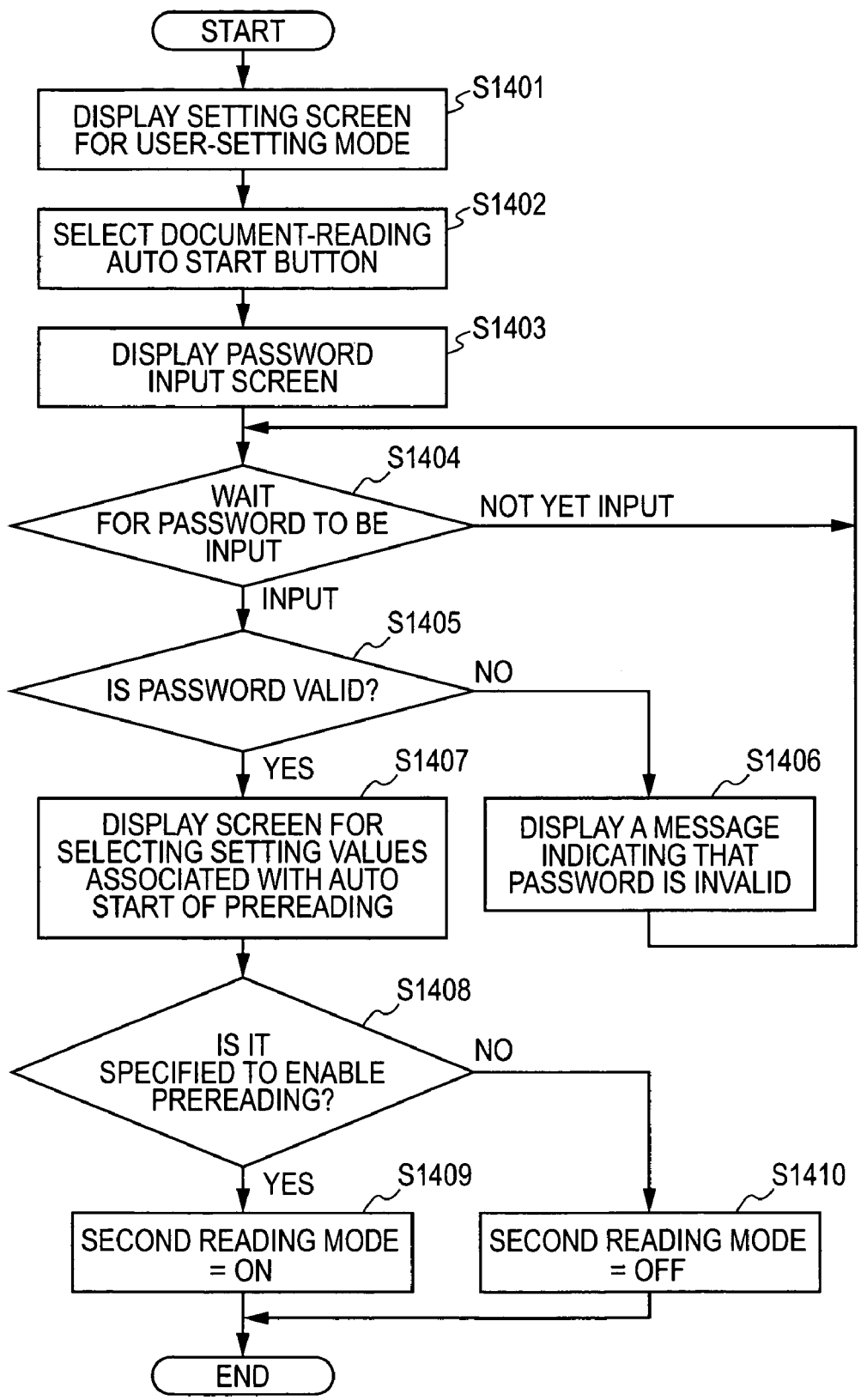
FIG. 14 is a flow chart of an exemplary process of, in a user-setting operation, performing user authentication and allowing an authorized user to select a second reading mode or a first reading mode, according to an embodiment of the invention.

FIG. 14 is a flow chart showing an exemplary process performed by the CPU 402 of the main controller 401 to perform user authentication and make the setting associated with document pre-reading as specified by a user, according to the fourth embodiment. The process shown in FIG. 14 is performed by the CPU 402 by reading a control program stored in the ROM 404 and executing it. The method of controlling the image forming apparatus according to the fourth embodiment is described below with reference to the flow chart shown in FIG. 14.

If the CPU 402 detects that a user presses the User Setting key 508 on the operation unit 204 of the image forming apparatus, the CPU 402 displays the screen for making user-settings, such as that shown in FIG. 7, on the operation control screen 505 (step S1401). If the CPU 402 detects that the Automatic Start of Document Reading button 702 is selected (step S1402), the CPU 402 displays a password input screen shown in FIG. 9 on the operation control screen 505 to prompt the user to input authentication information (step S1403), and the CPU 402 waits for the user to input authentication information including a password (step S1404). If the user inputs a password and other authentication information, the CPU 402 evaluates the input password and authentication information to determine whether they are valid by checking whether they are identical to those registered in advance in the memory (step S1405).

If the password or other authentication information is not identical to the registered password or authentication information, the CPU 402 displays a message (not shown) on the operation control screen 505 to notify the user that the password or other authentication information is not valid (step S1406), and the CPU 402 returns the process to step S1404 to prompt the user to re-input the password or other authentication information. In the case in which it is determined in step S1405 that the input password and other authentication information are valid, the CPU 402 displays the screen shown in FIG. 8 on the operation control screen 505 to allow the user to make a selection associated with the document pre-reading mode (step S1407). The CPU 402 monitors the operation performed by the user to detect pressing of the ON button 802 to select the second reading mode or the OFF button 801 to select the second reading mode (step S1408). If the ON button 802 is pressed, the CPU 402 stores information (a pre-reading mode designation flag) indicating that the second reading mode is selected (document pre-reading mode=ON) in the memory (step S1409). On the other hand, it is detected in step S1408 that the OFF button 801 is pressed, the CPU 402 stores information (the pre-reading mode designation flag) indicating that the first reading mode is selected (document pre-reading mode=OFF) in the memory (step S1410).

After the CPU 402 sets the image forming apparatus so as to operate in the second reading mode or the first reading mode in step S1409 or S1410, the CPU 402 ends the document pre-reading mode setting process. Thereafter, the CPU 402 operates in accordance with the flow chart shown in FIG. 12. That is, in step S1201 in FIG. 12, the CPU 402 determines whether the second reading mode is selected or not by checking the status of the pre-reading mode designation flag stored in the memory.

As described above, in the image forming apparatus according to the fourth embodiment of the invention, a user who wants to make a setting associated with the document pre-reading mode is requested to input authentication data, and the user is allowed to make the setting associated with the document pre-reading mode only when the authentication is successfully passed.

Fifth Exemplary Embodiment

In a fifth embodiment, in the decision step S1201 in FIG. 12, the document pre-reading mode is automatically set such that the second reading mode is selected when the copying operation is performed using the DF 302 but the first reading mode is selected when the copying operation is performed by placing paper directly on the document glass plate 307.

In this method of controlling the image forming apparatus according to the fifth embodiment, the functional block structure, the mechanical structure and the hardware structure of the image forming apparatus and the structure of the operation unit 204 are similar to those according to the previous embodiments described above with reference to FIGS. 2 to 5, and thus a duplicated description thereof is not given herein but the following discussion will be focused on the features specific to the method of controlling the image forming apparatus according to the fifth embodiment of the invention. Processes associated with the method according to the fifth embodiment are described below with reference to FIGS. 7, 8, and 10 and a flow chart shown in FIG. 15.

In the present embodiment, the image forming apparatus is automatically set such that that the second reading mode is selected when the copying operation is performed using the DF 302 but the first reading mode is selected when the copying operation is performed by placing paper directly on the document glass plate 307. To this end, the image forming apparatus must be set in advance in an automatic mode in which the document pre-reading mode is automatically selected in the above-described manner, as described below.

If a user presses a User Setting key 508 of the operation unit 204 of the image forming apparatus, the image forming apparatus is switched into the user setting mode, and the screen for making settings in the user setting mode, such as that shown in FIG. 7, appears on the operation control screen 505. The settings made via the screen for making user-settings shown in FIG. 7 include a setting 701 associated with the automatic starting of document reading. In the specific example shown in FIG. 7, the screen for making user-settings is in a state in which the automatic starting of document reading is enabled and thus "ON" denoted by reference numeral 703 is displayed to indicate that the automatic starting of document reading is enabled.

Figure 10:
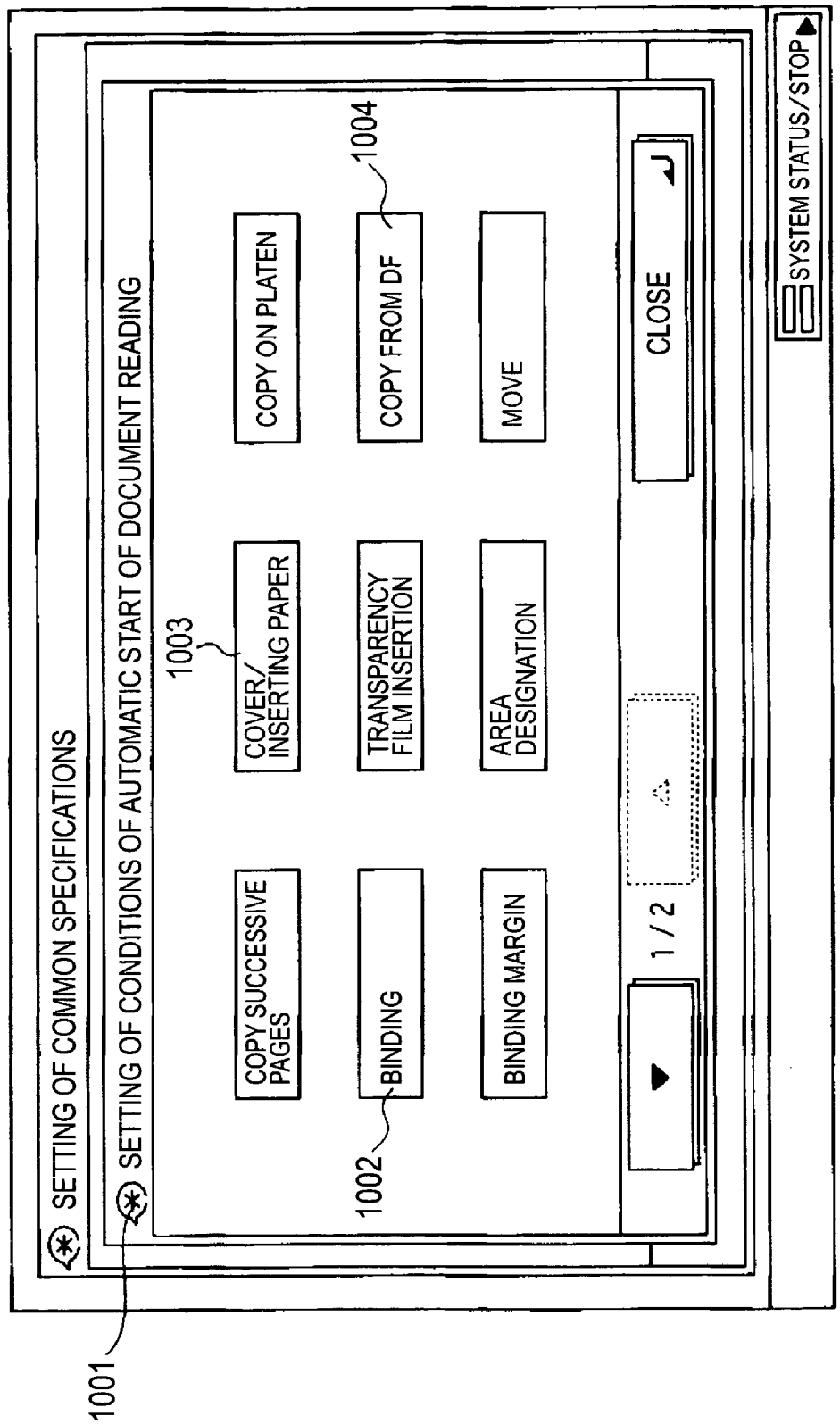
FIG. 10 shows an example of a screen for making settings associated with automatic start conditions according to an embodiment of the present invention.

FIG. 8 shows a screen for making a user-setting as to whether document reading should be automatically started for pre-reading. If a user presses an Automatic Start of Document Reading button 702 shown in FIG. 7 to specify the details of the automatic starting of document reading, the operation control screen 505 is switched into the screen shown in FIG. 8. In this screen shown in FIG. 8, a user is allowed to select one of an ON button 802 to enable document pre-reading regardless of the status of the operation, an OFF button 801 to disable document pre-reading regardless of the status of the operation, and an AUTO button 803 to automatically enable or disable document pre-reading depending on the operation status. In the case in which the AUTO button 803 is selected, a setting screen such as that shown in FIG. 10 is displayed on the operation control screen 505 to allow the user to make settings associated with the document pre-reading auto-selection. In the example of shown in FIG. 10, the setting screen in a state in which a Bind button 1002, a Cover/Insertion Paper button 1003, a DF Copy button 1004 are selected. In this case, the image forming apparatus is set such that the second reading mode is selected when one of a binding operation, cover/paper insertion operation, a DF copying operation is performed, and the first reading mode is selected when any other operation is performed.

Figure 15:
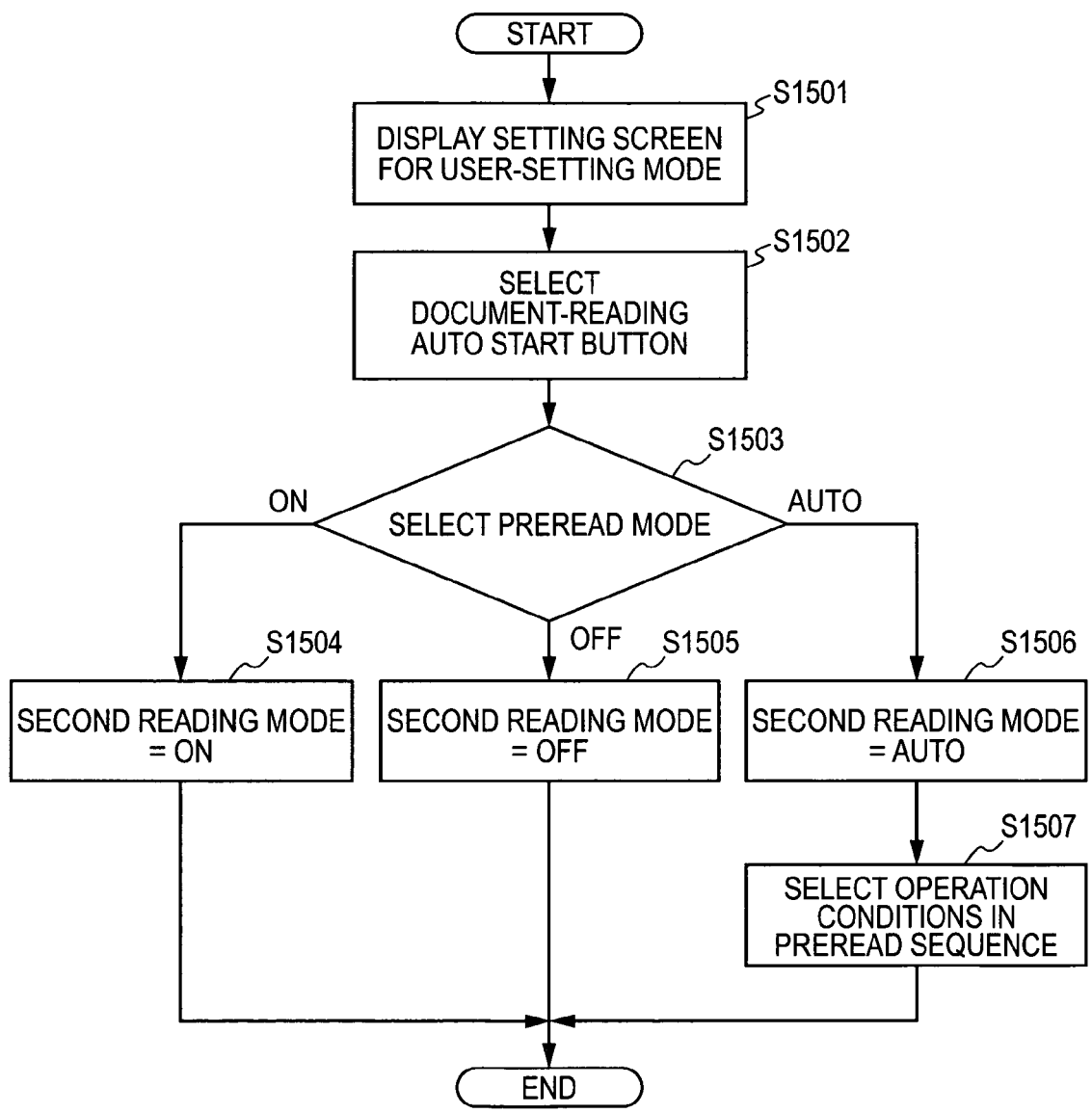
FIG. 15 is a flow chart of an exemplary process of, in a user-setting operation, selecting a second reading mode, a first reading mode, or a document pre-reading auto enable/disable mode, according to an embodiment of the invention.

FIG. 15 is a flow chart showing an exemplary process performed by the CPU 402 of the main controller 401 to select a second reading mode, a first reading mode, or a document pre-reading auto enable/disable mode, according to the fifth embodiment of the invention. The process shown in FIG. 15 is performed by the CPU 402 by reading a control program stored in the ROM 404 and executing it. The method of controlling the image forming apparatus according to the fifth embodiment is further described below with reference to the flow chart shown in FIG. 15.

If the CPU 402 detects that a user presses the User Setting key 508 on the operation unit 204 of the image forming apparatus, the CPU 402 displays the screen for making user-settings, such as that shown in FIG. 7, on the operation control screen 505 (step S1501). If the CPU 402 detects that the Automatic Start of Document Reading button 702 is selected, the CPU 402 displays the screen shown in FIG. 8 on the operation control screen 505 (step S1502). The CPU 402 monitors the operation performed by the user to detect pressing of the ON button 802 to select the second reading mode, the OFF button 801 to select the first reading mode, or the AUTO button 803 to automatically select the second reading mode or the first reading mode (step S1503). If the ON button 802 is pressed, the CPU 402 stores information (a pre-reading mode designation flag) indicating that the second reading mode is selected (document pre-reading mode=ON) in the memory (step S1504). On the other hand, it is detected in step S1503 that the OFF button 801 is pressed, the CPU 402 stores information (the pre-reading mode designation flag) indicating that the first reading mode is selected (document pre-reading mode=OFF) in the memory (step S1505).

If it is detected in step S1503 that the AUTO button 803 is pressed, the CPU 402 stores information (the pre-reading mode designation flag) indicating that the document pre-reading auto enable/disable mode is selected (document pre-reading mode=AUTO) in the memory (step S1506). When the pre-reading mode designation flag indicates that the document pre-reading auto enable/disable mode is selected, the second reading mode or the first reading mode is automatically selected depending on the operation status of the image forming apparatus. If the document pre-reading auto enable/disable mode is selected in step S1506, then the CPU 402 requests the user to select one or more operations for which the second reading mode is automatically selected, and the CPU 402 stores information indicating the selected one or more operations (step S1507). More specifically, in step S1507, the CPU 402 displays the setting screen shown in FIG. 10 on the operation unit 204 to allow the user to select one or more operations for which the second reading mode is automatically selected. In accordance with the selection made by the user, the CPU 402 stores, in the memory, information indicating that the second reading mode should be automatically selected for the one or more operations and the first reading mode should be automatically selected for the other operations. In the example of the setting screen shown in FIG. 10, the image forming apparatus is set such that the second reading mode is selected when one of a binding operation, cover/paper insertion operation, a DF copying operation is performed, and the first reading mode is selected when any other operation is performed.

Thereafter, the CPU 402 operates in accordance with the flow chart shown in FIG. 12. After the CPU 402 sets the image forming apparatus so as to operate in the second reading mode or the first reading mode in step S1504 or S1505, the CPU 402 ends the document pre-reading mode setting process. In this case, when step S1201 in FIG. 12 is performed later, the CPU 402 can determine whether the second reading mode is selected or not by checking the status of the pre-reading mode designation flag stored in the memory. On the other hand, in the case in which the document pre-reading auto enable/disable mode is selected in step S1506, the CPU 402 determines in step S1201 in FIG. 12, based on the pre-reading mode designation flag, that the document pre-reading auto enable/disable mode is selected, and the CPU 402 performs a process as described below with reference to FIG. 16. Note that in the present embodiment, when the document pre-reading auto enable/disable mode is selected, the document pre-reading is enabled in particular operations specified by a user by pressing buttons. Alternatively, when the image forming apparatus is shipped from a factory, presetting may be made to specify operations for which document pre-reading is enabled in the document pre-reading auto enable/disable mode.

Figure 16:
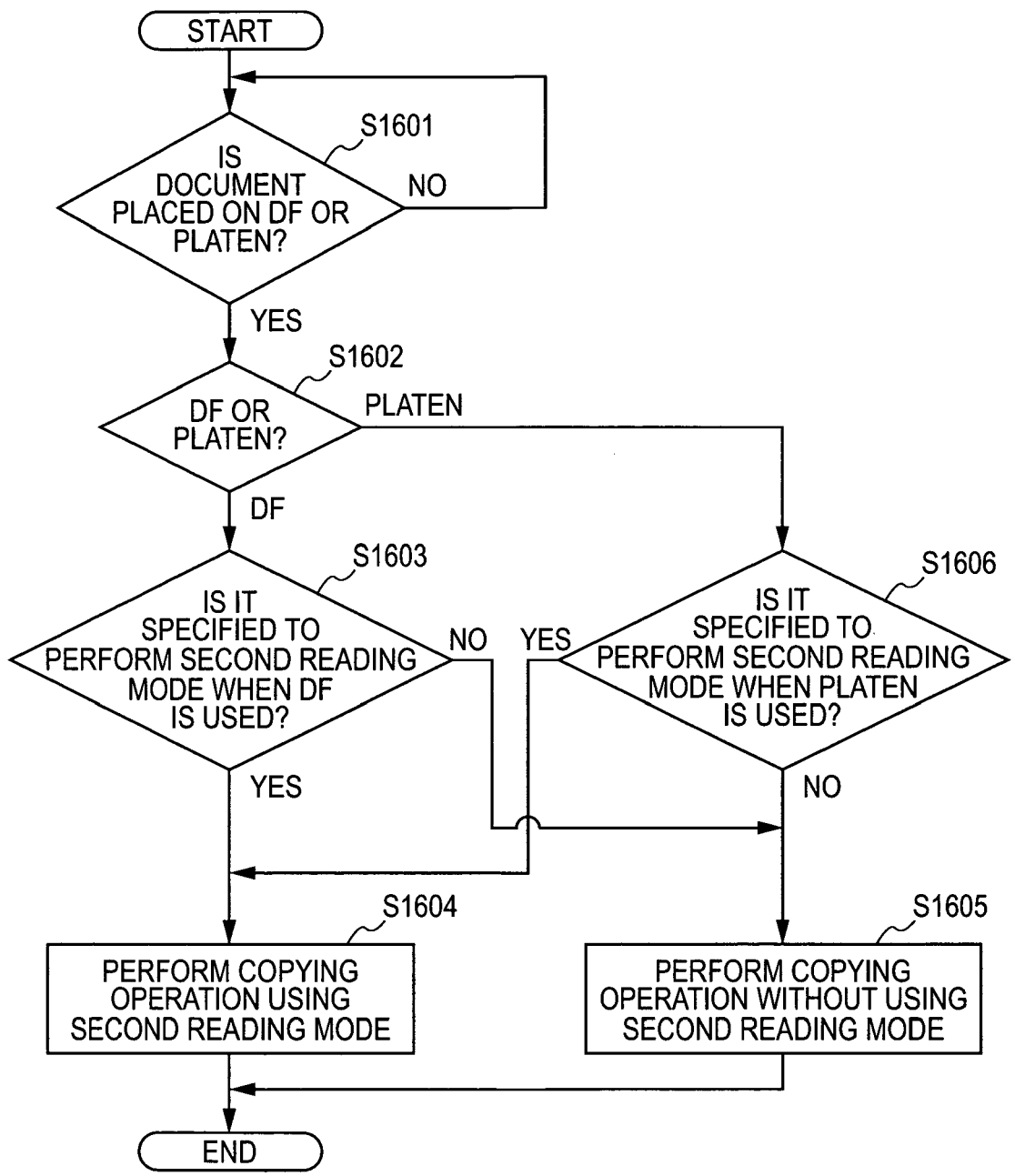
FIG. 16 is a flow chart of an exemplary process in which a document pre-reading is automatically enabled or disabled depending on an operation status, according to an embodiment of the present invention.

FIG. 16 is a flow chart showing an exemplary process performed by the CPU 402 of the main controller 401 to automatically select the second reading mode or the first reading mode and perform in the selected mode. The process shown in FIG. 16 is performed by the CPU 402 by reading a control program stored in the ROM 404 and executing it. The process performed by the image forming apparatus based on the settings made in the above-described manner according to the fifth embodiment is described below with reference to the flow chart shown in FIG. 16. In the fifth embodiment, the image forming apparatus automatically selects the second reading mode when the DF 302 is used in the copying operation but selects the first reading mode when the copying operation is performed for a document directly placed on the document glass plate 307.

The CPU 402 waits in step S1601 for a document to be placed on the DF 302 or the document glass plate 307. If placing of a document is detected in step S1601, the CPU 402 checks whether the document is placed on the DF 302 of the document glass plate 307 (step S1602). If it is determined that the document is placed on the DF 302, the CPU 402 checks whether it is specified to select the second reading mode for the copying operation using the DF 302 (step S1603). More specifically, the CPU 402 checks the pre-reading mode designation flag set in step S1507 of the flow chart shown in FIG. 15 via the document pre-reading auto enable/disable condition setting screen shown in FIG. 10.

If it is determined in step S1603 that it is specified to select the second reading mode in the copying operation using the DF 302, the CPU 402 performs the copying operation in the second reading mode (step S1604). More specifically, the CPU 402 advances the process to step S1202 in FIG. 12B and performs the copying operation in the second reading mode as shown in FIG. 11.

If it is determined in step S1603 that it is specified to select the first reading mode in the copying operation using the DF 302, the CPU 402 performs the copying operation in the first reading mode (step S1605). More specifically, the CPU 402 advances the process to step S1211 and performs a process that is similar to that shown in the flow chart of FIG. 12 but that does not include steps S1201 and S1202.

In the case in which it is determined in step S1602 that the document is placed not on the DF 302 but directly on the document glass plate 307, the CPU 402 checks whether it is specified to select the second reading mode for the copying operation using the document glass plate (step S1606). More specifically, the CPU 402 checks the pre-reading mode designation flag set in step S1507 in FIG. 15 via the document pre-reading auto enable/disable condition setting screen shown in FIG. 10. If the flag indicates that it is specified to select the second reading mode in the copying operation using the document glass plate, the CPU 402 advances the process to step S1604. Conversely, if the flag indicates that it is specified to select the first reading mode in the copying operation using the document glass plate, the CPU 402 advances the process to step S1605.

In the fifth embodiment, as described above, the operation of the image forming apparatus is automatically controlled such that the second reading mode is automatically selected in the copying operation using the DF 302, but the first reading mode is automatically selected in the copying operation using the document glass plate 307. In the present embodiment, a user is allowed to specify that the second reading mode is automatically selected when the copying operation using the DF 302 is performed. However, the second reading mode may also be specified for other operations. For example, it may be specified that the second reading mode is automatically selected when transmission or storing of a document using the DF 302 is performed. That is, the application of the second reading mode is not limited to the copying operation.

Sixth Exemplary Embodiment

In a sixth embodiment described below, the first to fifth embodiments described above are modified such that preview images of image data acquired via document pre-reading are displayed on the operation control screen 505. More specifically, preview images of the pre-read image data are displayed on the operation control screen 505 of the operation unit 204 so that a user is allowed to specify image processing conditions in outputting of the document on a page-by-page basis. In the following description, a life cycle of image data (a period from production of image data by reading a document to deletion of the image data after the image data is output or discarded) is also discussed. A method of using the storage area in an optimized manner is also discussed.

Figure 17:
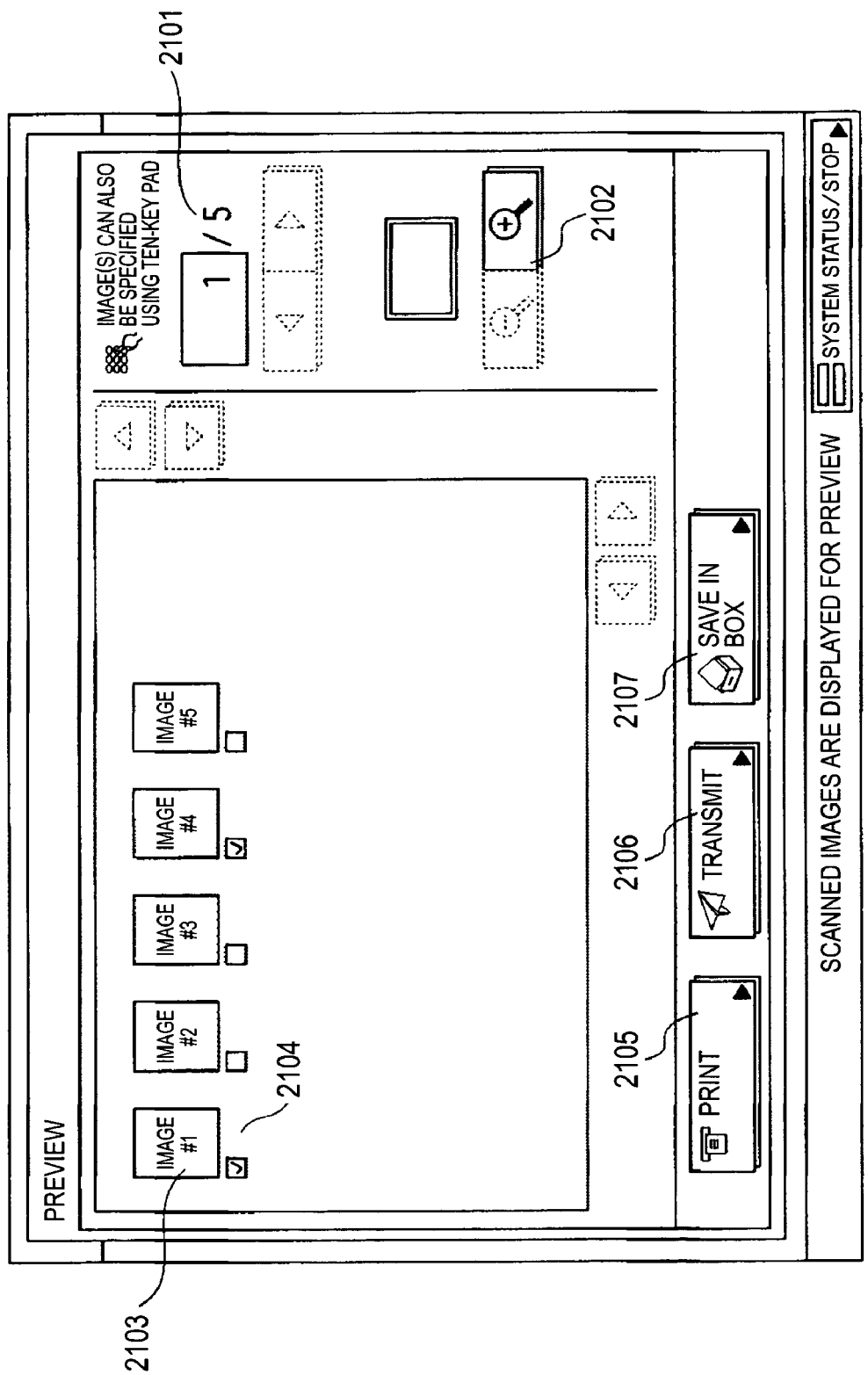
FIG. 17 shows an example of a screen in which preview images of read image data are displayed according to an embodiment of the present invention.

In this method of controlling the image forming apparatus according to the sixth embodiment, the functional block structure, the mechanical structure and the hardware structure of the image forming apparatus and the structure of the operation unit 204 are similar to those according to the previous embodiments described above with reference to FIGS. 2 to 5, and thus a duplicated description thereof is not given herein but the following discussion will be focused on the features specific to the image forming apparatus according to the sixth embodiment of the invention, which will be described below with reference to FIG. 17 and other figures.

FIG. 17 shows an example of an operation control screen 505 in which preview images of pre-read image data are displayed. In this specific example, pre-reading is completed for five document sheets of a plurality of document sheets and preview images thereof are displayed while sixth and following document sheets are being read. The read image data is temporarily stored in a storage area and image icons corresponding to respective document sheets are displayed on the operation control screen 505. Because the five images are acquired via the pre-reading process, image processing conditions for these five images have not yet been specified. That is, these images are simply stored in the form of raw data, that is, in the form as acquired, in the image forming apparatus. In general, raw image data is in a bitmap form in which an image is represented by RGB (Red-Green-Blue) intensity data. In FIG. 17, the number of preview images and the selected image number are displayed in a field 2101 in the preview screen. Buttons 2102 are used to enlarge or reduce a preview image.

Figure 18:
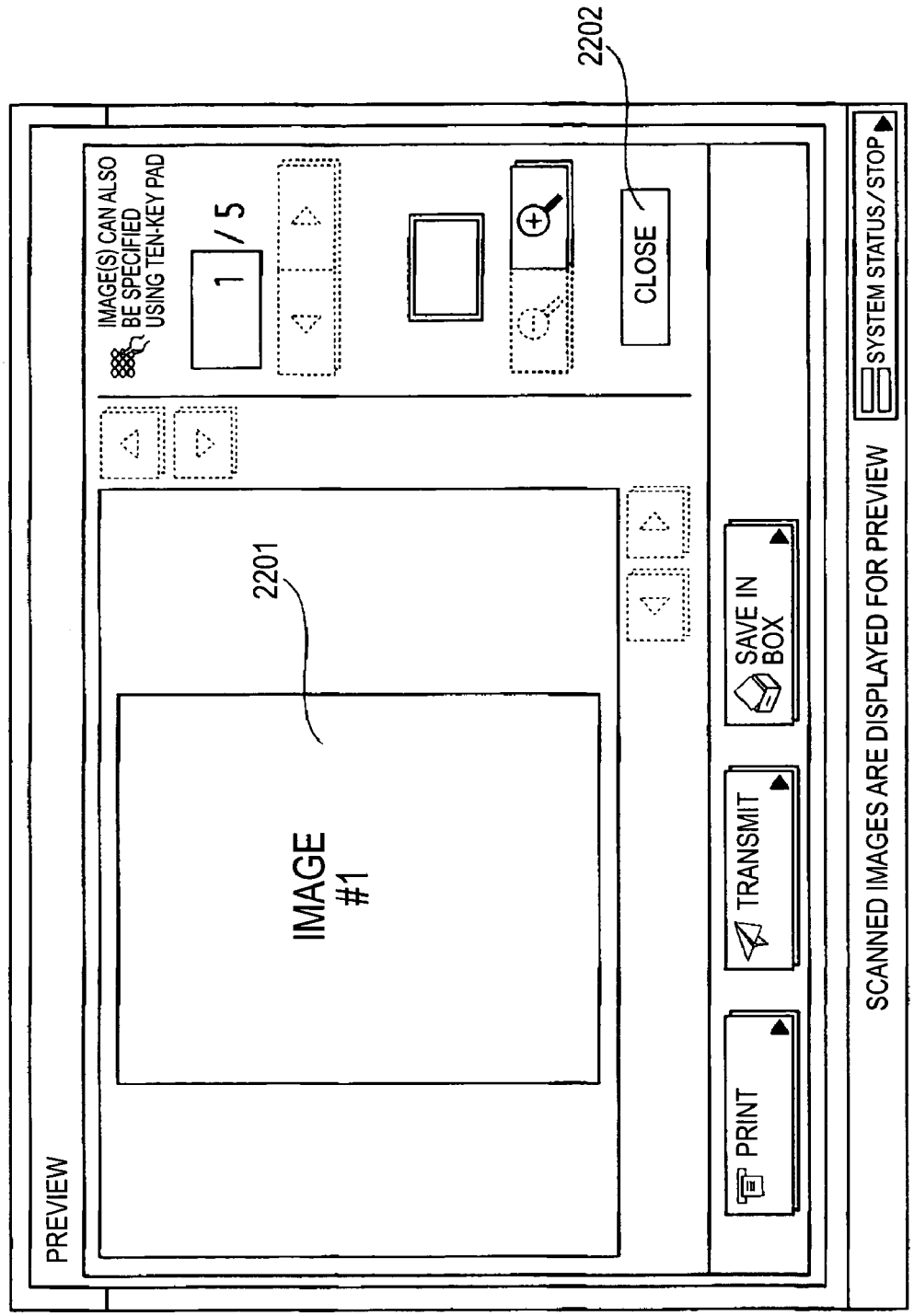
FIG. 18 shows an example of a screen on which a specified preview image is displayed in an enlarged mode according to an embodiment of the present invention.

For example, when an image with an image number of 1 denoted by reference numeral 2103 is selected in the image selection field, if a user presses the enlarge (+) button 2102, the operation control screen 505 is switched to an enlarged image display screen shown in FIG. 18 on which the selected image is displayed in an enlarged fashion. In FIG. 18, reference numeral 2201 denotes the image #1 displayed in the enlarged fashion. If the user presses a CLOSE button 2202, the operation control screen 505 is switched to the previous one shown in FIG. 17. In FIG. 17, reference numeral 2104 denotes a check box disposed below the image #1 denoted by reference numeral 2103. In the specific example shown in FIG. 17, images #1 and #4 are selected by a user and corresponding check boxes are checked. A PRINT button 2105 is used to print selected one or more images. If the PRINT button 2105 is pressed by a user, the operation control screen 505 is switched to that shown in FIG. 19, which allows the user to set printing conditions. A TRANSMIT button 2106 is used to transmit selected one or more images. If the TRANSMIT button 2106 button is pressed by a user, the operation control screen 505 is switched to that shown in FIG. 20, which allows the user to set transmission conditions. A SAVE IN BOX button 2107 is used to save selected one or more images in a storage area called a box on a hard disk 440. If the SAVE IN BOX button 2107 is pressed by a user, the operation control screen 505 is switched to that shown in FIG. 21, which allows the user to set saving conditions. In the present example, it is assumed that the PRINT button 2105 is pressed after images #1 and #4 are selected. In this case, the operation control screen 505 is switched to the printing condition setting screen shown in FIG. 19.

Figure 19:
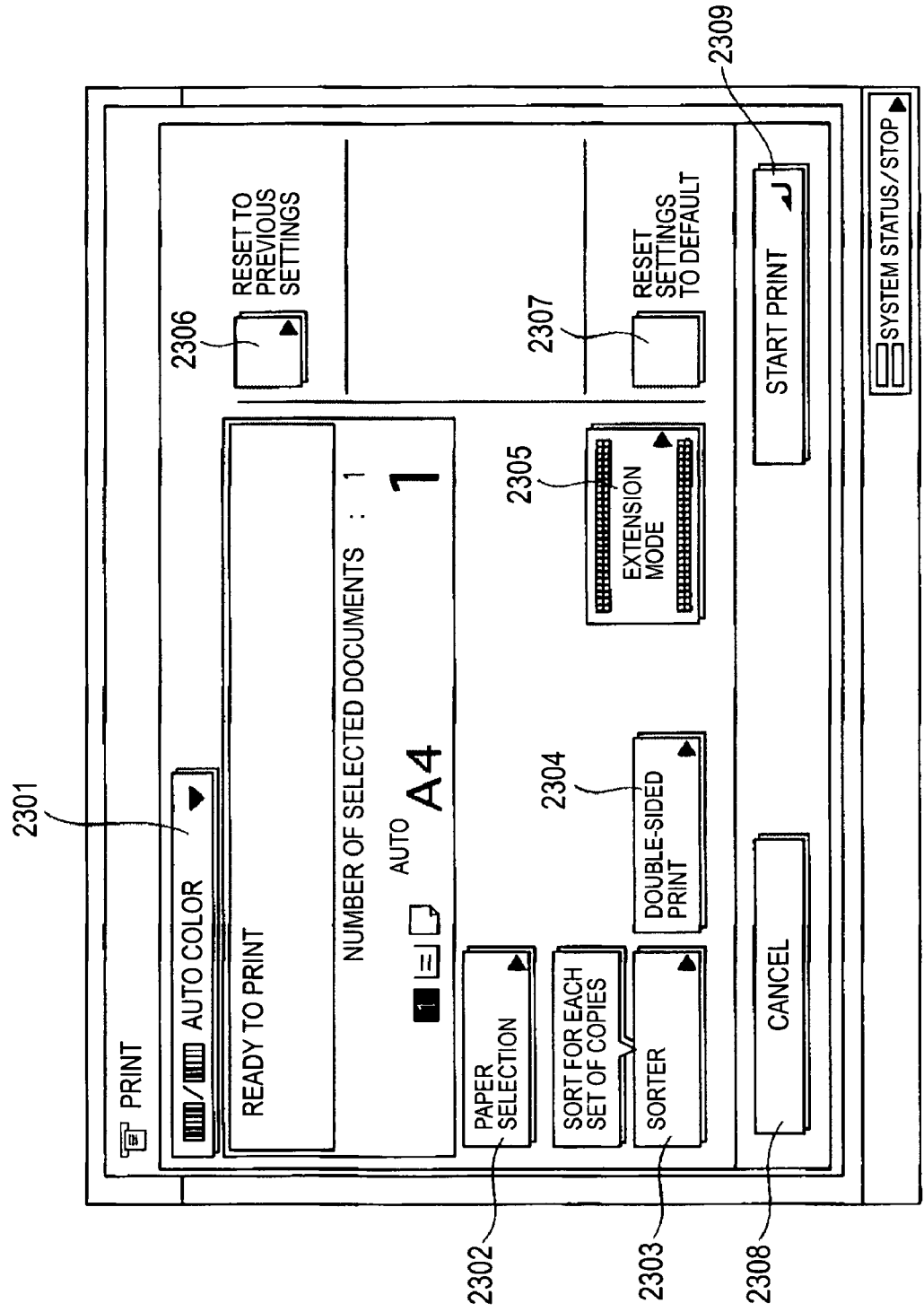
FIG. 19 shows an example of an operation screen for making settings associated with printing conditions according to an embodiment of the present invention.

A user is allowed to make detailed settings of printing conditions via the setting screen shown in FIG. 19. In FIG. 19, reference numeral 2301 denotes a pull-down menu for selecting a color mode from a full color mode, a monochrome mode, and an auto color mode. In the example shown in FIG. 19, the auto color mode 2301 is selected. A PAPER SELECTION button 2302 is used to select a paper type from those placed in paper cassettes. A SORTER button 2303 is used to select a sorting mode from a non-sorting mode, a group sorting mode, a shift sorting mode, and a staple sorting mode. A DOUBLE-SIDED PRINT button 2304 is used to specify that printing should be performed in a double-sided mode. An EXTENSION button 2305 is used to make extension settings associated with binding conditions, designation of an area, specifications of cover/insertion paper, etc. A button 2306 is used to reset the settings made via the screen shown in FIG. 19 to immediately previous settings. A button 2307 is used to cancel settings made via the buttons 2302 to 2305 and reset them into initial values. A CANCEL button 2308 is used to cancel a print command. If a user presses the CANCEL button 2308, the operation control screen 505 is returned to the image data preview screen shown in FIG. 17. A START PRINT button 2309 is used to start a printing operation. If this button is pressed, RGB luminance data of images specified via check boxes (the images #1 and #4 in the present example) is subjected to image processing necessary in printing. The data is then converted into a special JPEG file format for copy use and is output to the printer unit. Once the data conversion is completed, the RGB luminance data is no longer necessary and thus the RGB luminance data is deleted. The details of this process will be described later with reference to FIG. 25. If the START PRINT button 2309 in the print condition setting screen shown in FIG. 19 is pressed, the print condition setting screen is closed and the operation control screen 505 is switched to that shown in FIG. 22, in which information indicating that the images #1 and #4 are being printed is displayed.

Figure 22:
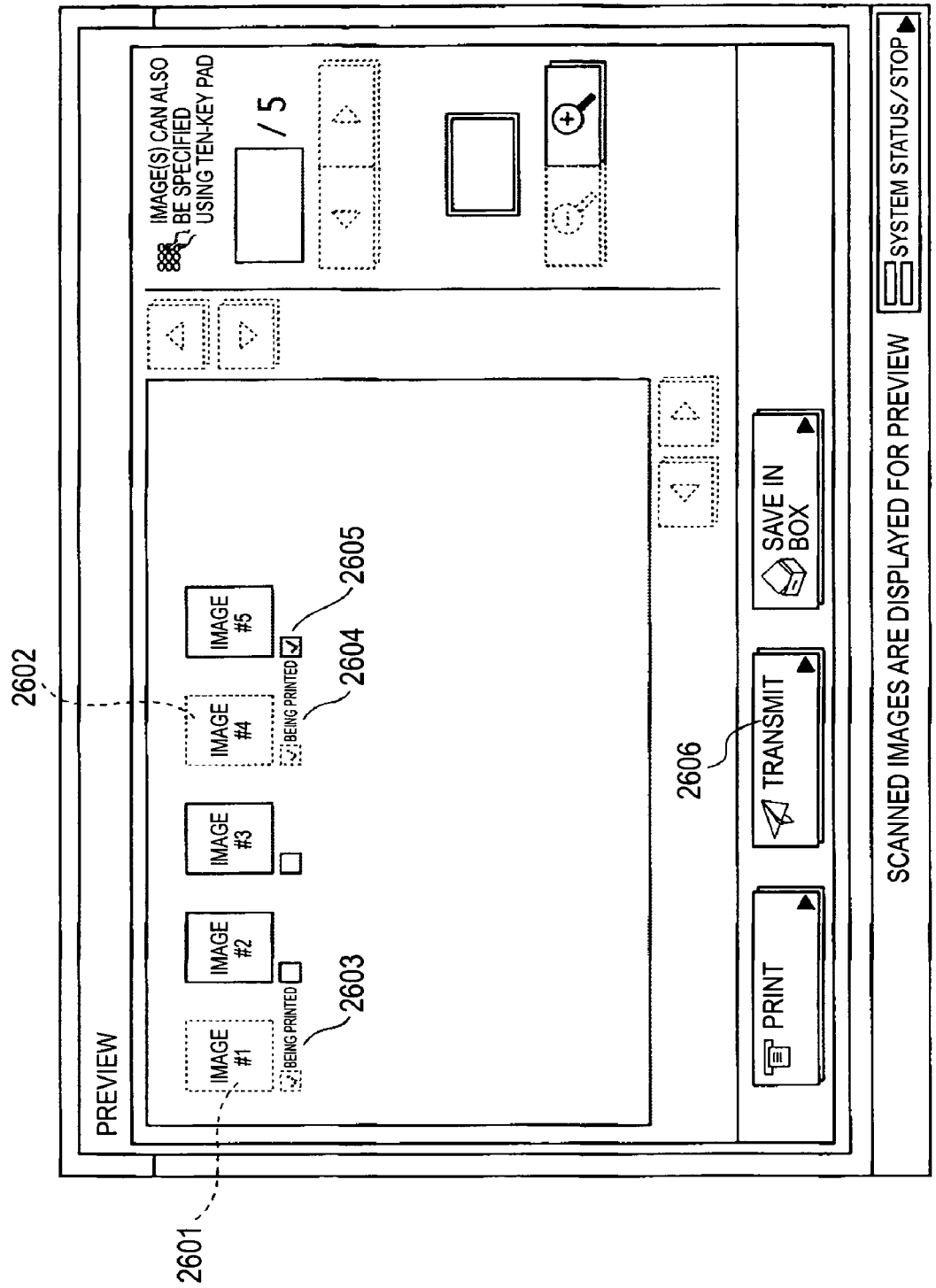
FIG. 22 shows an example of an operation screen in which information indicating that some pages are being printed is displayed according to an embodiment of the present invention.

In the image preview screen shown in FIG. 22, the image #1 denoted by reference numeral 2601 and the image #4 denoted by reference numeral 2602 are displayed in a shaded form to indicate that they are being printed, and reselection of the images #1 and #4 is disabled. Below the image #1 and the image #4, status messages 2603 and 2604 indicating that they are being printed are displayed. In this state, if the user wants to transmit an image #5, a process is further performed as follows. To transmit the image #5, the user first checks the check box 2605 corresponding to the image #5 and then presses the TRANSMIT button 2606. In response, the operation control screen 505 is switched to the operation screen shown in FIG. 20 for setting transmission conditions.

Figure 20:
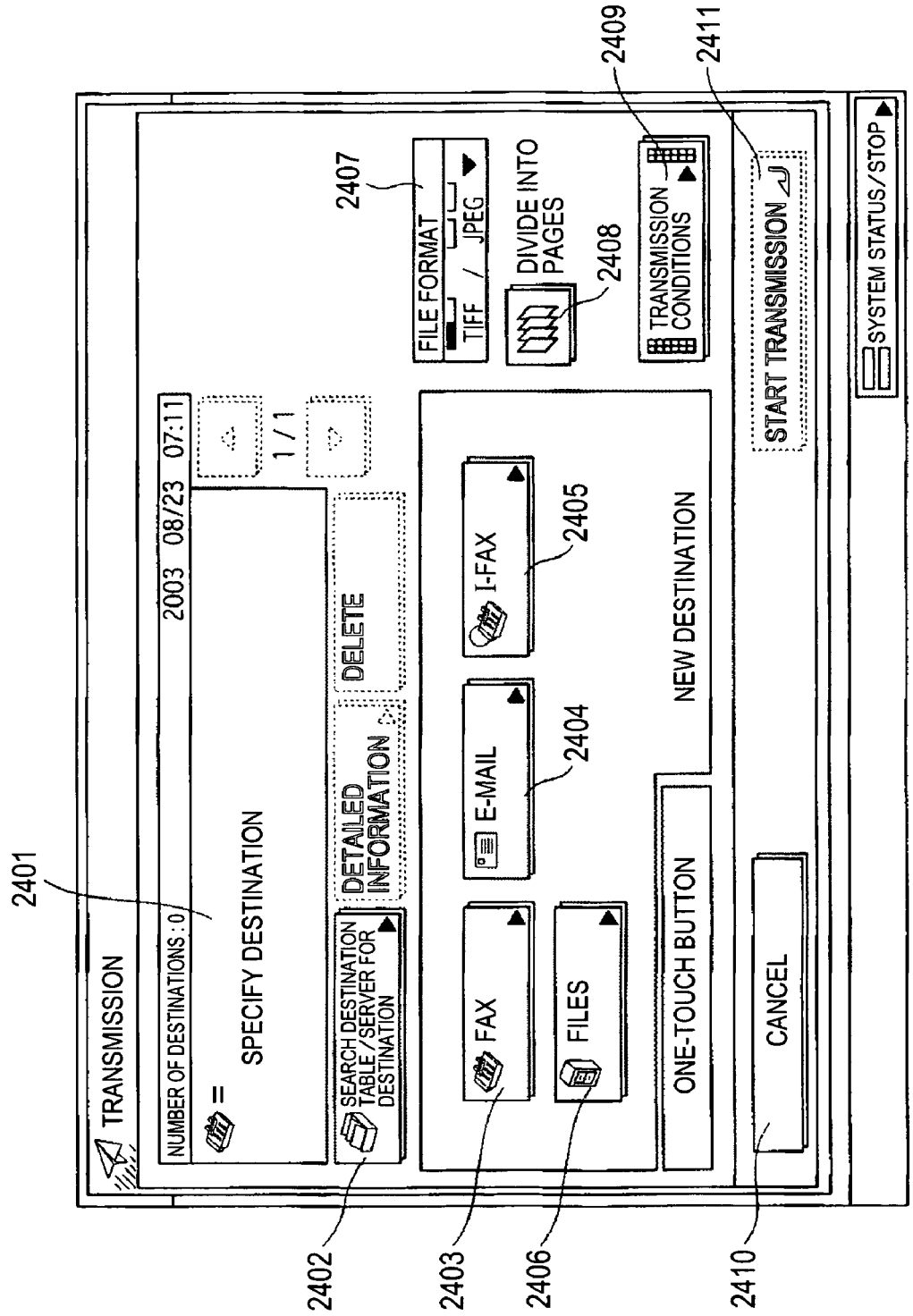
FIG. 20 shows an example of an operation screen for making settings associated with transmission conditions according to an embodiment of the present invention.
Figure 21:
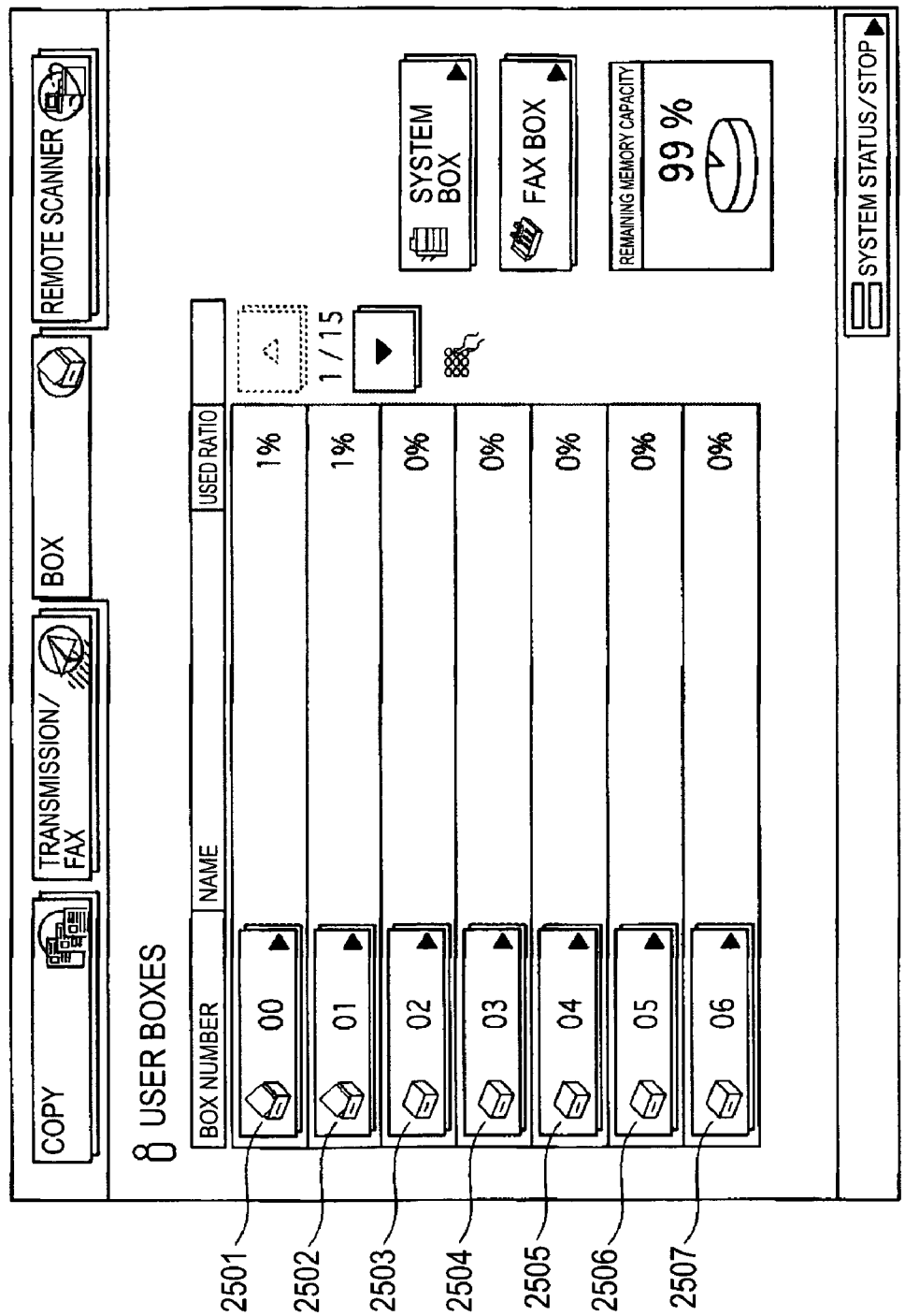
FIG. 21 shows an example of an operation screen for making settings associated with storing conditions according to an embodiment of the present invention.

In FIG. 20, a specified destination is displayed in an area 2401. A DESTINATION SEARCH button 2402 is used to search for a destination from a destination table. When a FAX button 2403 is selected, it is possible to specify a destination by a telephone number. When an E-MAIL button 2404 is selected, it is possible to specify a destination by an e-mail address. When an I-FAX button 2405 is selected, it is possible to specify a destination of internet facsimile transmission. When a FILES button 2406 is selected, it is possible to specify a filer server. The specified destination is displayed in the area 2401. A FILE FORMAT button 2407 is used to select a file format, such as a color/monochrome format, a TIFF (Tag Image File Format) format, JPEG (Joint Photographic Experts Group) format, and PDF (Portable Document Format) format. A button 2408 is used to specify whether image data should be divided into pages. When it is desired to transmit image data page by page, which is originally in a multi-page format, the button 2408 is pressed to divide the image data into pages. A TRANSMISSION CONDITIONS button 2409 is used to set further detailed transmission conditions such as a resolution. A CANCEL button 2410 is used to cancel the transmission. A START TRANSMISSION button 2411 is used to start the transmission. If the START TRANSMISSION button 2411 is pressed, as in the case in which the START PRINT button is pressed, the RGB luminance data of the image #5 specified, by the corresponding check box, to be transmitted is subjected to image processing necessary in transmission and is converted into a general JPEG file format for use in transmission. The resultant data is then transmitted over a network or a telephone line. Once the RGB luminance data is converted into the JPEG file format, the original RGB luminance data is no longer necessary, and thus the original RGB luminance data is deleted. In FIG. 20, if the START TRANSMISSION button 2411 is pressed, the transmission condition setting screen is closed, and the operation control screen 505 is switched to that shown in FIG. 23.

Figure 23:
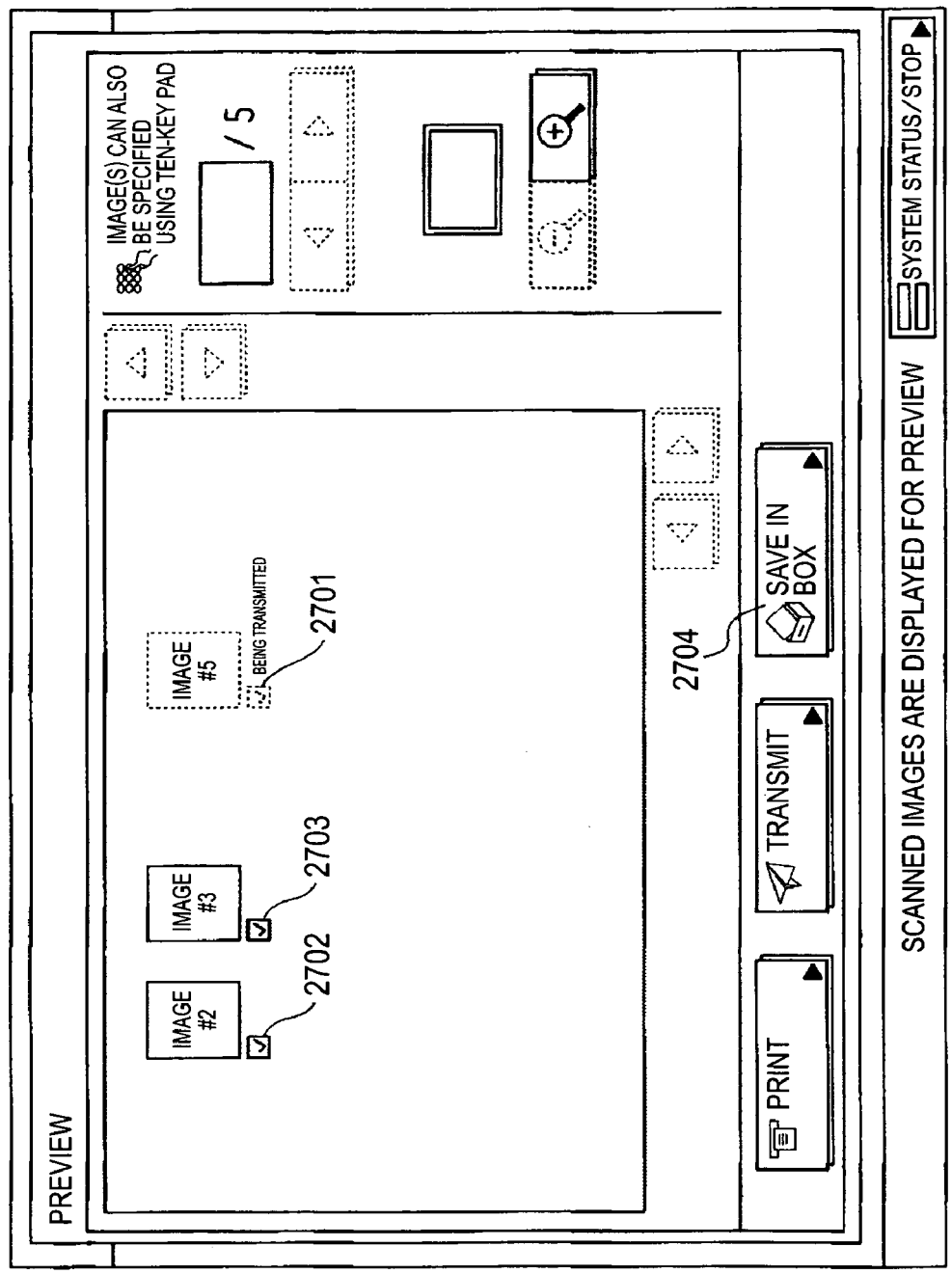
FIG. 23 shows an example of an operation screen in which information indicating that printing of some pages is completed and some page is being transmitted is displayed according to an embodiment of the present invention.

In the example of the image preview screen shown in FIG. 23, the image #5 denoted by reference numeral 2701 is displayed in a shaded form and a message is displayed to indicate that the image #5 is being transmitted. In this image preview screen shown in FIG. 23, the images #1 and #4 that were treated as being printed in the screen shown in FIG. 22 are now not displayed because the printing thereof is completed. In this state, if the user wants to save images #2 and #3, the user checks check boxes 2702 and 2703 corresponding to the images #2 and #3. After the check boxes 2702 and 2703 are checked, if the user presses the SAVE IN BOX button 2704, the operation control screen 505 is switched to the screen shown in FIG. 21 for setting saving conditions. In this screen shown in FIG. 21, a user is allowed to specify a box by its box number. If one of buttons 2501 to 2507 is pressed, the image is saved in a box corresponding to the pressed button. More specifically, RGB luminance data of the images #2 and #3 are converted into a special JPEG image format for use in saving and written in a storage area corresponding to the specified box on the hard disk 440. After the data conversion is completed, the RGB luminance data are deleted. The process of printing, transmitting, and saving the five image data displayed on the image preview screen, on a page-by-page basis, has been described above.

Figure 25B:
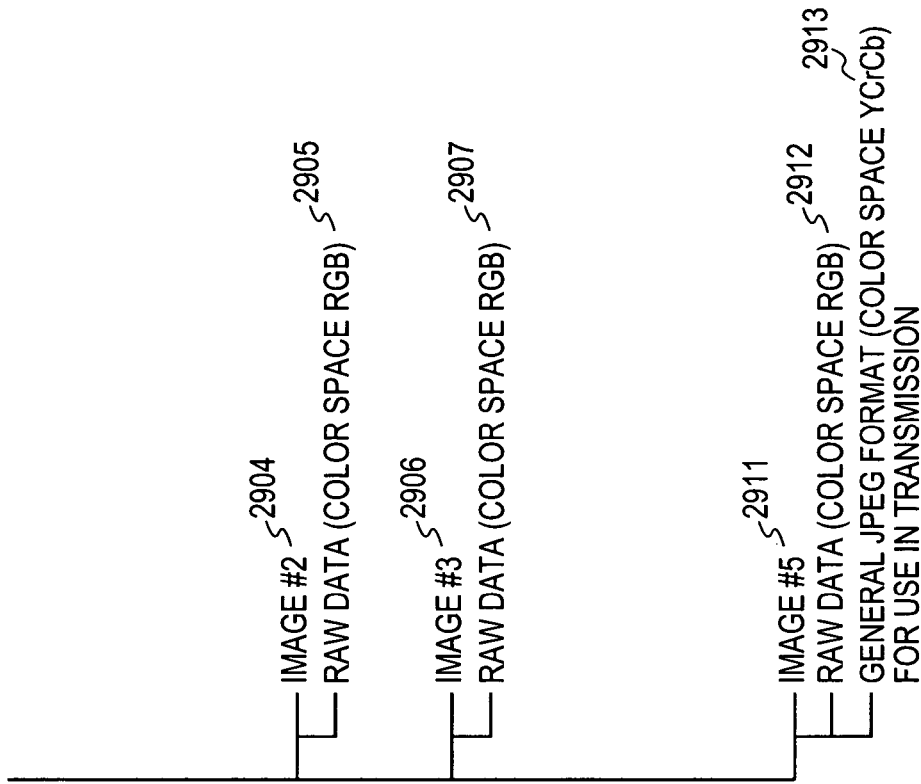
FIG. 25B shows an example of a diagram indicating a status in which already-used raw image data have been deleted, according to an embodiment of the present invention.
Figure 25A:
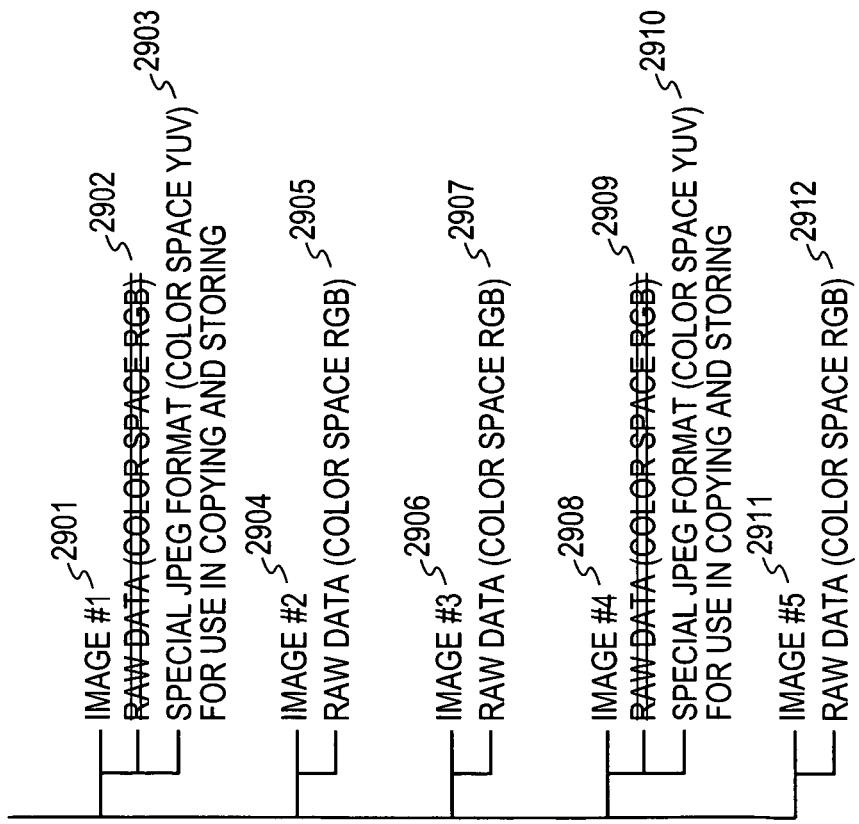
FIG. 25A shows an example of a diagram indicating a status in which raw image data is stored.

FIG. 25A shows a status of stored image data, and FIG. 25B shows a status of image data which are still retained (in the raw image data format) after some image data have been deleted. Referring to FIGS. 25A and 25B, by way of example, life cycles of the images #1 to #5 are described below. FIG. 25A shows the status of image data that exit in the storage area at a point of time at which the operation control screen 505 shown in FIG. 22 is displayed. At a point of time at which reading of documents is just completed, that is, in a state corresponding to FIG. 17, all image data are temporarily stored in the form of raw image data. That is, in this state, as shown in FIG. 25A, five images #1 to #5 denoted by reference numerals 2901, 2904, 2906, 2908, and 2911 are temporarily stored in the form of raw image data represented in the RGB color space as denoted by reference numerals 2902, 2905, 2907, 2909, and 2912. If the status comes into that shown in FIG. 22, the images #1 and #4 are being printed, and thus double cancel lines are superimposed on the raw RGB image data 2902 and 2909 of the images #1 and #4 to indicate that these raw image data have been deleted. Instead, the image data of the images #1 and #4 converted in the special JPEG format are retained in the storage area as denoted by reference numerals 2903 and 2910. The other images #2, #3, and #5 are still in the same status as the original status, that is, they are retained in the form of raw image data.

At a point of time at which the operation control screen 505 shown in FIG. 23 is displayed, the status of the image data are as shown in FIG. 25B. At this point of time, the printing of the images #1 and #4 is completed, and thus the image data 2903 and 2910 in the special JPEG format for use in copying have been deleted. The image #5 is in process for transmission. That is, the RGB luminance data 2912 is converted into the general JPEG format 2913 for use in transmission, and the RGB luminance data 2912 is deleted after completion of the data conversion. In the image forming apparatus according to the sixth embodiment, as described above, when conversion of image data into a format adapted for a specified process is completed, the original image data is deleted to prevent the available free storage space from being reduced by the original data that is no longer necessary.

Figure 26A:
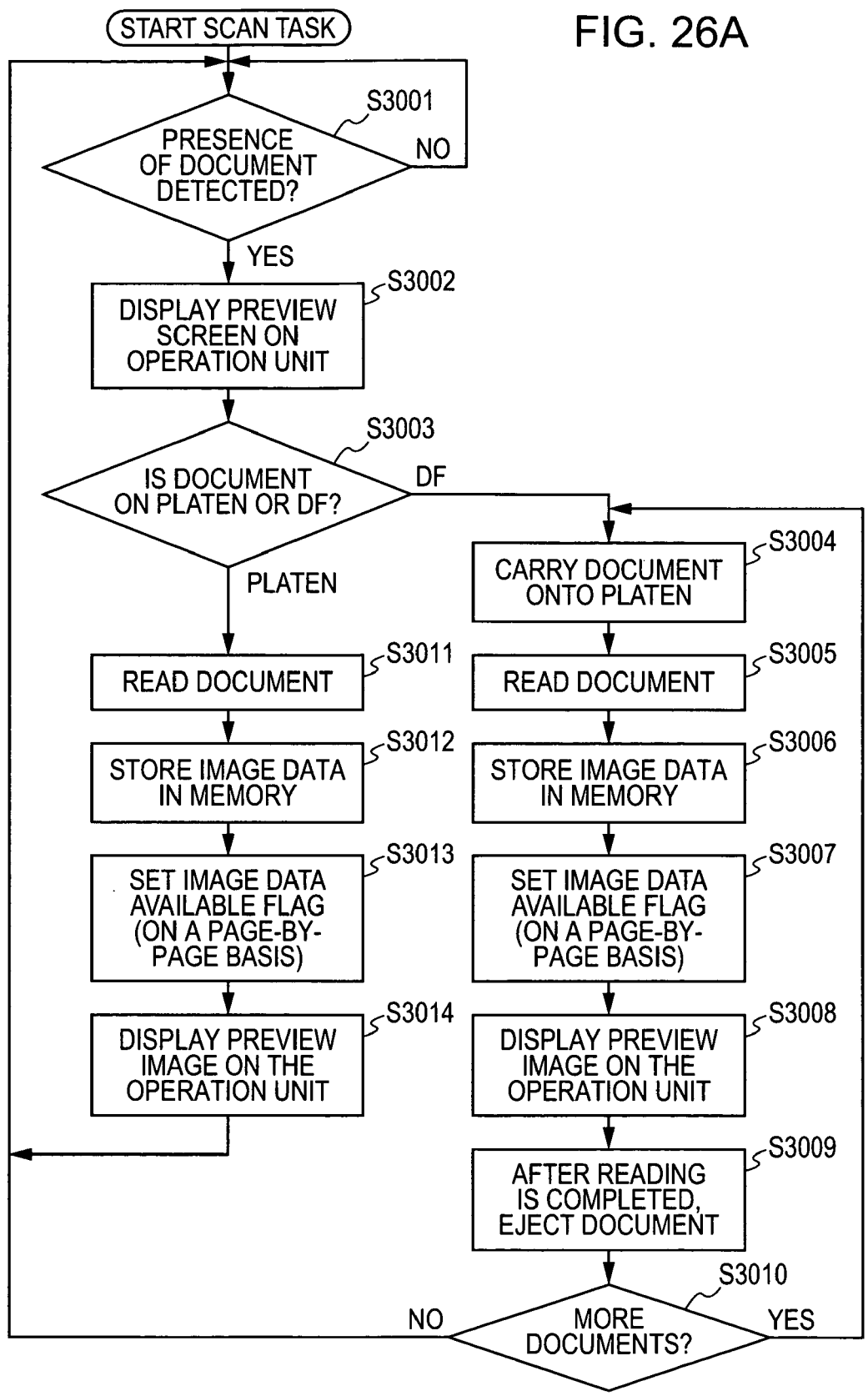

FIGS. 26A, 26B1, and 26B2 show a flow of a process of storing read image data in a general format (in the form of raw image data) according to the sixth embodiment. The process shown in FIGS. 26A, 26B1 and 26B2 is performed by the CPU 402 by reading a control program stored in the ROM 404 and executing it. The method of controlling the image forming apparatus according to the sixth embodiment is described below with reference to the flow chart shown in FIGS. 26A, 26B1 and 26B2. The process shown in FIGS. 26A, 26B1 and 26B2 is based on the process described earlier with reference to FIGS. 11A and 11B. FIG. 26A shows a scan task including a document pre-reading process, and FIGS. 26B1 and 26B2 show a task associated with an operation performed via the operation unit and a print/transmit/store process.

First, the scan task is explained. The CPU 402 checks whether there is a document based on a detection signal output by the document size sensors 331 to 335 or the document sensor 304 (step S3001). If no document is detected, the CPU 402 waits in step S3001 until a document is detected. If a document is detected, the CPU 402 displays a preview screen on the operation control screen 505 for displaying preview images of image data that will be acquired via a pre-reading operation (step S3002). The CPU 402 then determines whether the detected document is present on the platen (document glass plate) 307 or the DF 302, based on the detection signal output by the document size sensors 331 to 335 or the document sensor 304 (step S3003).

In the case in which it is determined in step S3003 that the document is present on the DF 302, the CPU 402 rotates the rollers and moves belts to carry the document onto the document glass plate 307 (step S3004). The CPU 402 then controls the CCD 343 to read the document (step S3005), and stores raw image data in the form of RGB luminance data into the memory (step S3006). If one page of image data is completely stored in the memory 205, the CPU 402 sets an image data availability flag associated with this one page of image data to indicate that the image data is ready to be printed (step S3007). The CPU 402 displays a preview image of the read image data on the operation control screen 505 (step S3008). Thereafter, the CPU 402 rotates the rollers and moves the belt to carry the document to the output tray 309 (step S3009). The CPU 402 then checks whether there is a next page of the original document (step S3010). If there is a next page, the process is repeated from step S3004 until the process is completed for all pages. If it is determined in step S3010 that there are no further pages, the CPU 402 ends the process of reading the original document.

On the other hand, in the case in which it is determined in step S3003 that the document is present on the platen 307, the CPU 402 operates the CCD 343 to read the document (step S3011), and stores acquired raw image data in the form of RGB data into the memory (step S3012). If the image data is completely stored in the memory 205, the CPU 402 sets an image data availability flag associated with this image data to indicate that the image data is ready to be printed (step S3013). The CPU 402 displays a preview image of the read image data on the operation control screen 505 (step S3014), and ends the reading process.

Now, the task associated with the operation performed on the operation unit and the print/transmit/store process is described with reference to FIGS. 26B1 and 26B2. The CPU 402 checks whether inputting is performed by a user via the operation unit 204 (step S3021). After the user sets a document on the document glass plate 307 or the DF 302, the user inputs a command by operating a key (for example, the ten-key pad 504 shown in FIG. 5) or a soft key (for example, the SCALE key 604 on the operation control screen 505 of the operation unit 204 shown in FIG. 6). Note that the CPU 402 is monitoring, in step S3021, an occurrence of inputting of a command.

If the CPU 402 detects, in step S3021, inputting of a command via the operation unit 204, the CPU 402 determines whether the command was issued by pressing the Start key (step S3022). In a case in which a key other than the Start key is pressed, the CPU 402 checks whether the pressed key is an image selection key (check box) on the preview screen (in step S3023). If not so, the CPU 402 performs a process corresponding to the pressed key (step S3025). The process performed herein in this step S3025 may be, for example, a process of specifying the number of copies, a process of specifying a full color mode or a monochrome mode, or a process of specifying finishing conditions such as stapling or binding. In the case in which it is determined in step S3023 that the pressed key is an image selection key, the CPU 402 sets a do-process flag so as to indicate that the selected one page of image data is specified to be processed (step S3024). The CPU 402 then displays a check symbol in the check box corresponding to the selected preview image. Thereafter, the process returns to step S3021. Note that when a do-process flag is in a set state, a corresponding check box on the preview screen shown in FIG. 17 is in a checked state.

In the case in which it is determined in step S3022 that the pressed key is the Start key, the CPU 402 examines do-process flags to check whether some page of image data stored in the memory is specified to be processed (step S3026). If the do-process flags indicate that no page of image data is specified to be processed, the CPU 402 displays a message (not shown) on the operation control screen 505 to inform that no image is selected (step S3027). Thereafter, the process returns to step S3021. On the other hand, if a do-process flag indicates that a page is specified to be processed, the CPU 402 advances the process to step S3028.

In step S3028, the CPU 402 determines which operation the pressed start key commands to start. If the print (copy) operation is specified to be started, the CPU 402 advances the process to step S3029. If the transmission is specified, the CPU 402 advances the process to step S3032. On the other hand, the CPU 402 advances the process to step S3036 when storing of data into a box is specified. In the case in which the start key commands that the copying operation should be performed, the CPU 402 converts the raw image data in the form of RGB luminance data specified by the do-process flag into the JPEG image format adapted for copying (step S3029), and the CPU 402 deletes the raw image data in the form of the RGB luminance data (step S3030). The CPU 402 then prints the image data converted in the JPEG image format adapted for copying (step S3031). After completion of the printing operation, the CPU 402 deletes the image data in the JPEG format that has been used (step S3035). In the case of transmission, the CPU 402 converts the raw image data in the form of RGB luminance data specified by the do-process flag into the JPEG image format adapted for transmission (step S3032), and the CPU 402 deletes the raw image data in the form of the RGB luminance data (step S3033). The CPU 402 then transmits the image data converted in the JPEG image format adapted for transmission (step S3034). After completion of the transmission operation, the CPU 402 deletes the image data in the JPEG format that has been used (step S3035). In the case of storing, the CPU 402 converts the raw image data in the form of RGB luminance data specified by the do-process flag into the JPEG image format adapted for storing (step S3036), and the CPU 402 deletes the raw image data (step S3037). The CPU 402 then stores the image data converted in the JPEG image format adapted for storing on the hard disk 440 (step S3038). After completion of the copying, transmission, or storing operation, the CPU 402 recalculates the remaining available memory space (step S3039). After completion of the operation sequence described above, the process returns to step S3021.

In the sixth embodiment, as described above, only image data that have already been acquired via the pre-reading process are displayed as preview images on the preview screen, it is not needed to check the image data availability flag (step S1124 in FIG. 11) to determine whether there is image data acquired via the pre-reading process.

By controlling the image forming apparatus in the above-described manner, it becomes possible to use the memory in an efficient manner. More specifically, in the image forming apparatus according to the sixth embodiment, raw image data acquired via the pre-reading is temporarily stored in the form of RGB luminance data. When a user determines a processing condition for a particular page of the image data, that page of the image data is converted into a format adapted for the specified processing and is output. When the data conversion is completed, the original image data becomes unnecessary and is deleted. This allows the storage area to be used in a highly efficient manner. Even when different image formats are needed for the copying operation, the transmission operation, and the storing operation, respectively, it is not needed to re-read the image data depending on the operation to be performed. In the present embodiment, for convenience of explanation, the process is performed on a page-by-page basis. However, it is not necessarily needed to perform the process on a page-by-page basis, but the process may be performed at a time for all pages that have been read or for all pages that will be read. The present embodiment provides great advantages in particular when it is needed to make complicated settings for a large number of pages that need a long time to read (for example, in the binding mode or the like). Another advantage is that the capability of displaying a preview image of each image data allows a user to make settings of processing conditions for each image data.

In the sixth embodiment, as shown in FIG. 18, it is allowed to display each preview image in an enlarged fashion. It is also allowed to enlarge a plurality of specified preview images (the images #1 to #5 in the example described above) by pressing the enlargement (+) button 2102.

Seventh Exemplary Embodiment

In the sixth embodiment described above, a general-purpose image format (in the form of raw RGB luminance data) is used. The general-purpose image format has the advantage that no information is lost during image processing such as a data compression. However, the general-purpose image format needs a large data size and thus can reduce the performance of the image forming apparatus depending on hardware performance (such as an access speed of the hard disk). In the seventh embodiment, to prevent the above problem, instead of storing raw image data in the form of RGB luminance data, image data is stored in a plurality of different formats that may be used in an operation that will be specified later by a user. When the JPEG format, the PDF format, or other similar formats are used, it is possible to reduce the data size by a specified factor, such as 1/2, 1/4, 1/8, or 1/16. Therefore, when image data is stored in eight or less different formats, if the compression ratio of these eight formats is, for example, 1/8, then the total data size can be less than the data size of the raw image data.

In this method of controlling the image forming apparatus according to the seventh embodiment, the functional block structure, the mechanical structure and the hardware structure of the image forming apparatus and the structure of the operation unit 204 are similar to those according to the previous embodiments described above with reference to FIGS. 2 to 5, and the operation control screen 505 is similar to that according to the sixth embodiment. Therefore, the following discussion will be focused on the features of the image forming apparatus according to the seventh embodiment. That is, in the following discussion, the life cycle of image data will be described with reference to FIGS. 24A and 24B, and the process shown in FIGS. 27A, 27B1 and 27B2 will be described.

Figure 24A:
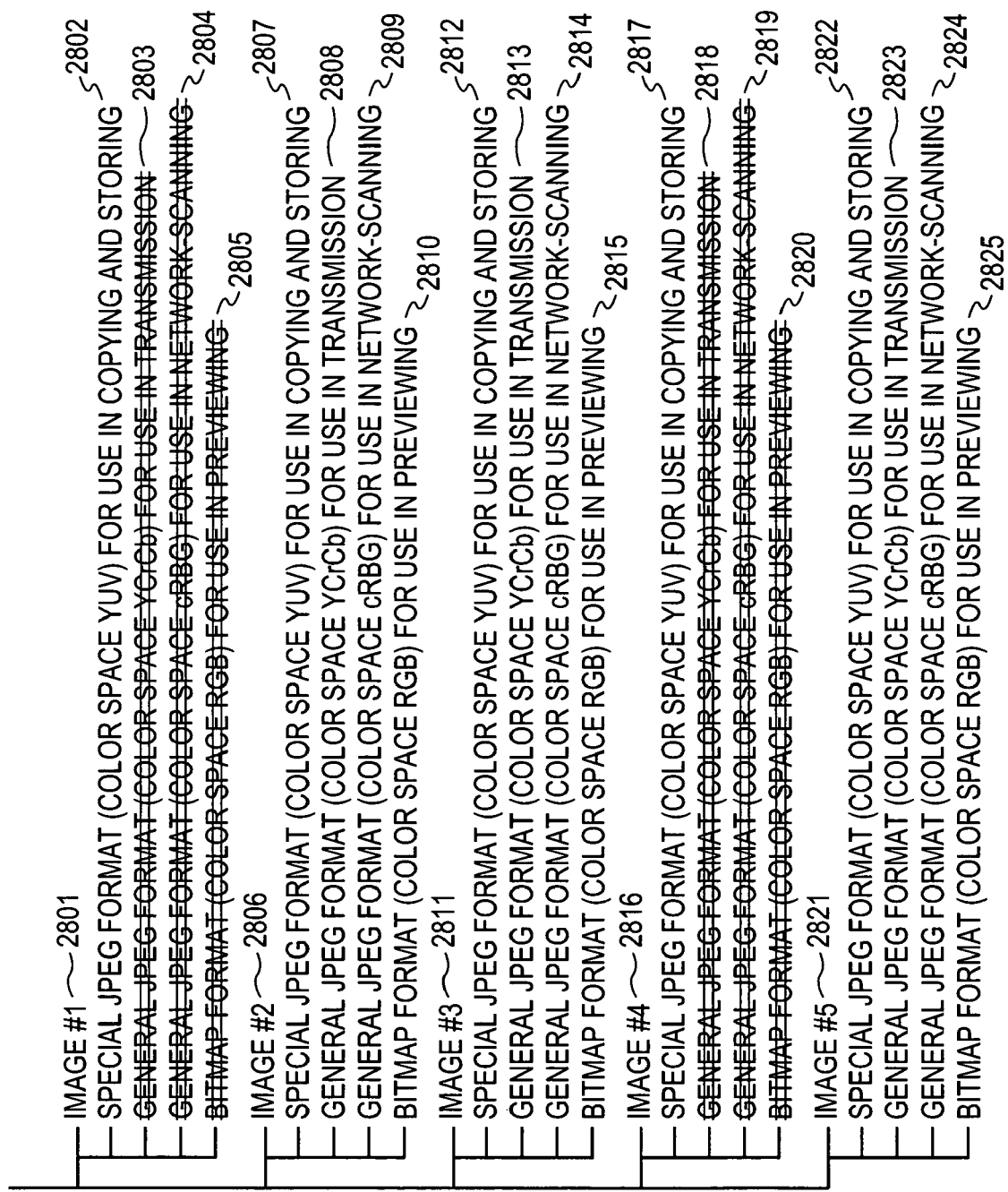
FIG. 24A shows an example of a diagram indicating a status in which image data is stored in all possible formats.
Figure 24B:
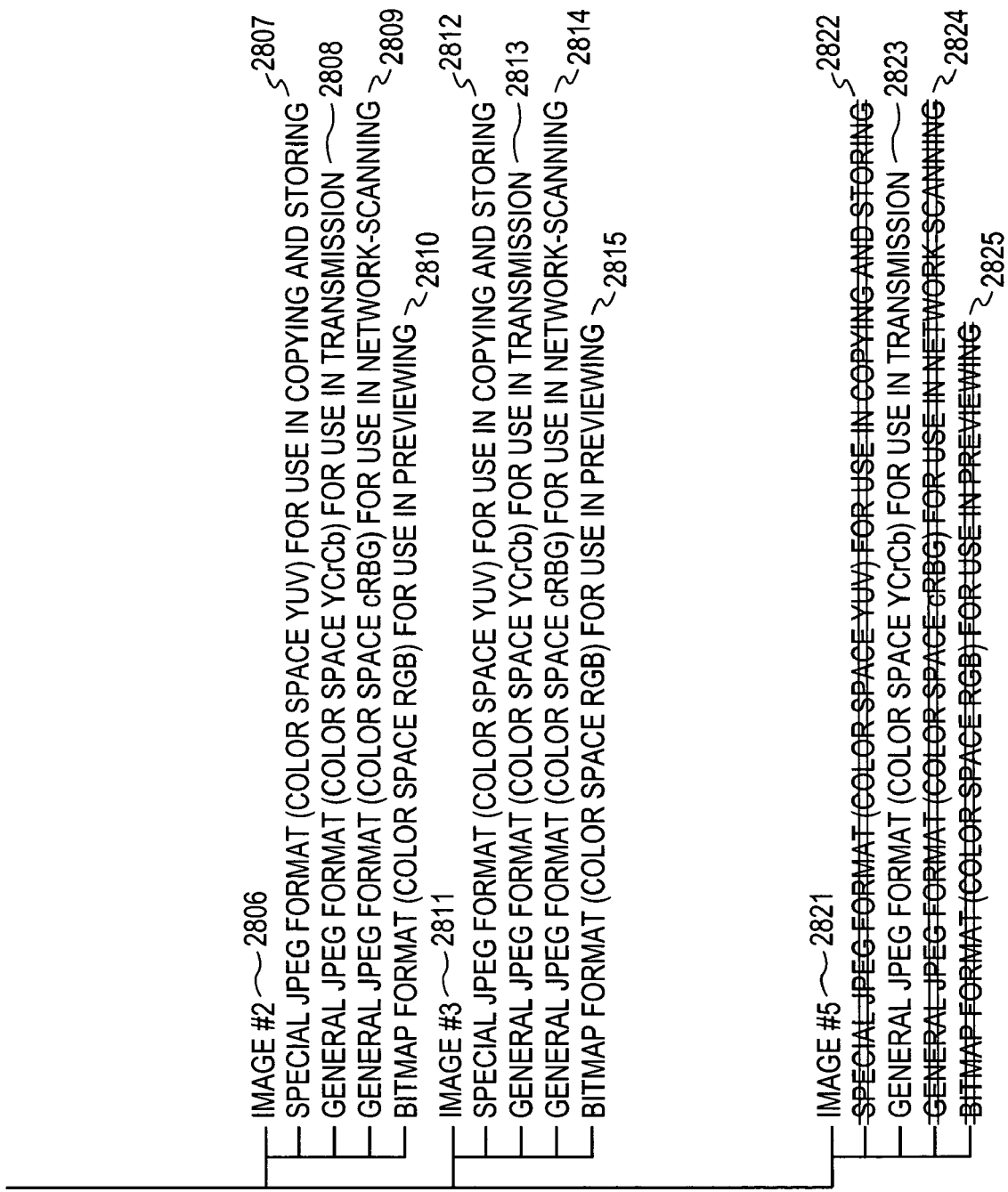
FIG. 24B shows an example of a diagram indicating a status in which already-used image data have been deleted, according to an embodiment of the present invention.

FIG. 24A shows an example of a status in which image data is stored in all possible formats, and FIG. 24B shows an example of a status in which already-used image data have been deleted. More specifically, FIG. 24A shows the status of image data that exit in the storage area at a point of time at which the operation control screen 505 shown in FIG. 22 is displayed. At the point of time at which reading of image data displayed on the screen shown in FIG. 17 is completed, the image forming apparatus retains five images #1 to #5 denoted by reference numerals 2801, 2806, 2811, 2816, and 2821, which are all stored in a plurality of image formats, that is, a special JPEG format adapted for copying, a general JPEG format for transmission, a general JPEG format for network scanning, and a bitmap format for previewing. In the example shown in FIGS. 24A and 24B, image data in the special JPEG format for copying are denoted by reference numerals 2802, 2807, 2812, 2817, and 2822, image data in the general JPEG format for transmission by reference numerals 2803, 2808, 2813, 2818, and 2823, image data in the general JPEG format for network scanning by reference numerals 2804, 2809, 2814, 2819, and 2824, and image data in the bitmap format for previewing by reference numerals 2805, 2810, 2815, 2820, and 2825. Thereafter, in the present example, at some point of time, the image #1 and the image #4 are specified to be printed. At the point of time corresponding to FIG. 22, only the image data of the image #1 (2801) in the special JPEG format for copying (2802) is retained, but image data in the other formats 2803, 2804, and 2805 are deleted (as represented by double cancel lines in FIG. 24A). Similarly, as for the image #4 (2816), only the image data in the special JPEG format for copying (2817) is retained, but image data in the other formats 2818, 2819, and 2820 are deleted.

FIG. 24B shows the status of image data at the point of time corresponding to FIG. 23. At this point of time, printing of the images #1 and #4 has been completed, and thus image data of the images #1 and #4 in any format have been completely deleted. At this point of time, the image #5 (2821) has been specified to be transmitted, and thus only the image data in the format for transmission 2823 is retained but image data in the other formats 2822, 2824, and 2825 are all deleted.

Figure 27A:
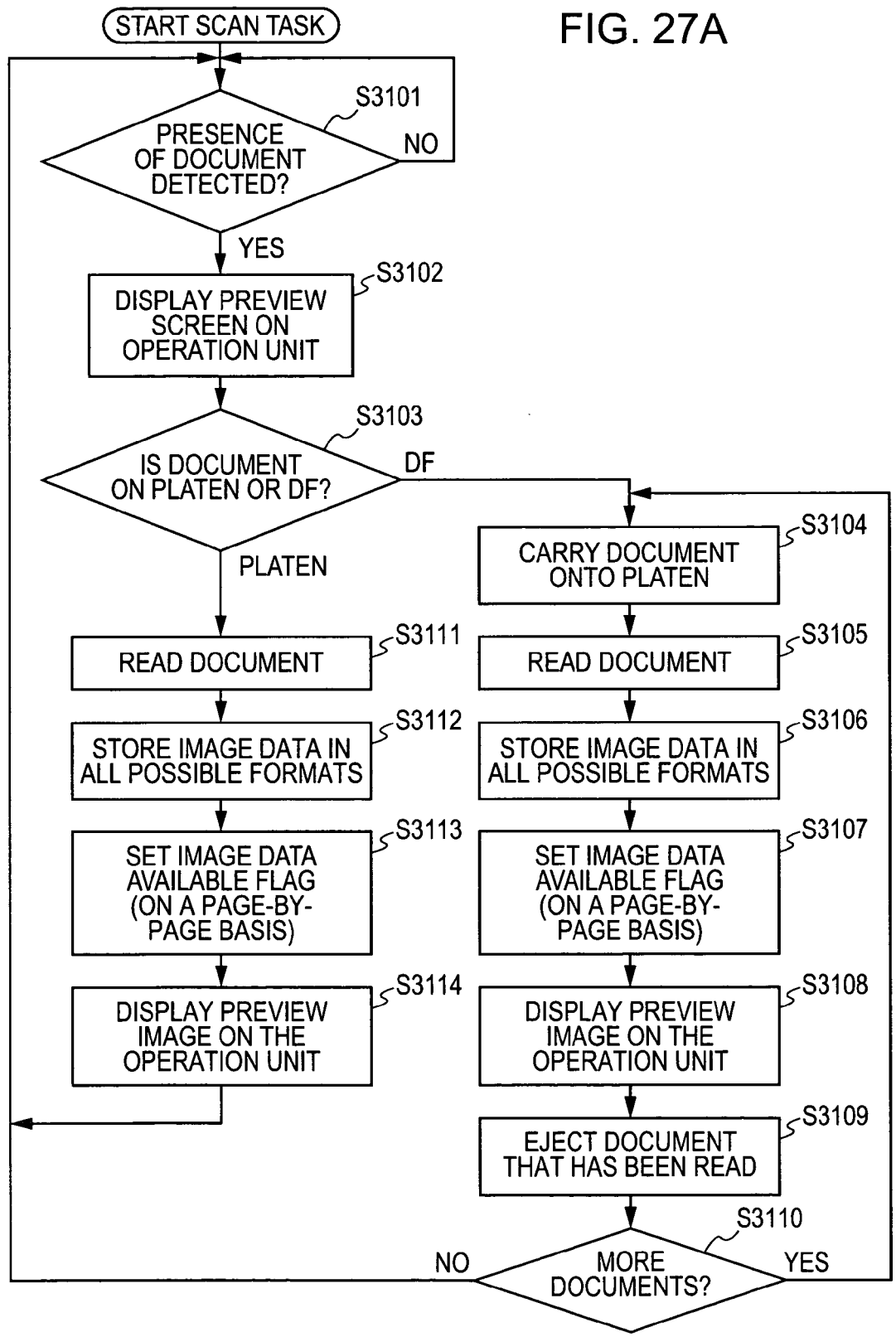
Figure 28B:
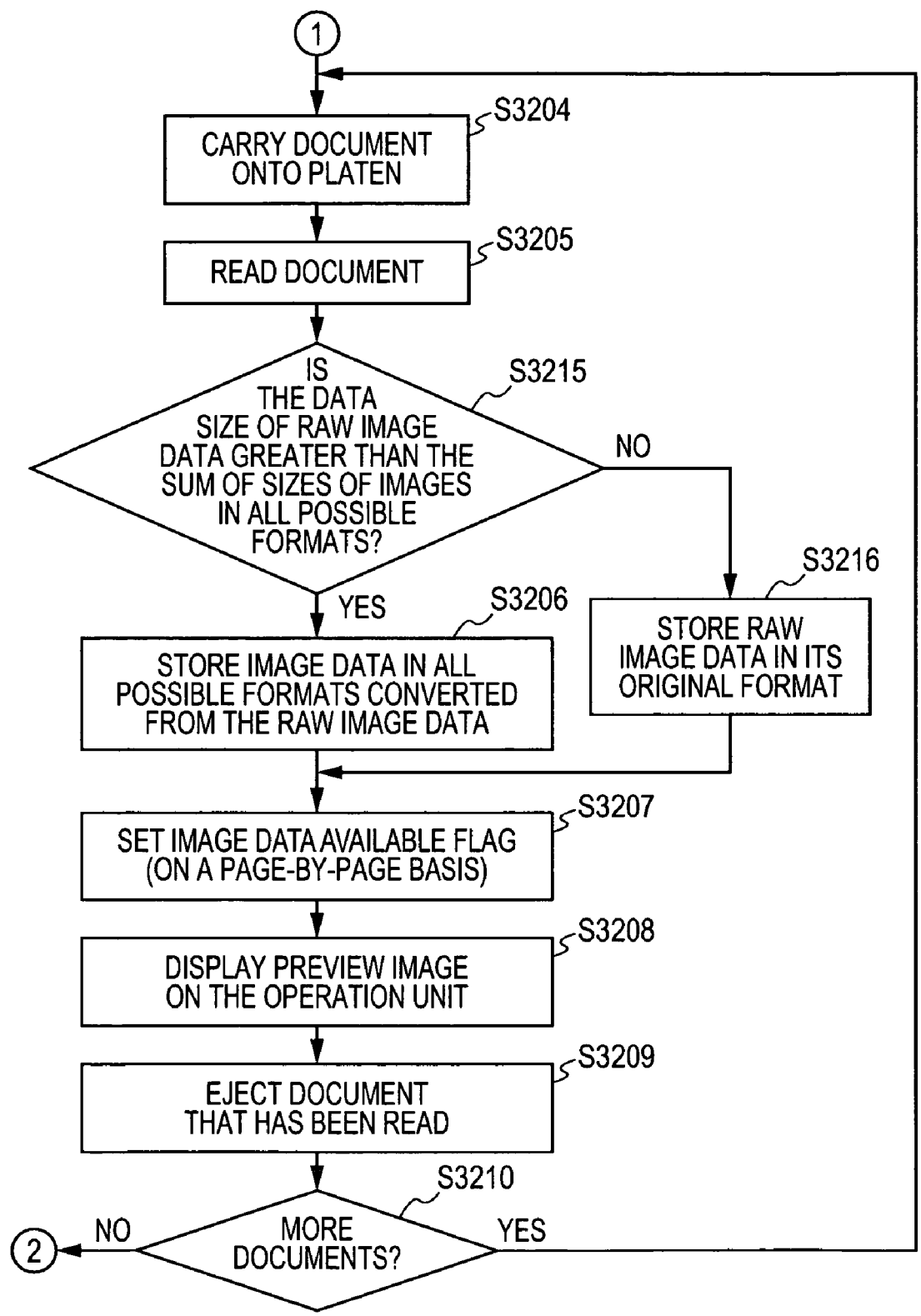

FIGS. 27A, 27B2 and 27B2 are flow charts showing an exemplary process performed by the CPU 402 of the main controller 401 according to the seventh embodiment. In this process, image data are stored in all possible formats. The process shown in FIG. 27 is performed by the CPU 402 by reading a control program stored in the ROM 404 and executing it. The method of controlling the image forming apparatus according to the seventh embodiment is described below with reference to the flow chart shown in FIG. 27. The process shown in FIGS. 27A, 27B1 and 28B2 is based on the process described earlier with reference to FIGS. 26A, 26B1 and 26B2. FIG. 27A shows a scan task including a document pre-reading process, and FIGS. 27B1 and 27B2 show a task associated with an operation performed via the operation unit and a print/transmit/store process.

The scan task shown in FIG. 27A is performed in a similar manner to that shown in FIG. 26A except for step S3112 performed by the CPU 402 to store image data when the platen 307 is used and step S3106 to store image data when the DF 302 is used. In these steps, the CPU 402 converts each page of image data into all possible image formats such as those described earlier with reference to FIGS. 24A and 24B. The other steps are similar to those in the scan task shown in FIG. 26A. Now, the task associated with the operation performed via the operation unit and the print/transmit/store process shown in FIGS. 27B1 and 27B2 is described. This task is similar to that shown in FIGS. 26B1 and 26B2 except that the CPU 402 retains only a page of image data in a format that has been determined to be used in a following operation (in step S3129 in the case of the copying operation, step S3132 in the case of the transmission operation, or in step S3136 in the case of the storing operation) but the CPU 402 deletes the page of image data in any other format (in step S3130 in the case of the copying operation, step S3133 in the case of the transmission operation or step S3137 in the case of the storing operation).

In the image forming apparatus according to the seventh embodiment, as described above, the formats of image data and storing/deleting of image data are controlled so that the necessary memory capacity is minimized, thereby preventing the memory capacity from becoming insufficient that would occur if raw RGB image data were directly stored.

Eighth Exemplary Embodiment

In an eighth embodiment, an exemplary process is performed in a processing mode similar to that disclosed in the sixth embodiment or in a processing mode similar to that disclosed in the seventh embodiment, wherein the processing mode is switched depending on the data size of a given image data. In this method of controlling the image forming apparatus according to the eighth embodiment, the functional block structure, the mechanical structure and the hardware structure of the image forming apparatus and the structure of the operation unit 204 are similar to those according to the previous embodiments described above with reference to FIGS. 2 to 5, and the operation control screen 505 is similar to that according to the sixth and seventh embodiments. The features of the image forming apparatus according to the eighth embodiment are described below with reference to flow charts shown in FIGS. 28A and 28B.

In the process shown in FIGS. 28A and 28B, the CPU 402 of the main controller 401 determines whether image data should be stored in the form of raw image data or in all possible formats and stores image data in the determined manner. The process shown in FIG. 28 is performed by the CPU 402 by reading a control program stored in the ROM 404 and executing it. The method of controlling the image forming apparatus according to the eighth embodiment is described below with reference to the flow charts shown in FIGS. 28A and 28B. The process shown in FIGS. 28A and 28B is a scan task including a document pre-reading process and is based on the process described above with reference to FIG. 26A.

The scan task shown in FIGS. 28A and 28B is similar to that shown in FIG. 26A except that step S3012 in FIG. 26A is replaced with steps S3217, S3212, and S3218, and step S3006 in FIG. 26A is replaced with steps S3215, S3206, and S3216, and thus the following discussion will be focused on these differences.

That is, the CPU 402 reads document image data (in step S3205 in the case where the DF 302 is used or in step S3211 in the case where the platen 307 is used). The CPU 402 calculates the data size of acquired raw image data and the total data size of image data converted into all possible formats such as those described earlier with reference to FIGS. 24A and 24B. The CPU 402 then compares the data size of the raw image data with the total data size of image data in all possible formats (in step S3215 in the case where the DF 302 is used or in step S3217 in the case where the platen 307 is used). In accordance with the result of the comparison, the CPU 402 determines whether only the image data should be stored in the form of the raw RGB image data or the image data should be stored in all possible formats without storing the raw RGB image data so that the data size of stored image data becomes smaller. More specifically, when the data size of the raw image data in the form of RGB luminance data is less than or equal to the total data size of image data converted into all possible formats, the CPU 402 stores the raw image data in the memory (in step S3216 in the case where the DF 302 is used or in step S3218 in the case where the platen 307 is used). When the total data size of image data converted in all possible formats is less than the data size of the raw image data, the CPU 402 stores in the memory the image data converted in all possible formats such as those described earlier with reference to FIGS. 24A and 24B without storing the raw image data (in step S3206 in the case where the DF 302 is used or in step S3213 in the case where the platen 307 is used).

Although no flow chart similar to that shown in FIGS. 26B1 and 26B2 is provided, a task associated with an operation performed via the operation unit and a print/transmit/store process according to the eighth embodiment is performed as follows. In the eighth embodiment, the task associated with the operation performed via the operation unit and the print/transmit/store process is a mixture of that shown in FIGS. 26B1 and 26B2 and that shown in FIGS. 27B1 and 27B2. That is, in a step before step S3028, the CPU 402 determines whether image data specified by a do-process flag to be performed is in the form of raw image data. If it is determined that the image data is in the form of raw image data, the CPU 402 performs steps S3028 to S3039. However, it is determined that the image data is not in the form of raw image data, the CPU 402 performs steps S3128 to S3139.

Ninth Exemplary Embodiment

In this ninth embodiment, an exemplary handling process performed when the remaining available memory space becomes insufficient is discussed. In this method of controlling the image forming apparatus according to the ninth embodiment, the functional block structure, the mechanical structure and the hardware structure of the image forming apparatus and the structure of the operation unit 204 are similar to those according to the previous embodiments described above with reference to FIGS. 2 to 5. In the sixth to eighth embodiments described above, image data is stored in an efficient manner so that the data size is minimized. However, when a large number of images are stored, there is a possibility that the available memory space becomes insufficient. In the ninth embodiment, the operation control screen 505 is similar to that according to the sixth to eighth embodiments, and thus a duplicated explanation thereof is omitted herein, and only the features of the process according to the ninth embodiment are described with reference to the flow charts shown in FIGS. 29A and 29B.

Figure 29B:
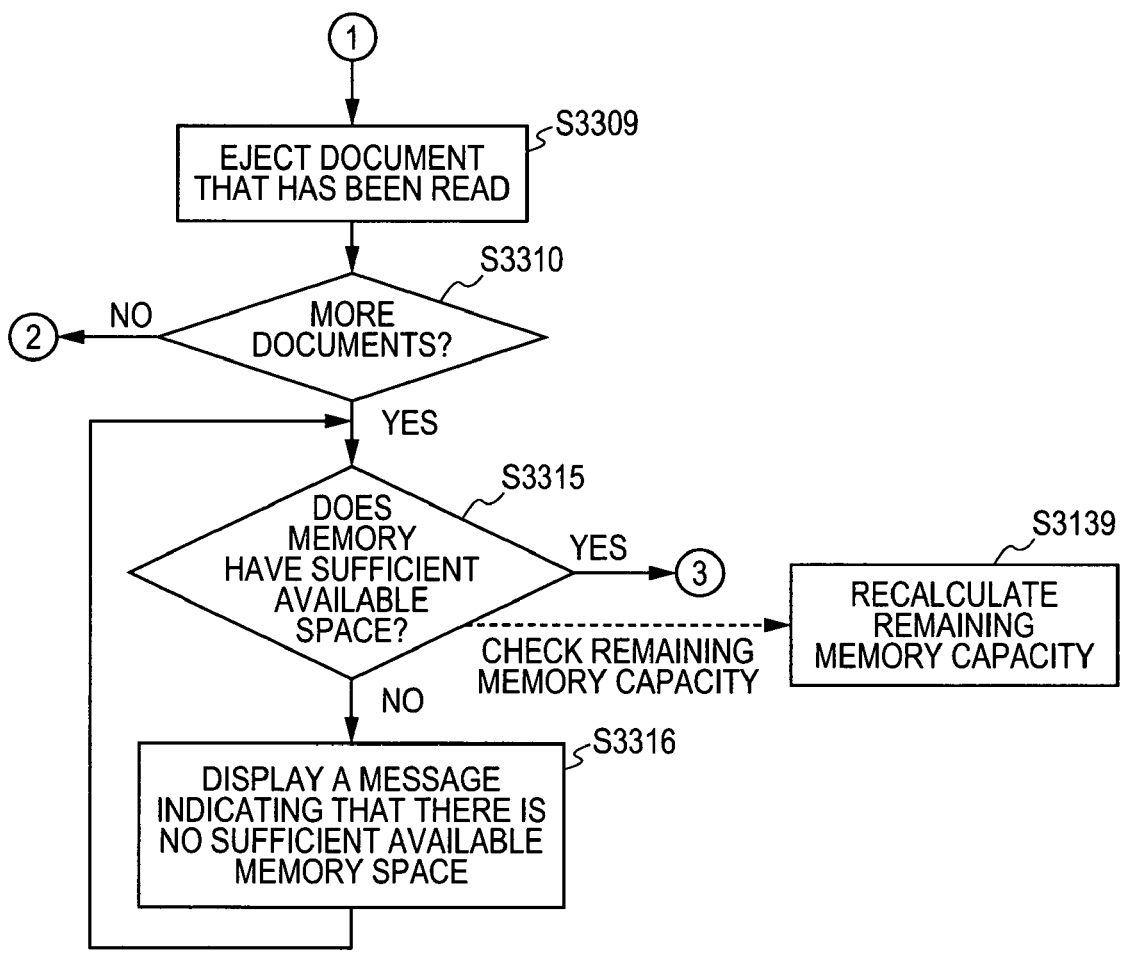

FIGS. 29A and 29B show the process performed by the CPU 402 of the main controller 401 according to the ninth embodiment. In this process, image data are stored in all possible formats. Note that the process shown in FIGS. 29A and 29B is performed by the CPU 402 by reading a control program stored in the ROM 404 and executing it. The method of controlling the image forming apparatus according to the ninth embodiment is described below with reference to the flow chart shown in FIGS. 29A and 29B. The method of controlling the image forming apparatus according to the ninth embodiment is based on that described earlier with reference to the flow charts shown in FIGS. 26 to 28. For convenience, in the explanation of the scan task including the pre-reading process, the flow charts shown in FIGS. 27B1 and 27B2 are referred to as required. Although in the following explanation, FIGS. 27B1 and 27B2 are referred to, the features of the process according to the ninth embodiment described herein may also be incorporated into the process shown in FIGS. 26B1 and 26B2 or the process shown in FIG. 28B.

In the operation using the DF 302, the CPU 402 checks whether there is a next document (step S3310). If there is a next page, the process proceeds to step S3315. In this step S3315, the CPU 402 checks whether the memory has a sufficient available space (to store at least one page of image data). This determination is performed based on the available memory space recalculated in step S3139 in FIG. 27B2 after completion of deleting image data that has been printed, transmitted, or stored. If it is determined that the memory has a sufficient available space, the CPU 402 returns the process to step S3304 to feed a next document. However, if it is determined that the memory does not have a sufficient available space, the CPU 402 advances the process to step S3316 to display a message (not shown) on the operation control screen 505 to indicate that the memory does have a sufficient available space. Thereafter, the process returns to step S3315 to repeat the checking of the available memory space.

If the user may issue a command (a copy command, a transmit command, a store command, etc.) via the operation unit 204 in response to the message displayed in step S3316, then the CPU 402 performs the process in the user operation/print/transmit/store task shown in FIGS. 26 to 28 in accordance with the command issued by the user. That is, image data that has been processed is deleted, and the remaining available memory space is recalculated in step S3139. If the available memory space becomes sufficient to store image data of the next document, the answer to the decision step S3315 becomes affirmative, and reading of the next document is performed.

In the ninth embodiment, as described above, the image forming apparatus is controlled such that when the remaining available memory space becomes insufficient, the used memory space is released by performing a particular operation in accordance with a command issued by a user, thereby increasing the available memory space to a level that allows the following processes to be performed. Furthermore, in the ninth embodiment, an optimum format for image data temporarily stored in the memory can be selected depending on the features of the image, and thus the memory space can be highly efficiently used.

Tenth Exemplary Embodiment

In this tenth embodiment, when the remaining available memory space becomes insufficient, the format used to store image data is varied or unnecessary image data deleted depending on the remaining available memory space. In this method of controlling the image forming apparatus according to the tenth embodiment, the functional block structure, the mechanical structure and the hardware structure of the image forming apparatus and the structure of the operation unit 204 are similar to those according to the previous embodiments described above with reference to FIGS. 2 to 5. In the sixth to eighth embodiments described above, image data is stored in an efficient manner so that the data size is minimized. However, there is still a possibility that the remaining available memory space becomes insufficient. In such a case, in the tenth embodiment, a handling process is performed as follows. That is, the image forming apparatus according to the tenth embodiment has a plurality of memory capacity warning levels. If the remaining memory capacity becomes lower than one of these warning levels, the data format used to temporarily store image data is varied depending on the warning level, a warning message is displayed on the operation screen, and reading of documents is stopped. In this tenth embodiment, the operation control screen 505 is similar to that according to the sixth to eighth embodiments. The following discussion described below with reference to FIGS. 30A and 30B will be focused on the features of the process performed the image forming apparatus according to the tenth embodiment.

Figure 30B:
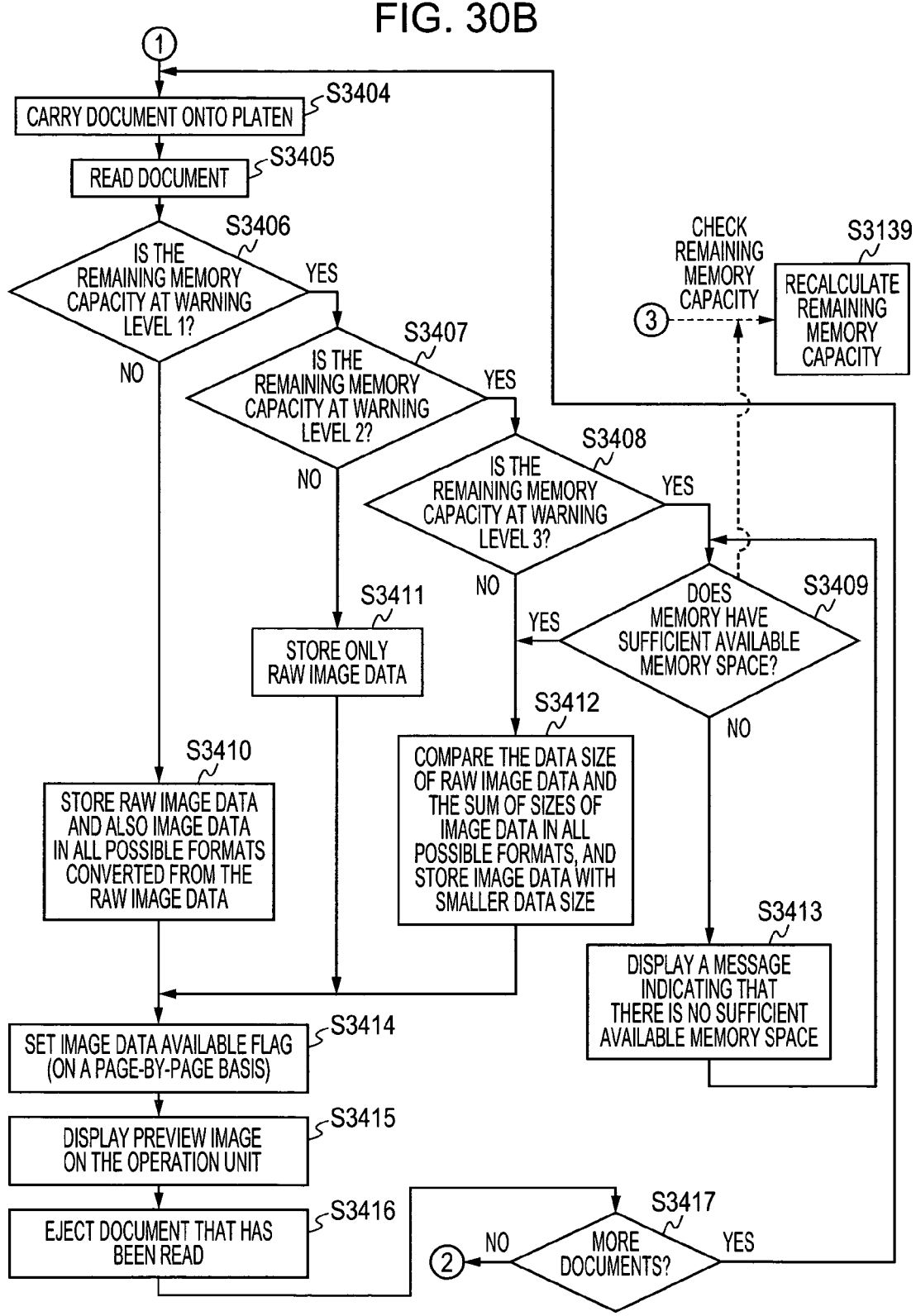

In the process shown in FIGS. 30A and 30B according to the tenth embodiment, the CPU 402 of the main controller 401 properly controls the formats of image data stored in the memory depending on the remaining available memory capacity. The process shown in FIGS. 30A and 30B is performed by the CPU 402 by reading a control program stored in the ROM 404 and executing it. The method of controlling the image forming apparatus according to the tenth embodiment is described below with reference to the flow chart shown in FIGS. 30A and 30B. The process shown in FIGS. 30A and 30B is a scan task including a document pre-reading process and is based on the process described above with reference to FIGS. 26 to 29.

The CPU 402 checks whether there is a document based on a detection signal output by the document size sensors 331 to 335 or the document sensor 304 (step S3401). If no document is detected, the CPU 402 waits in step S3401 until a document is detected. If a document is detected, then, before a document pre-reading operation is started, the CPU 402 displays a preview screen on the operation control screen 505 for displaying preview images of image data that will be acquired via a pre-reading operation (step S3402). The CPU 402 determines whether the detected document is present on the platen (document glass plate) 307 or the DF 302, based on the detection signal output by the document size sensors 331 to 335 or the document sensor 304 (step S3403). In the case in which it is determined in step S3403 that the document is present on the DF 302, the CPU 402 rotates the rollers and moves belts to carry the document onto the document glass plate 307 (step S3404). The CPU 402 then operates the CCD 343 to read the document (step S3405).

Then, in step S3406, the CPU 402 determines whether the remaining available memory space has reached a warning level 1 predetermined and pre-stored in the memory. This determination is made by checking the remaining available memory space recalculated in step S3039 (shown in FIG. 26B2) or S3139. If the remaining available memory space does not have reached the warning level 1, the CPU 402 determines that the memory has a sufficient remaining available memory space. In this case, the CPU 402 stores image data in the form of raw RGB image data and also image data converted into all possible formats in the memory (step S3410). In the case in which the remaining available memory space is lower than the warning level 1, the CPU 402 advances the process to step S3407 and determines whether the remaining available memory space has reached a warning level 2 predetermined and pre-stored in the memory. If the remaining available memory space is in the range from the warning level 1 to the warning level 2, the CPU 402 advances the process to step S3411 and stores only the image data in the form of raw RGB image data in the memory. In the case in which the remaining available memory space is lower than the warning level 2, the CPU 402 advances the process to step S3408 and determines whether the remaining available memory space has reached a warning level 3 predetermined and pre-stored in the memory. If the remaining available memory space is in the range from the warning level 2 to the warning level 3, the CPU 402 advances the process to step S3412. In step S3412, the CPU 402 stores only the raw RGB image data into the memory if the data size of the raw RGB image data is less than the total data size of image data converted into all possible formats, but the CPU 402 stores only image data converted into all possible formats if the total size of image data converted in all possible formats is less than the data size of the raw RGB image data (only the raw RGB image data is stored when the data size is equal).

In the case in which the remaining available memory space is lower than the warning level 3, the CPU 402 advances the process to step S3409. In step S3409, the CPU 402 checks whether the memory has a sufficient available space (to store at least one page of image data). If it is determined that the memory does not have a sufficient remaining available space, the CPU 402 advances the process to step S3413 to display a warning message (not shown) on the operation control screen 505. The CPU 402 then prompts a user to issue a command to perform one of the printing operation, the transmission operation, and the storing operation on some temporarily stored image data. If the operation is performed on some temporarily stored image data, that image data becomes no longer necessary, and thus the image data is deleted. If the remaining available memory space becomes sufficient as a result of the deletion, the CPU 402 advances the process to step S3412 to store image data in the memory. The CPU 402 then sets the image data availability flag associated with this image data (one page of image data) (step S3414), and displays a preview image of the read image data on the operation control screen 505 (step S3415). Thereafter, the CPU 402 rotates the rollers and moves the belt to carry the document to the output tray 309 (step S3416). The CPU 402 then checks whether there is a next document page (step S3417). If there is a next page, the CPU 402 returns the process to step S3404 to read the next document page. If there are no more document pages, the process returns to step S3401.

The process of reading document sheets placed on the DF 302 has been described above. In the case in which the CPU 402 determines in step S3403 that the document is not on the DF 302 but on the platen 307, the CPU 402 performs steps S3418 to S3428 in a similar manner to the case in which the document is on the DF 302. The process in step S3411 or S3412 to store only image data with a particular format may be performed only for a page read in step S3405 or for all pages that have already been read.

Although no flow chart similar to that shown in FIGS. 26B1 and 26B2 is provided, a task associated with an operation performed via the operation unit and a print/transmit/store process according to the tenth embodiment is performed as follows. In the tenth embodiment, the task associated with the operation performed via the operation unit and the print/transmit/store process is a mixture of that shown in FIGS. 26B1 and 26B2 and that shown in FIGS. 27B1 and 27B2. That is, in a step before step S3028, the CPU 402 determines whether image data specified by a do-process flag to be performed has been stored as raw image data or as image data converted into all possible formats. If it is determined that the image data is in the form of raw image data, the CPU 402 performs steps S3028 to S3039. However, it is determined that the image data is in all possible formats, the CPU 402 performs steps S3128 to S3139.

In a step before step S3028, the CPU 402 also determines whether image data specified by a do-process flag to be performed has been stored as raw image data and also as image data converted into all possible formats. If so, the CPU 402 performs the following process. That is, if the process in step S3025 is concerned with an image with high image quality, the CPU 402 performs steps S3028 to S3039 using raw image data such that no information is lost during the process, and the CPU 402 deletes image data converted in all possible formats. On the other hand, if the process in step S3025 is not concerned with an image with high image quality, an information loss due to a data compression is allowed and thus the CPU 402 performs steps S3128 to S3139 using image data converted in all possible formats, and the CPU 402 deletes the raw image data.

In the image forming apparatus according to the tenth embodiment, as described above, the format of image data stored in the memory is switched depending on the situation so that the memory is used very efficiently. Even for image data with various characteristics (in terms of compression ratio or the like), the image forming apparatus is capable of controlling the image storing process so that the image memory is used in an optimized manner.

Eleventh Exemplary Embodiment

When a user reads an image and transmits the image in a particular format and with a particular resolution, the user cannot directly detect whether the image received by a destination has sufficiently high image quality. If the received image does not have expected high image quality, the user has to again read the image and transmit it. A tenth embodiment discloses a technique to avoid the above problem.

Figure 31:
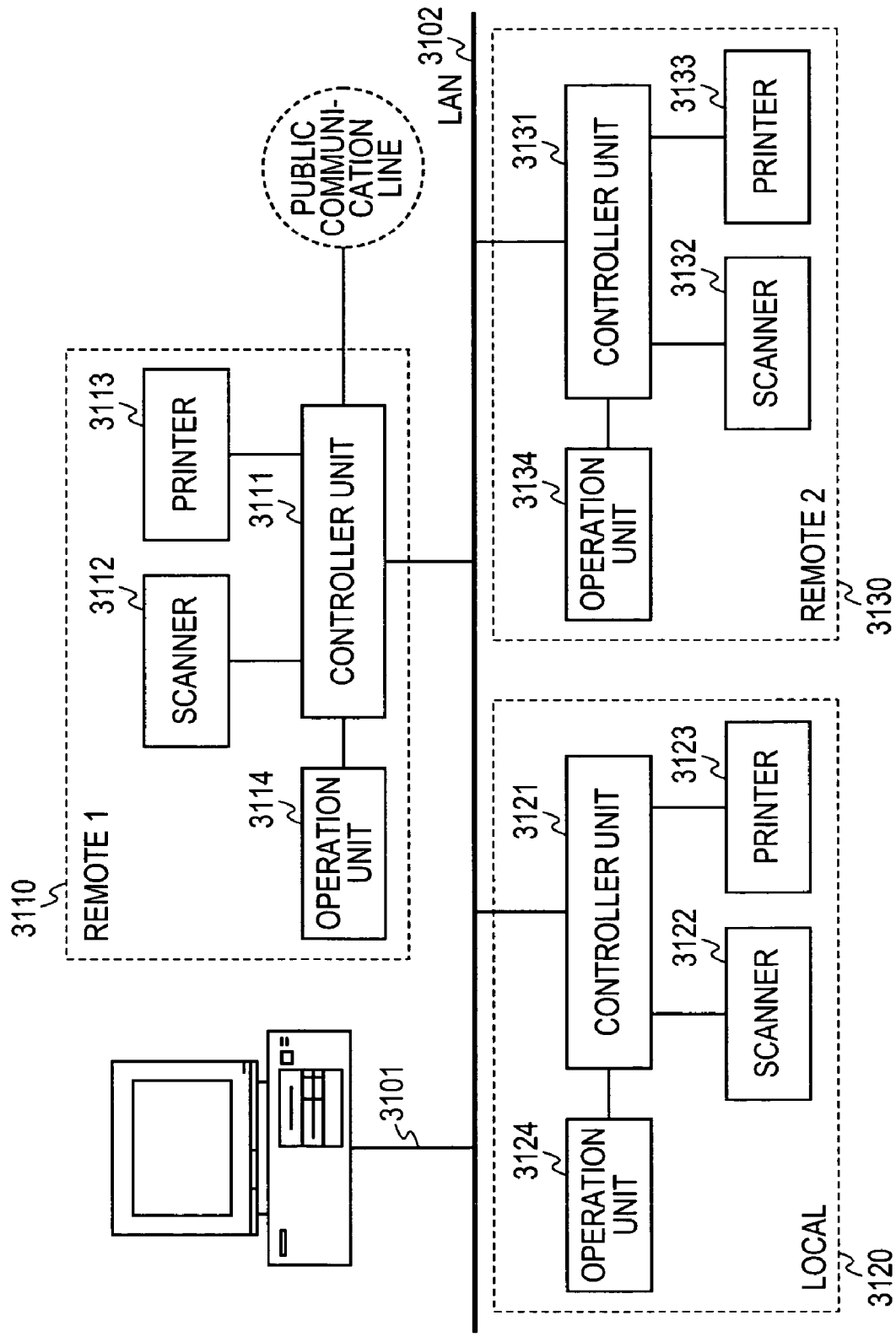
FIG. 31 is a block diagram showing an exemplary general structure of an image forming system according an embodiment of the present invention.

FIG. 31 is a block diagram showing an exemplary general structure of an image forming system according to the present embodiment. Note that each image forming apparatus included in the system according to the present embodiment is basically similar in functions and structure to that shown in FIG. 2. An image forming apparatus 3120 includes a scanner unit 3122 serving as an image input device, a printer unit 3123 serving as an image output device, a controller unit 3121, and an operation unit 3124 serving as a user interface. The scanner unit 3122, the printer unit 3123, and the operation unit 3124 are connected to the controller unit 3121, which is connected to a LAN 3102 serving as a network and also to a public communication line. The public communication line can be used to transmit data, which may include a color image, by G3 or G4 facsimile.

The image forming apparatus 3120 is connected via the LAN 3102 to an image forming apparatus 3110 and an image forming apparatus 3130 that are similar in structure to the image forming apparatus 3120. The LAN 3102 is also connected to a personal computer (PC) 3101 that can be used to transmit a file, e-mail, or the like using an FTP or SMB protocol. The image forming apparatus 3110 and 3130 each include a scanner unit 3112 or 3132, a printer unit 3113 or 3133, and an operation unit 3114 or 3134, which are connected to a controller unit 3111 or 3131.

Figure 32:
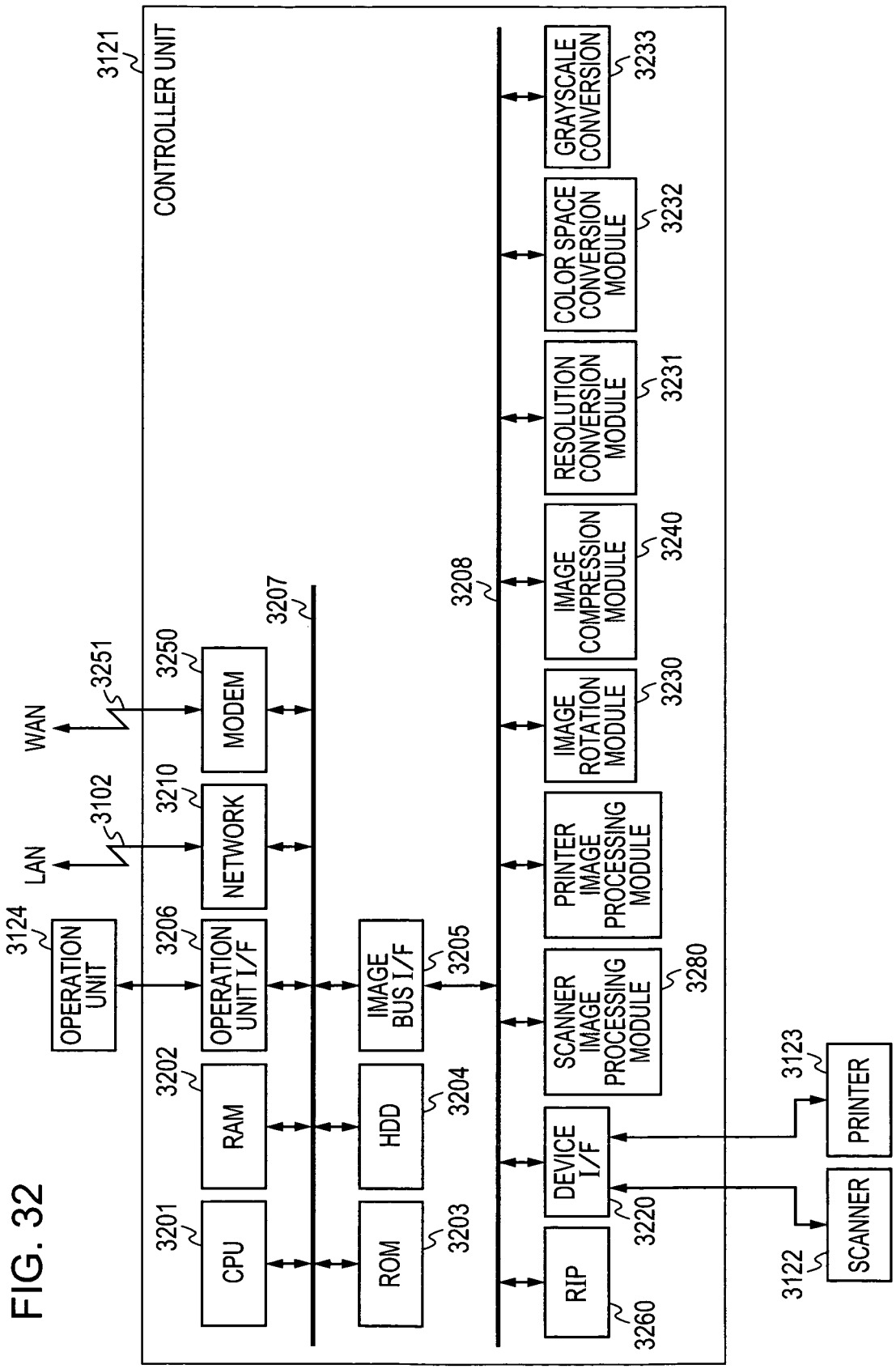
FIG. 32 is a block diagram showing an exemplary general structure of an image forming apparatus according an embodiment of the present invention.

FIG. 32 is a block diagram showing an exemplary general structure of each image forming apparatus. The controller unit 3121 is connected to the scanner unit 3122 serving as the image input device and to the printer unit 3123 serving as the image output device. The controller unit 3121 also serves as a controller for controlling inputting/outputting of image information or device information via the LAN 3102 or the public communication line (WAN) 3251. A CPU 3201 is a controller responsible for control over the entire system. A RAM 3202 is used as a system work area by the CPU 3201 and is also used as an image memory for temporarily storing image data. A ROM 3203 is a boot ROM in which a system boot program is stored.

A hard disk drive (HDD) 3204 is used to store system software and image data. An operation unit interface 3206 is a unit for interfacing with the operation unit 3124. Image data to be displayed on the operation unit 3124 is supplied to the operation unit 3124 via the operation unit interface 3206, and information input by a user of the system via the operation unit 3124 is supplied to the CPU 3201 via the operation unit interface 3206. A network 3210 connected to the LAN 3102 serves to transmit information. A modem 3250 connected the public communication line 3251 serves to input/output image information. The units or devices described above are located on a system bus 3207.

An image bus interface 3205 is a bus bridge that is connected between the system bus 3207 and an image bus 3208 for transmitting image data at a high speed and that converts a data structure as required in data transmission between the system bus 3207 and the image bus 3208. A PCI bus or an IEEE1394 bus may be used as the image bus 3208. The image bus 3208 is connected to the following devices. A raster image processor (RIP) 3260 converts PDL code into bitmap image data. A device interface 3220 serves to connect the scanner unit 3122 serving as the image input device and the printer unit 3123 serving as the image output device to the controller unit 3121, and the device interface 3220 performs a synchronous/asynchronous image data conversion.

A scanner image processing module 3280 performs a correction, modification, and/or editing on input image data. The scanner image processing module 3280 has a capability of determining whether input image data is of a color image or a monochrome image, based on the chroma signal of the image data and storing the result of the determination. A resolution conversion module 3231 converts the resolution of image data stored in the memory and stores the resultant image data into the memory. A color space conversion module 3232 converts YUV image data stored in the memory into Lab image data via a matrix calculation and stores the resultant image data into the memory. A gray scale conversion module 3233 converts 8-bit 256-level image data stored in the memory into 1-bit 2-level image data by an error diffusion method or the like and stores the resultant image data into the memory. An image compression module 3240 compresses image data such that multilevel image data is converted into JPEG image data and 2-level image data is converted into JBIG, MMR, MR, or MH image data.

The image rotation module 3230, the resolution conversion module 3231, the color space conversion module 3232, the gray scale conversion module 3233, and the image compression module 3240 can operate in a direct cooperative manner. For example, a rotation and a resolution conversion on some image data on the memory can be performed without needing an intervention by the CPU 3201.

Figure 33:
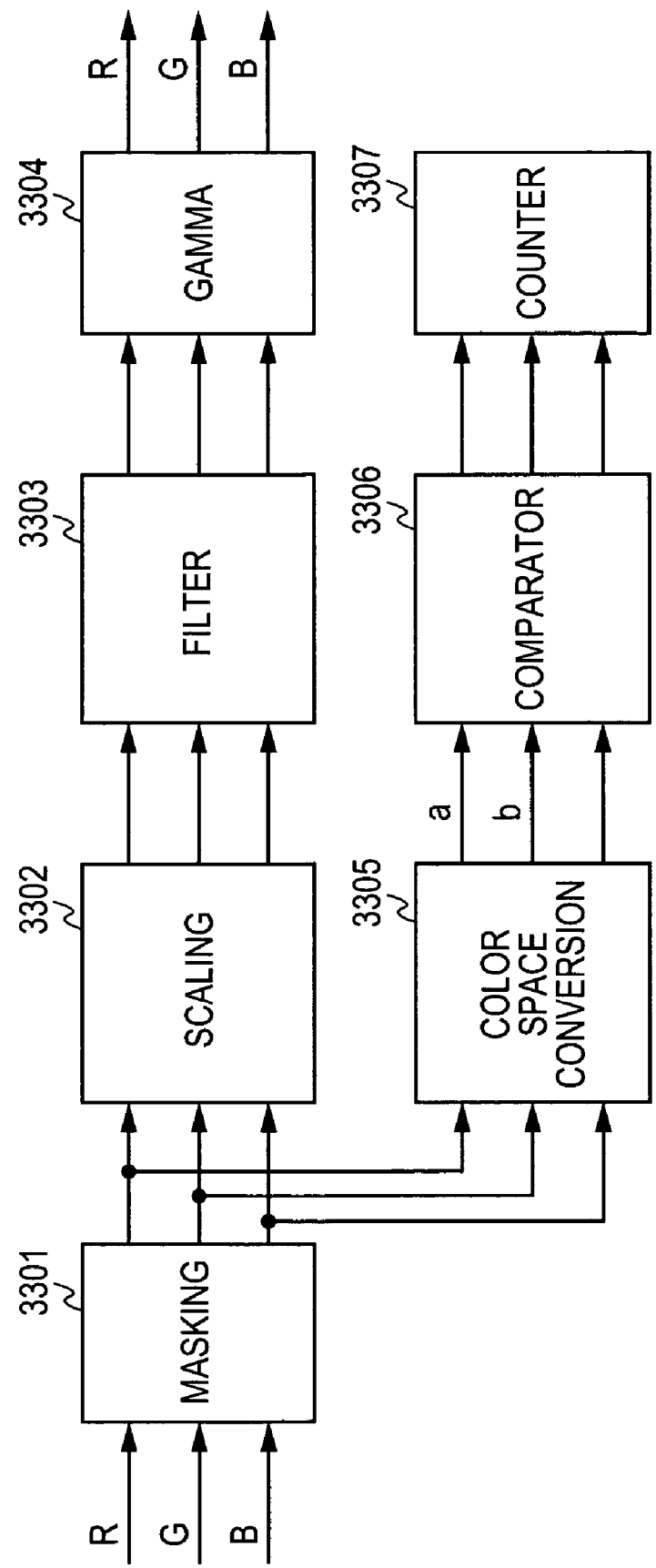
FIG. 33 is a block diagram showing an exemplary image processing performed by a scanner according to an embodiment of the present invention.

FIG. 33 is a block diagram showing the details of the scanner image processing module 3280 according to the present embodiment. 8-bit R, G, and B luminance signals input from the scanner unit 3122 are converted by a masking unit 3301 into standard R, G, and B color signals that do not depend on CCD filter colors. If scaling is needed, a scaling unit 3302 performs scaling. A filter 3303 blurs an image to create particular effects. A gamma correction unit 3304 makes a correction in terms of the density over the entire area of an image. A color space conversion unit 3305 converts the image signals, which are not yet subjected to the scaling process, into Lab image signals to determine whether the given image data is of a color image or a monochrome image.

Color signal components an and b output from the color space conversion unit 3305 are applied to a comparator 3306. When the comparator 3306 determines that the color signal components a and b are higher than predetermined threshold values, the image data is determined to be of a color image. If not so, the image data is of a monochrome image. A 1-bit signal indicating the comparison result is output from the comparator 3306. A counter 3307 counts outputs from the comparator 3306. Note that the operation unit 3124 used in the present embodiment may be similar to that used in the first embodiment shown in FIG. 5.

Figure 34:
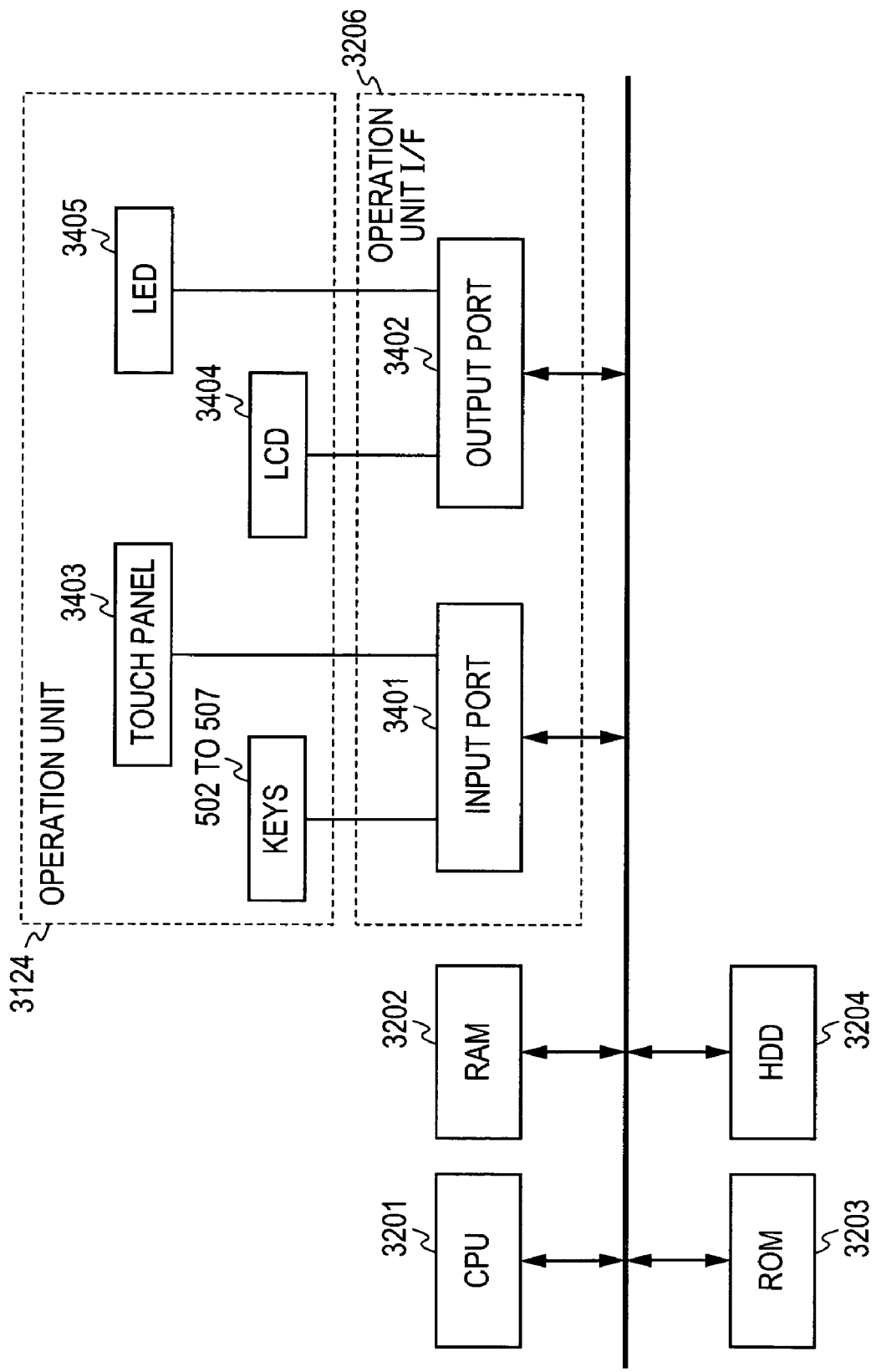
FIG. 34 is a block diagram showing an exemplary general system configuration according an embodiment of the present invention.

FIG. 34 is a block diagram showing an exemplary structure of the operation unit 3124 of the image forming system according to the present embodiment. In the present embodiment, the CPU 3201 receives information associated with a command or data input by a user via a touch panel 3403, hard keys 502 to 507, and the operation unit interface 3206. Based on the received command or the data, the CPU 3201 produces display screen data and outputs the produced display screen data to an LCD or a CRT serving as a screen output device 3404 and/or to an LED serving as a screen output device 3405 via an output port 3402 that controls the screen output device 3404.

Figure 35:
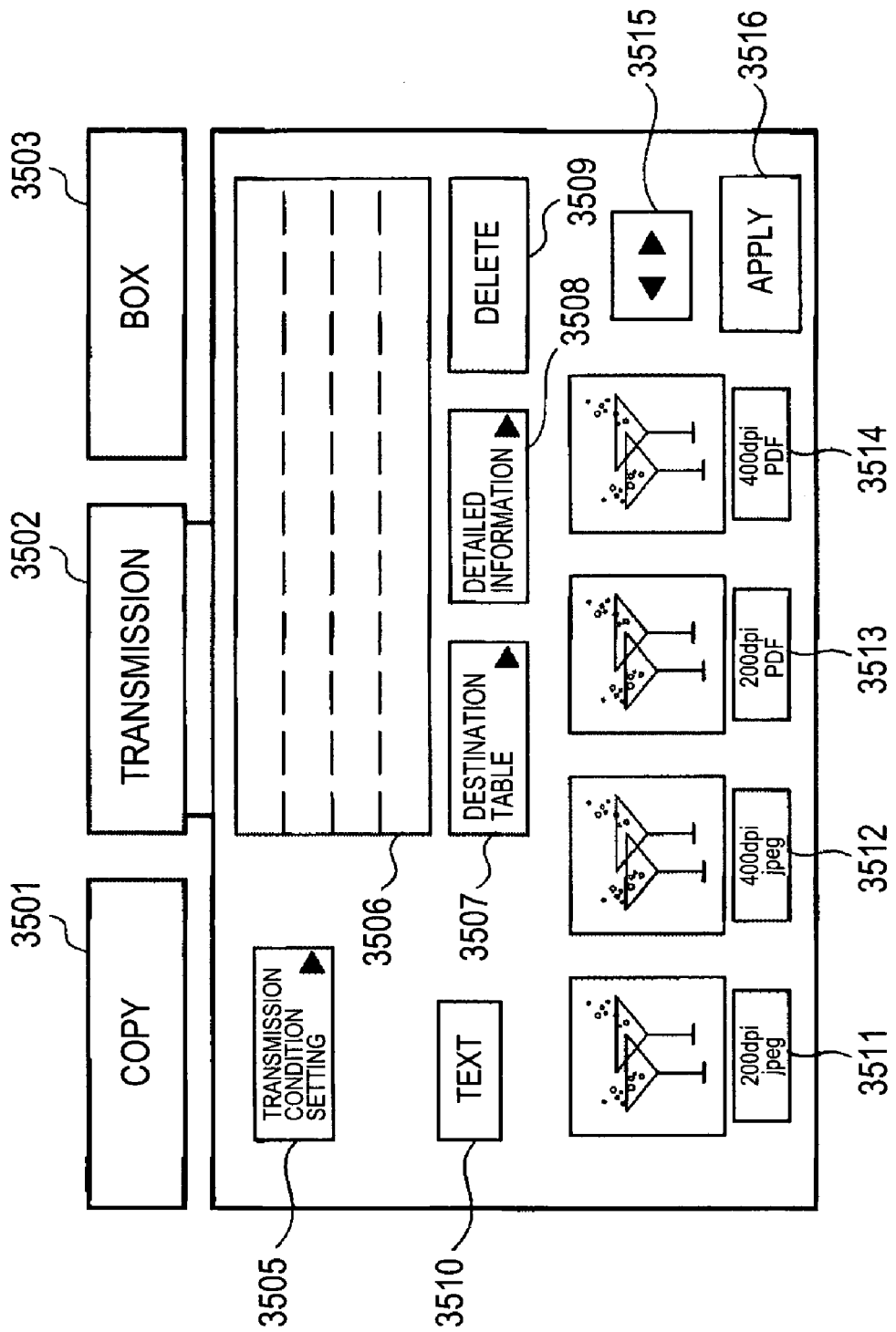
FIG. 35 is a diagram showing an example of an operation unit according to an embodiment of the present invention.

FIG. 35 shows an exemplary basic screen of the image forming apparatus according to the present embodiment. This basic screen is initially displayed when the image forming apparatus is started. When settings associated with a function of the image forming apparatus are performed via a some setting screen, the screen returns to the initial basic screen shown in FIG. 35 after completion of the settings. Although a screen similar to that shown in FIG. 17 employed in the fifth to ninth embodiments may also be used, the screen shown in FIG. 35 is used in the present embodiment for simplicity of explanation. A button 3501 is used to switch the screen to a copy setting screen. A button 3502 is used to switch the screen to a screen for setting conditions of transmission of a scanned image via facsimile or e-mail. A button 3503 is used to switch the screen to a screen for setting conditions of printing or transmission of an image stored on a built-in HD. If a button 3505 is pressed, a window is opened which is for setting a timer such that transmission is automatically performed at a programmed time, and also for setting conditions of storing image data on the HD or printing conditions. In an area 3506, transmission destinations specified via a button 3507 is displayed. A button 3508 is used to display detailed information of one of destinations displayed in the area 3506. A button 3509 is used to erase one of destinations displayed in the area 3506. In display fields 3511 to 3514, partial images extracted from the scanned image according to a specified feature such as text, thin lines, or an image are displayed in particular formats selectable in transmission. A button 3510 is used to select a feature such as "TEXT", "THIN LINES", or "IMAGE". A button 3515 is used to shift the images displayed in the areas 3511 to 3514 in a forward or reverse direction to display other images. A button 3516 is used to finally select an image format from those 3511 to 3514.

Figure 37:
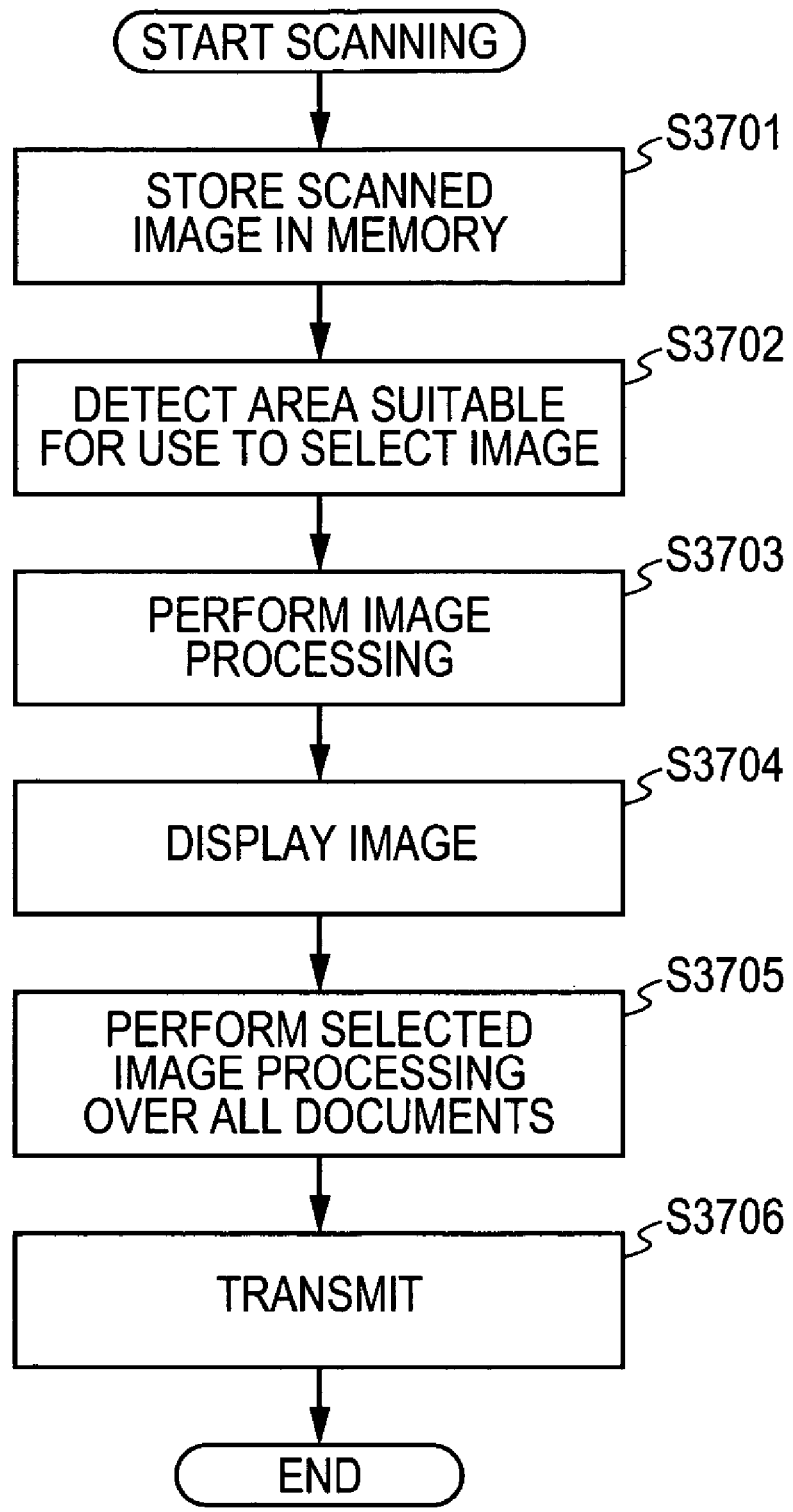
FIG. 37 is a flow chart showing an example of a control method according to an embodiment of the present invention.

Now, an exemplary method of displaying scanned images according to the present embodiment is discussed. FIG. 37 is a flow chart of a process of transmitting image data according to the present embodiment. In step S3701, an RGB color image output from the scanner unit is stored into the memory.

Figure 36:
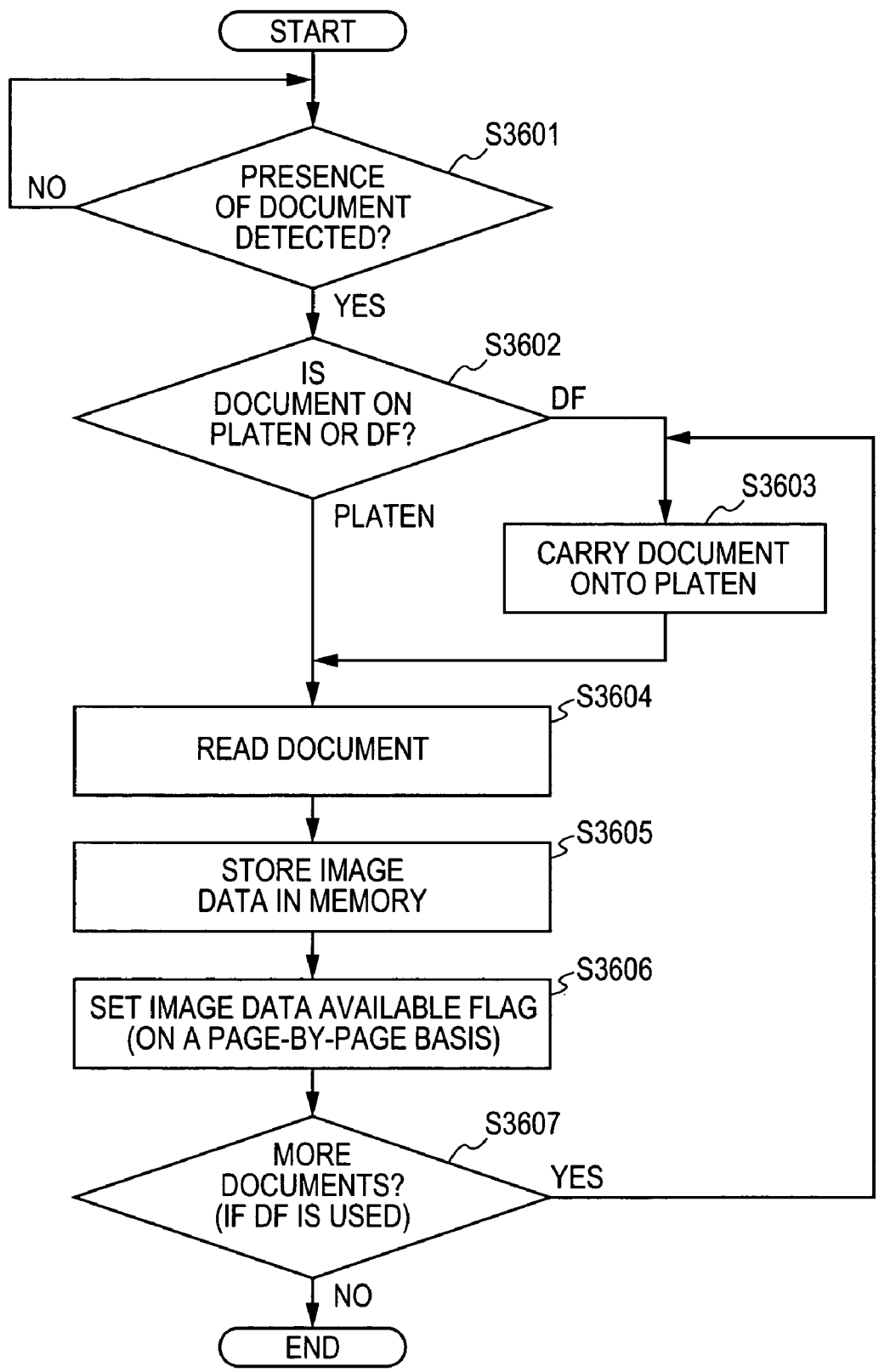
FIG. 36 is a flow chart showing an example of a control method according to an embodiment of the present invention.

In the case in which reading of a document is performed in the second reading mode, the process is performed in according to the flow chart shown in FIG. 36. First, in step S3601, a check is made as to whether there is a document. If no document is detected, the process waits in step S3601 until a document is detected. If a document is detected, then in step S3602 a determination is made as to whether the document is on the platen or the DF. In the case in which the document is on the DF, it is needed to carry the document to the document glass plate, and thus, in step S3603, the document is carried to the document glass plate. Thereafter, the process proceeds to step S3604. In the case in which it is determined in step S3602 that the document is on the platen, the process proceeds to step S3604 from step S3602. In step S3604, reading of the document is performed. In step S3605, resultant image data is stored in the memory. If the image data is completely stored in the memory, the process proceeds to step S3606. In step S3606, an image data availability flag is set so as to indicate that the image data is ready to be printed. In the next step S3607, the document that has already been read is carried to the output tray, and a check is made as to whether there is a next document page. If so, the process returns to step S3603 to carry the next document page to the document glass plate. The above-described process is repeated for all document pages. When it is determined in step S3607 that there is no more document, the reading operation is ended.

In step S3702 in the flow chart shown in FIG. 37, a particular area with a particular feature such as an area including text, thin lines, or an image, is extracted using a known area separation technique. In the present embodiment, a first-detected area with a specified feature is displayed. In step S3703, the extracted partial image is subjected to all kinds of image processing that are selectable in the transmission operation. More specifically, after common processing including a color conversion and a gray level conversion is performed, the image data is converted to various selectable combinations of a resolution and a compression ratio (in the JPEG or PDF format). Thereafter, the resultant image is further decompressed to obtain image data to be displayed on the screen shown in FIG. 35. In step S3704, the image produced in the image process in step S3703 is displayed on the screen shown in FIG. 35. If a user selects a format for the image, then in step S3705, all scanned document images stored in the memory are converted into the selected format. In step S3706, the images produced in step S3705 are transmitted.

According to the present embodiment, as described above, when an image is scanned, a user can precisely predict image quality that will be obtained at a destination. This provides great convenience to users.

Eleventh Exemplary Embodiment

In the sixth embodiment described earlier, a general-purpose image data format (raw RGB luminance data) is used. In the seventh embodiment, image data is converted into all possible formats that may be specified to be used in the following image processing, and resultant image data converted in all possible formats are stored. This technique according to the seventh embodiment is useful in particular when the image forming apparatus does not have a sufficiently large memory capacity to store image data in the general-purpose image format or to store a large number of image data. In the present embodiment, to prevent the necessity of re-reading a document from occurring, reading of the document is started after the format for image data to be stored has been determined. In this eleventh embodiment, the functional block structure, the mechanical structure, and the hardware structure of the image forming apparatus and the structure of the operation unit 204 are similar to those according to the first embodiment described above with reference to FIGS. 2 to 5, and thus a duplicated explanation thereof is omitted herein.

Figure 38A:
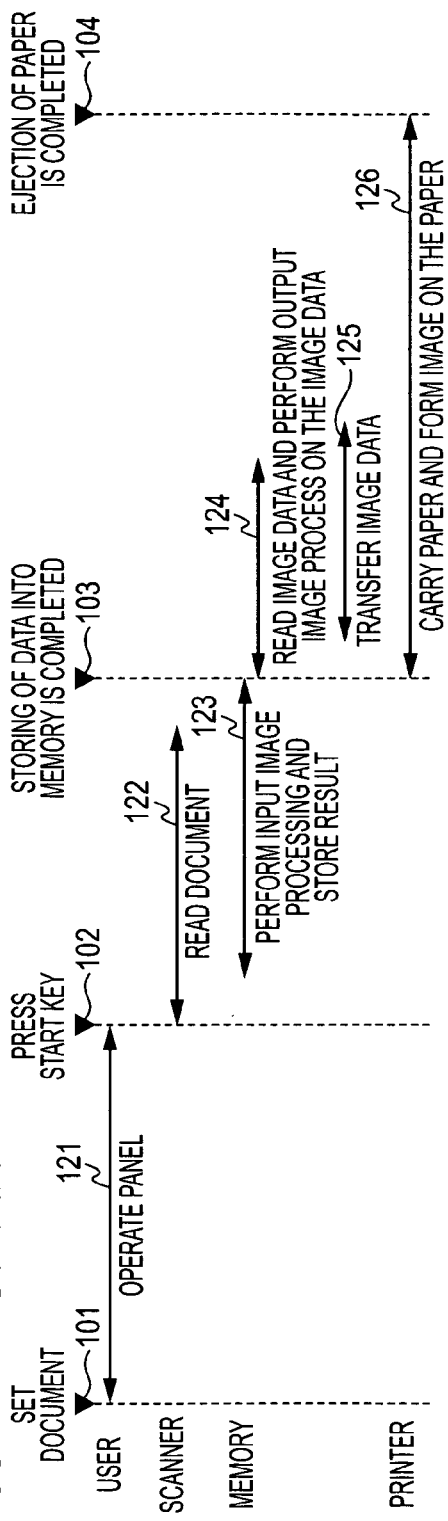
FIG. 38 is a diagram showing an exemplary image forming sequence according to an embodiment of the present invention and also showing, for the purpose of comparison, an image forming sequence according to a known technique.
Figure 38B:
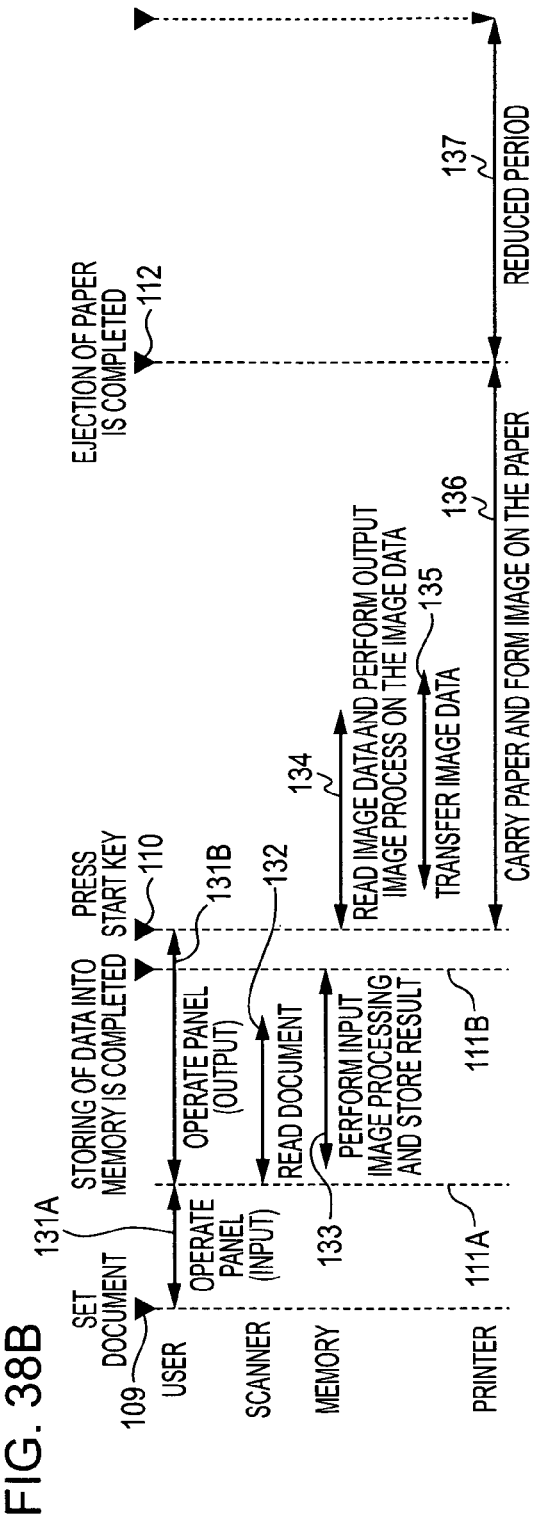

Referring to FIGS. 38A-B, a general operation is described. FIGS. 38A-B are diagram showing, in a similar manner to FIGS. 1A-B, an image forming sequence according to the present embodiment of the invention (see FIG. 38B) and also showing, for the purpose of comparison, an image forming sequence according to a known technique (see FIG. 38A). In FIGS. 38A-B, similar reference numerals to those in FIGS. 1A-B denote similar units, devices, or processes. The following discussion will be focused on differences from those shown in FIG. 1A-B.

The process in the second reading mode according to the present embodiment of the invention is shown in FIG. 38B. First, in USER, the user sets a document on a document glass plate or a document feeder (at a point of time 109). Thereafter, using the operation panel, the user makes settings associated with an output operation such as a copying or a facsimile transmission, which makes it possible to determine what input image processing should be performed. The user then makes settings of image reading conditions such as a reading size, a reading resolution, etc., via the operation panel (in period 131A). If settings of image reading conditions are completed and thus the data format for image data to be stored is determined (at a point of time 111A), then in SCANNER, the scanner reads the document (in a period 132). When the reading of the document is started, a UI (User Interface) screen for making settings of output conditions is displayed. Via this UI screen, the user specifies conditions of outputting of print data, such as the number of copies, a color mode, finishing conditions, an output destination, etc. After a slight delay from the start of reading the document, input image processing is started and resultant image data is stored in a memory (in a period 133). If the storing of the image data is completed (at a point of time 111B) and all settings in USER are completed, the user presses the start key to issue a print start command or a print data transmission command (at a point of time 110). The operation performed after the start key is pressed is similar to that shown in FIG. 1, and thus a duplication explanation thereof is omitted herein.

As can be understood from the above discussion, the process in the second reading mode according to the present embodiment allows the FCOT to be reduced by a period denoted by reference numeral 137 in FIG. 38B compared with the FCOT needed in the first reading mode.

Figure 39A:
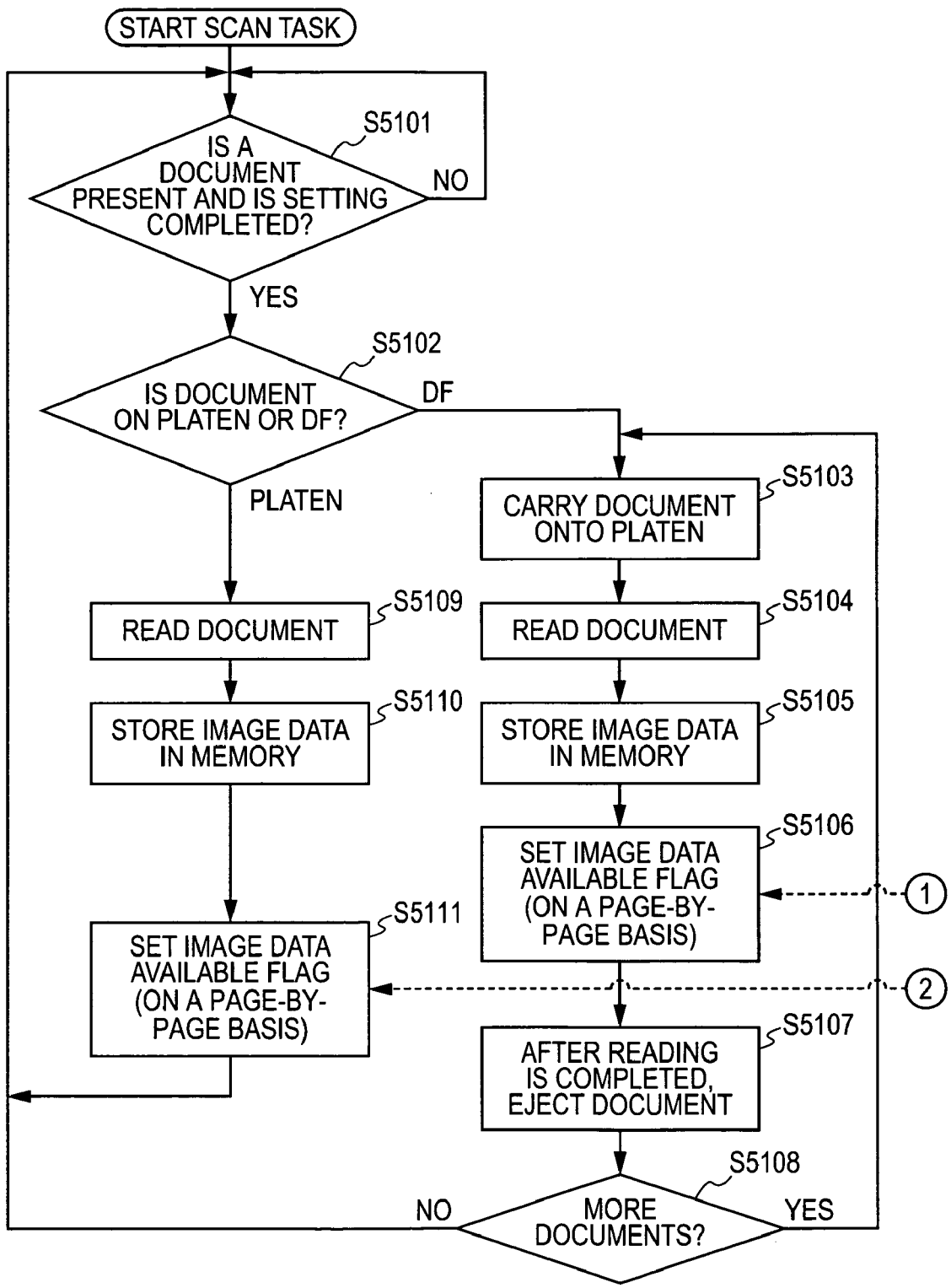
FIGS. 39A and 39B are flow charts showing an exemplary control process performed in a multifunction machine according to an embodiment of the present invention.
Figure 39B:
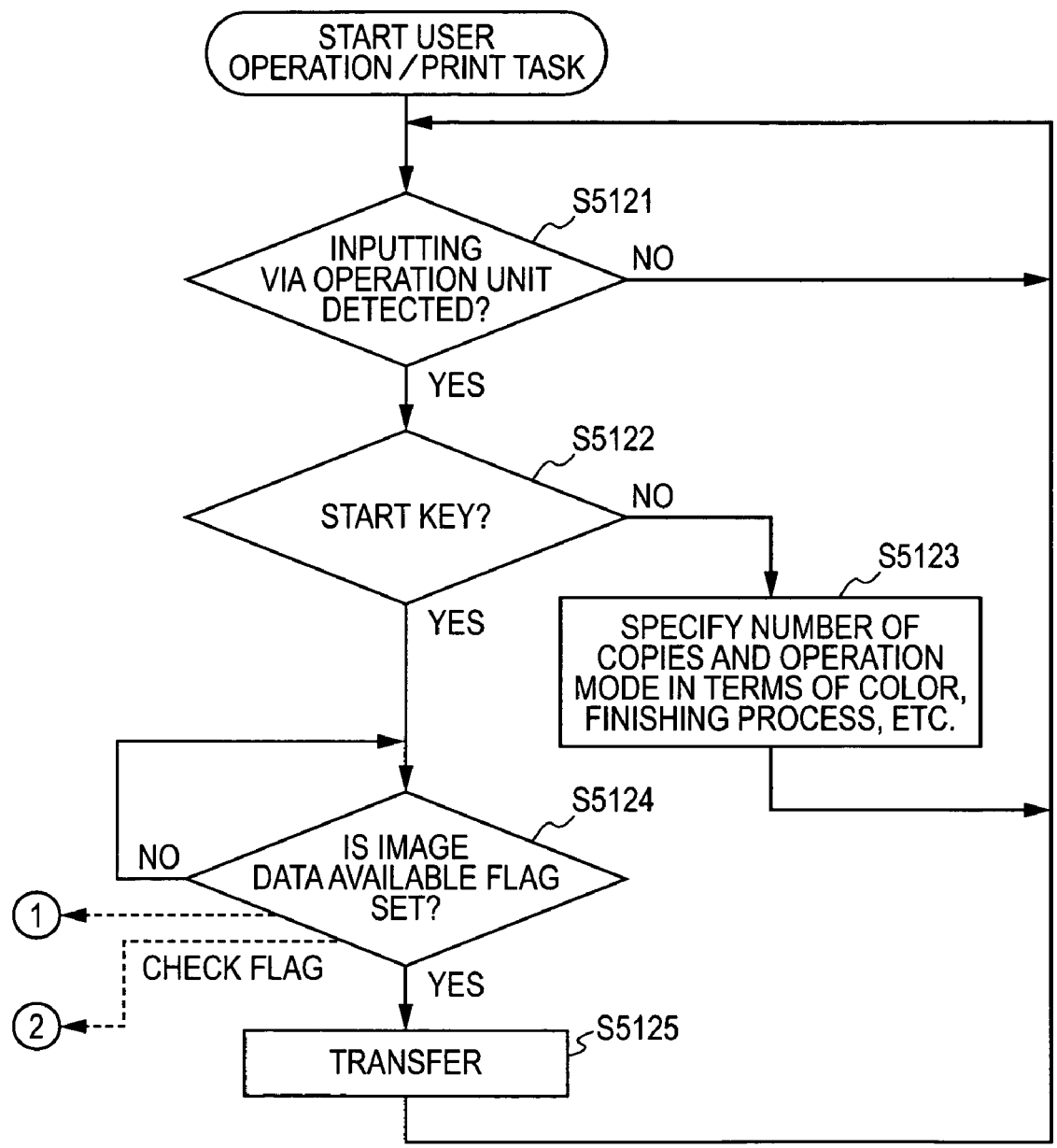

FIGS. 39A and 39B are flow charts showing exemplary details of the image forming process performed in the multifunction machine, described above with reference to FIG. 38, according to the present embodiment. The image forming process shown in FIGS. 39A and 39B is performed in the second reading mode in a similar manner to the first embodiment and is executed by the CPU 402 of the main controller 401. That is, the process shown in FIGS. 39A and 39B is performed by the CPU 402 by reading a control program stored in the ROM 404 and executing it. The process shown in FIGS. 39A and 39B is similar to that shown in FIGS. 11A and 11B except for step S1101.

First, a determination as to whether there is a document and setting of image processing in the input operation has been performed (step S5101). If no document is detected, the process waits in step S5101 until a document is detected and setting of image process is completed. If a document is detected and image processing for that document is completed, a determination is made as to whether the document is on the platen or the DF (step S5102). The document is then read (in step S5109 if the document is on the platen or in steps S5103 and S5104 if the document is on the DF). The process performed thereafter is similar to that described earlier with reference to the flow chart shown in FIGS. 11A and 11B, and thus a duplicated explanation thereof is omitted herein. In the process described above, reading of a document is started after setting of input image processing for the document is completed. However, the timing of starting reading of document is not limited to that employed above. That is, the image processing apparatus can start reading of a document if a format to be used to store the image data is already determined, and it is not necessarily needed to wait unit all settings are completed.

Figure 40A:
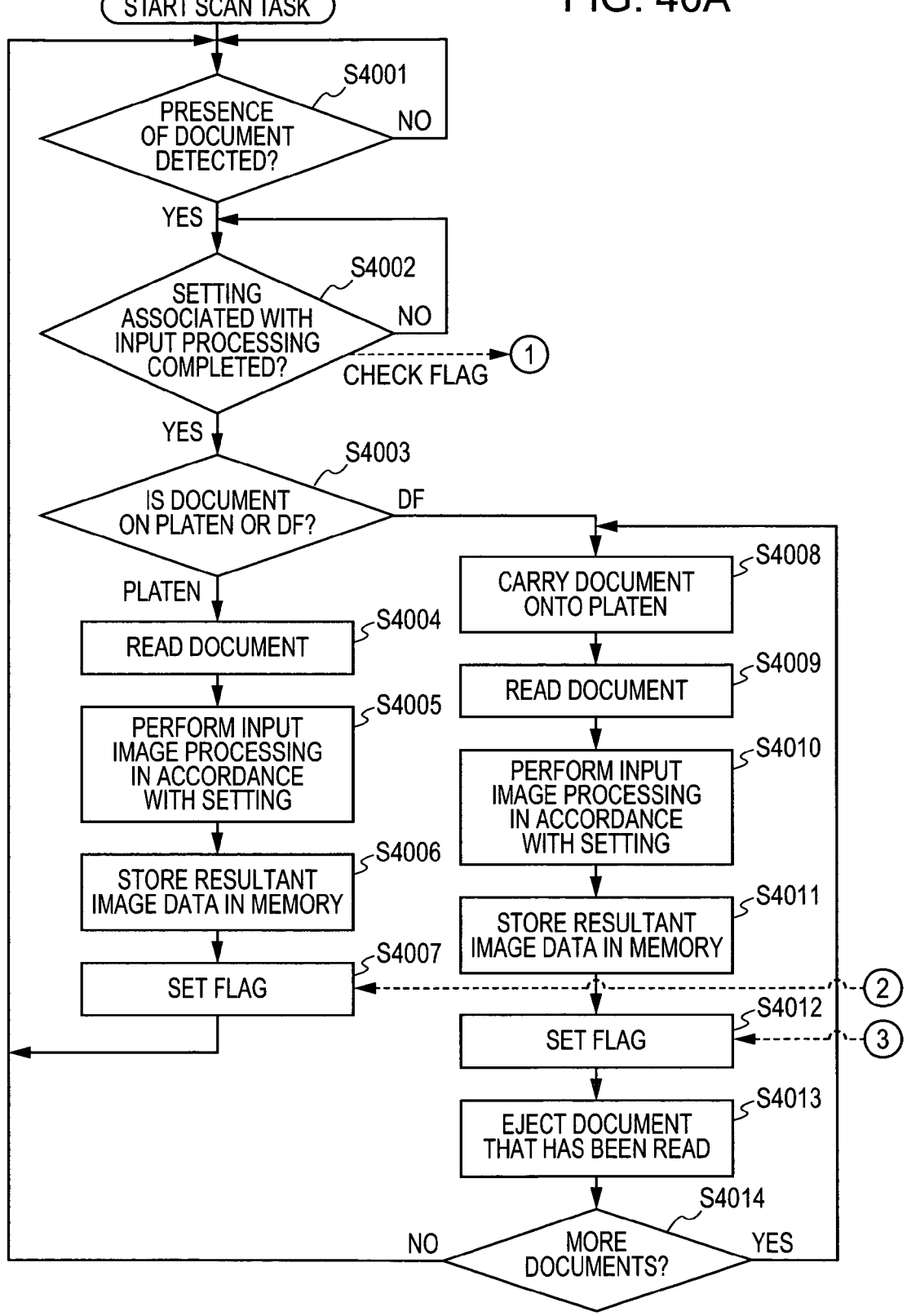
FIGS. 40A and 40B are flow charts showing exemplary details of the image forming process performed in the multifunction machine, described above with reference to FIGS. 39A and 39B.
Figure 40B:
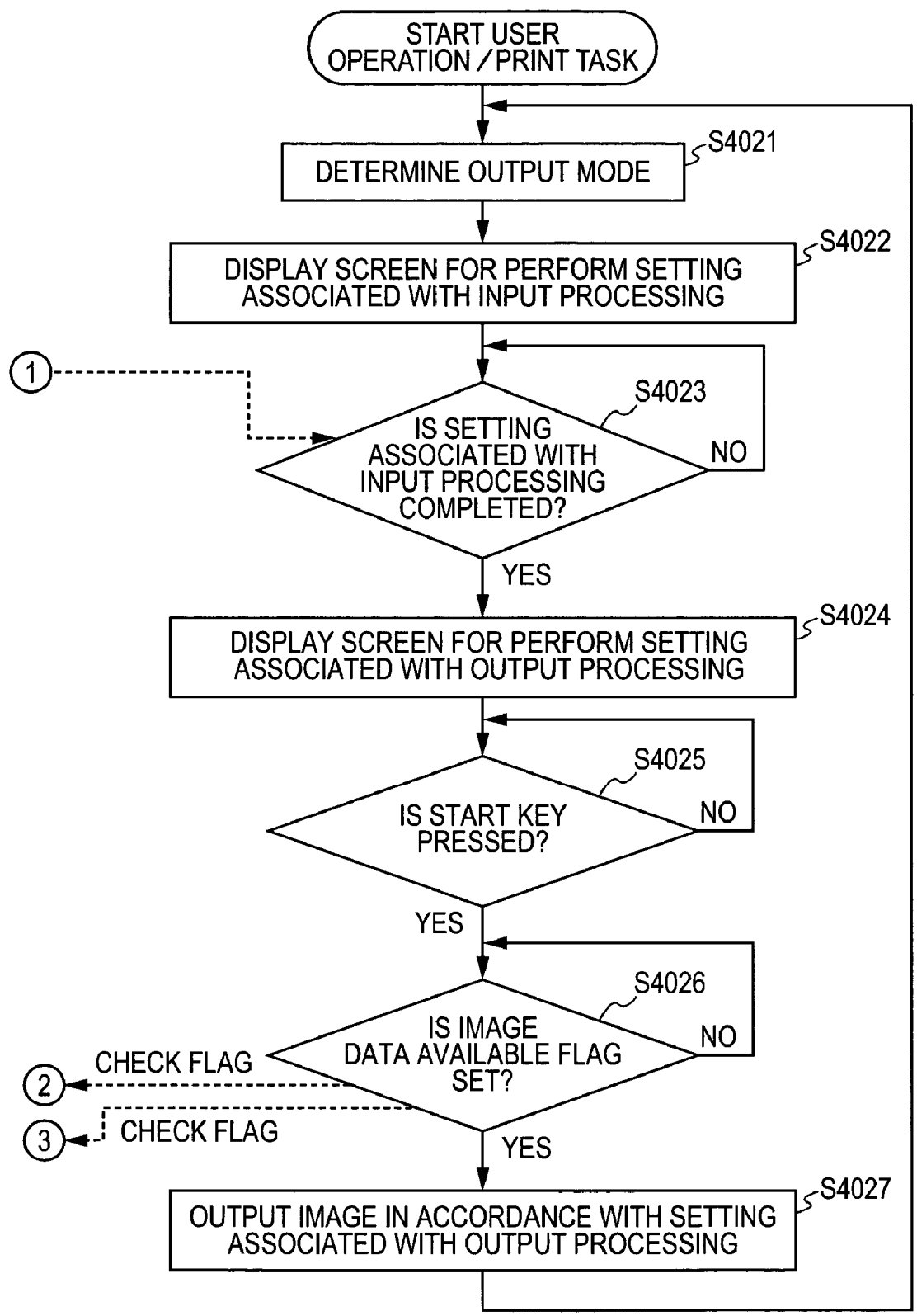

FIGS. 40A and 40B are flow charts showing exemplary details of the image forming process performed in the image forming apparatus described above with reference to FIGS. 39A and 39B. The process shown in FIGS. 40A and 40B is performed by the CPU 402 by reading a control program stored in the ROM 404 and executing it.

The document pre-reading may be performed such that when a document is set, reading of the document is immediately started, and then input image processing is started. However, the input image processing performed on image data acquired via scanning varies depending on an output operation (such as printing, transmission, storing, etc.) performed on the image data. One method to handle the above problem is to perform all kinds of image processing corresponding to possible output operations and store resultant all image data. However, this technique needs a high processing capacity to perform a plurality of sorts of image processing corresponding to possible output operations and also needs a high memory capacity to store resultant image data with a total large size. Another possible method is to retain image data acquired via scanning until an output operation is determined and image processing corresponding to the determined output operation has been performed. More specifically, image data acquired via scanning is stored directly in a memory, and image processing is performed on the image data stored in the memory after an output process is determined. That is, image processing corresponding to the determined output operation is performed to obtain image data in a data format adapted for the output operation. In this technique, it is not needed to perform a plurality of different kinds of image processing for a single image. However, in a case in which a plurality of document pages is handled as a single job, a large memory capacity is needed to store image data of the plurality of document pages in the original data form.

In the present embodiment, to avoid the above problem, settings associated with an output operation and input image processing corresponding to the output operation are first performed. Thereafter, image data acquired via scanning is subjected to the determined image processing to obtain image data in a format needed in the determined output operation.

In the user operation/print task shown in FIG. 40B, when the present process is started, a screen for selecting an output operation for image data acquired via scanning is displayed as an initial screen on the operation unit 204 as shown in FIG. 41. In the multifunction machine according to the present embodiment, as shown in FIG. 41, it is allowed to select an output operation from a copying (printing) operation, a facsimile operation, transmission of image data to another printer or the like, and storing of image data in a box.

Figure 42:
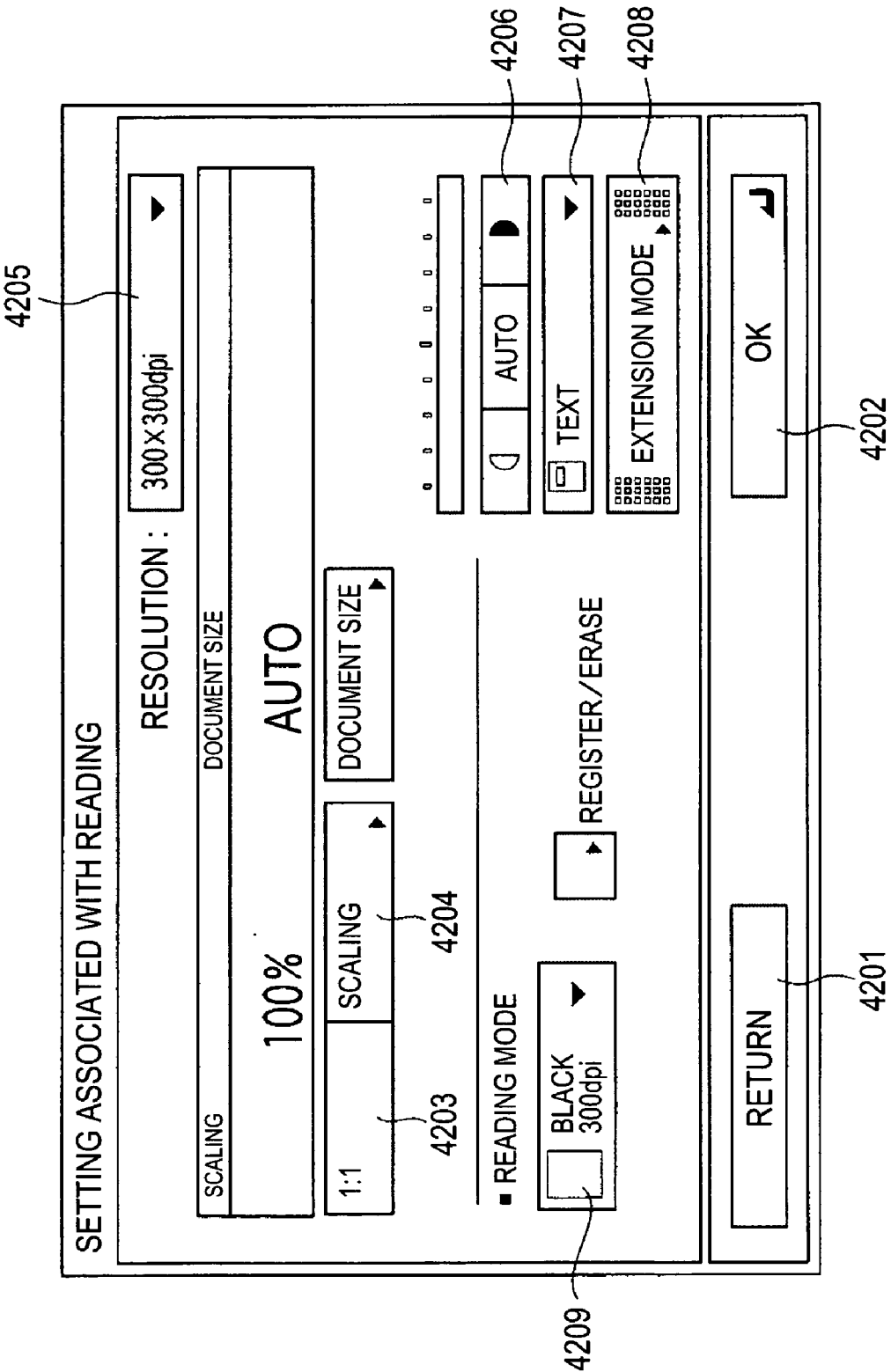
FIG. 42 shows an example of a screen displayed when "TRANSMIT" is selected as the output mode via the screen shown in FIG. 41.

Referring to FIG. 40B, first, in step S4021, if it is detected that a user has selected an output operation via this screen, then in step S4022, a screen for making settings associated with input image processing corresponding to the selected output operation is displayed. FIG. 42 shows an example of the screen for this purpose. In the specific example shown in FIG. 42, it is assumed that the copying operation has been selected as the output operation.

In FIG. 42, a button 4201 is used to return to a previous screen (the output operation setting screen shown in FIG. 41). A button 4202 is used to switch to a next screen (a transmission setting screen). A button 4203 (1:1) and a button (SCALING) 4204 are used to specify a scaling factor. A box 4205 is used to specify a reading resolution. A button 4206 is used to specify a density. A box 4207 is used to select the type of a document from text, text/photo, and photo. A button 4208 is used to make more detailed settings. A box 4209 is used to select a combination of a resolution and a document type from a group including reregistered combinations expected to be employed frequently.

Referring back to FIG. 40B, in step S4023, a determination is made as to whether setting of input processing via the screen shown in FIG. 42 is completed. More specifically, the determination is made by checking whether the OK button 4202 is pressed after setting is completed. If it is determined that setting is completed, a flag is set to indicate that the setting of the input processing is completed, and the process proceeds to step S4024. In step S4024, a screen for making settings associated with the output operation selected in step S4021.

FIG. 43 shows an example of the output operation setting screen. In this specific example shown in FIG. 42, it is assumed that transmission has been selected as the output operation to be performed. In FIG. 43, a destination is specified in a box 4301, and a transmission method (facsimile, e-mail, etc.) is selected in a box 4302.

Referring back to FIG. 40B, in the next step S4025, it is determined whether the setting is completed (whether an OK button 4304 is pressed) and then a start key is pressed. If it is determined that the OK button 4304 and the start key have been pressed, then in step S4026, it is further determined whether an image data availability flag for some image data is set. This determination is made by checking the status of respective image data availability flags that are set for image data when input image processing for the image data is completed and the image data are stored in the memory in the scan task that will be described later. If it is determined that there is image data ready to be used, an output operation is performed to output image data in accordance with the output operation settings made in step S4024 (step S4027).

In the scan task shown in FIG. 40A, first, in step S4001, detection of a document is performed. If no document is detected, the process waits in step S4001 until a document is detected. Then in step S4002, it is determined whether settings associated with input processing by a user are completed. If the settings are not yet completed, the process waits in step S4002 until the settings are completed. The determination in step S4002 as to the settings is made by checking the input setting completion flag set in step S4023 in the user operation/print task described above.

If presence of a document is detected, and completion of settings of input processing is detected, reading of the document and image processing on image data of the document are performed as described below. More specifically, first, an output operation is determined (step S4021). Thereafter, depending on the output operation, settings of input processing are performed (steps S4022, and S4023). Reading of the document and the input image processing are then performed. Thus, in the present embodiment, as can be seen from the above discussion, what image processing should be performed on the image document acquired via scanning has already been determined, and the image processing is performed in accordance with the settings associated with the image processing determined depending on the output operation. This makes it possible to avoid the problem that if input image processing is performed at a stage at which an output operation has not yet determined, the input image processing must be performed for a plurality of possible output operations, and thus a high processing capacity and a high memory capacity are required. The technique according to the present embodiment also avoids the problem that if image data of a large number of document sheets is directly stored in a memory, the memory has to have a large memory space.

In step S4003 and following steps, reading of a document and image processing on image data of the document are performed. First, a determination is made as to whether a document is on the platen or the DF (step S4003). In the case in which it is determined in step S4003 that the document is present on the DF, the document is moved to the document glass plate (step S4008), reading of the document is performed (step S4009). Furthermore, input image processing is performed on image data of the document in accordance with the settings determined depending on the output operation to be performed (step S4010). The resultant image data is stored in the memory (step S4011). Thereafter, an image data availability flag is set so as to indicate that the image data is ready to be printed (step S4012).

If the reading of the document and the image processing are completed, the document is carried to the output tray (step S4013). Thereafter, a determination is made as to whether there is a next document page (step S4014). If there is a next page, the process returns to step S4008 to repeat the process until the process is completed for all pages.

On the other hand, in the case in which it is determined in step S4003 that the document is present on the platen, the CPU 402 reads the document present on the platen (step S4004), and performs input image processing (step S4005). The resultant image data is stored in the memory (step S4006), and the flag is set (step S4007).

In the present embodiment of the invention, as described above, the output operation is first determined and then input image processing corresponding to the output operation is determined. Thus, the data format for image data to be produced in the input image processing is determined. That is, the determination of the output operation allows it to determine the input image processing, which allows it to determine the data format for image data to be produced in the input image processing. After the data format for image data to be produced in the input image processing is determined, reading of a document and the image processing are performed.

As described above, the technique according to the present embodiment of the invention makes it possible to use the system resources and the memory in a highly efficient manner.

In the process in step S4021 to determine the output operation, a preview screen such as that shown in FIG. 17 or 18 may be displayed to allow a user to select an output operation to be performed. The data format for image data to be stored can be determined at a stage at which the output operation is determined (step S4021) even if settings associated with input image processing are not yet completed (step S4023). Therefore, when the output operation is determined, it may be regarded in step S4002 that settings associated with input image processing are completed, and pre-reading of a document may be started.

Note that the scope of the present invention includes a technique of providing a special key in an image forming system designed to operate without performing document pre-reading in a normal mode such that pressing the special key causes pre-reading of a document to be started thereby achieving the operation in the second reading mode.

Other Exemplary Embodiments

The image forming apparatus and the method of controlling the image forming apparatus according to the present invention have been described with reference to first to eleventh embodiments. Note that the scope of the present invention also includes a control program for implementing the method of controlling the image forming apparatus according to any embodiment, and also includes an image forming system including an image forming apparatus according to any embodiment.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-369765 filed Dec. 21, 2004, No. 2004-369767 filed Dec. 21, 2004, and No. 2004-369766 filed Dec. 21, 2004, which are hereby incorporated by reference herein in their entirety.

What is claimed is:

1. An image forming apparatus comprising:
a scanner configured to generate image data by scanning a document;
a printer configured to perform a printing process based on the image data generated by said scanner;
an inputting unit configured to input a parameter used when the printing process included in a copy process is performed by said printer;
an instruction unit configured to instruct to start the copy process;
a first processing unit configured to perform processing in a first copy mode in which the copy process is performed, by starting the scanning by said scanner, in response to the instruction of the start of the copy process by said instruction unit, after the parameter is input by said inputting unit;
a second processing unit configured to perform processing in a second copy mode in which the scanning is started in response to placing the document on a document feeder or a document glass plate before inputting the parameter by said inputting unit and instructing to start the copy process by said instruction unit, the parameter is input by said inputting unit after starting the scanning by said scanner, and the copy process is performed by using the input parameter in response to the instructing to start the copy process by said instruction unit; and
a selecting unit configured to select any of the first copy mode and the second copy mode.

2. The image forming apparatus according to claim 1, wherein in the second copy mode, said printer starts the printing process in response to the instruction of the start of the copy process by said instruction unit, after the parameter is input by said inputting unit.

3. The image forming apparatus according to claim 1, further comprising a display unit configured to display a screen for making a user to specify any of the first copy mode and the second copy mode,
wherein said selecting unit selects the copy mode specified by the user using the screen displayed by said display unit.

4. The image forming apparatus according to claim 1, wherein the parameter input by said inputting unit includes at least any one of the number of copies, designation of color printing or monochrome printing, designation of stapling process, and designation of print layout.

5. A method performed in an image forming apparatus which includes a scanner configured to generate image data; a printer configured to perform a printing process based on the image data generated by the scanner; an inputting unit configured to input a parameter used when the printing process is performed; an instruction unit configured to instruct to start a copy process; a first processing unit configured to perform processing in a first copy mode; a second processing unit configured to perform processing in a second copy mode; and a selecting unit configured to select any of the first copy mode and the second copy mode; the method comprising:
scanning a document to generate;
performing a printing process based on image data generated by the scanner;
inputting a parameter used when the printing process included in a copy process is performed by the printer;
instructing, via the instruction unit, to start the copy process;
performing processing in a first copy mode in which the copy process is performed, by starting the scanning by the scanner, in response to the instruction of the start of the copy process by the instruction unit, after the parameter is input by the inputting unit;
performing processing in a second copy mode in which the scanning is started in response to placing the document on a document feeder or a document glass plate before inputting the parameter by the inputting unit and instructing to start the copy process by the instruction unit, wherein the parameter is input by the inputting unit after starting the scanning by the scanner, and
performing the copy process by using the input parameter in response to the instructing to start the copy process by the instruction unit; and
selecting any of the first copy mode and the second copy mode.

* * * * *